(12) United States Patent
Hayler et al.

(10) Patent No.: US 8,397,283 B2
(45) Date of Patent: Mar. 12, 2013

(54) USER ROLE MAPPING IN WEB APPLICATIONS

(75) Inventors: Don L. Hayler, Palo Alto, CA (US); Daniel Vu, Lafayette, CA (US)

(73) Assignee: Oracle International Corporation, Redwood City, CA (US)

(*) Notice: Subject to any disclaimer, the term of this patent is extended or adjusted under 35 U.S.C. 154(b) by 0 days.

(21) Appl. No.: 13/364,251

(22) Filed: Feb. 1, 2012

(65) Prior Publication Data

US 2012/0137213 A1 May 31, 2012

Related U.S. Application Data

(63) Continuation of application No. 12/917,764, filed on Nov. 2, 2010, now Pat. No. 8,136,150, which is a continuation of application No. 11/765,303, filed on Jun. 19, 2007, now Pat. No. 7,865,943.

(60) Provisional application No. 60/883,398, filed on Jan. 4, 2007, provisional application No. 60/826,633, filed on Sep. 22, 2006.

(51) Int. Cl.
*G06F 15/16* (2006.01)
*G06F 9/00* (2006.01)
*G06F 17/00* (2006.01)
*G06F 3/00* (2006.01)

(52) U.S. Cl. .................. 726/12; 715/741

(58) Field of Classification Search ............ None
See application file for complete search history.

(56) References Cited

U.S. PATENT DOCUMENTS

| | | |
|---|---|---|
| 5,335,345 A | 8/1994 | Frieder et al. |
| 5,594,793 A | 1/1997 | Bahout et al. |
| 5,797,128 A | 8/1998 | Birnbaum |
| 5,872,928 A | 2/1999 | Lewis et al. |
| 5,941,947 A | 8/1999 | Brown et al. |
| 6,029,196 A | 2/2000 | Lenz |
| 6,055,637 A | 4/2000 | Hudson et al. |
| 6,073,242 A | 6/2000 | Hardy et al. |
| 6,088,679 A | 7/2000 | Barkley |
| 6,158,010 A | 12/2000 | Moriconi et al. |
| 6,178,511 B1 | 1/2001 | Cohen et al. |
| 6,202,066 B1 | 3/2001 | Barkley et al. |
| 6,240,512 B1 | 5/2001 | Fang et al. |
| 6,243,747 B1 | 6/2001 | Lewis et al. |
| 6,256,741 B1 | 7/2001 | Stubblebine |
| 6,285,366 B1 | 9/2001 | Ng et al. |
| 6,304,881 B1 | 10/2001 | Halim et al. |
| 6,321,336 B1 | 11/2001 | Applegate et al. |
| 6,327,594 B1 | 12/2001 | Van Huben et al. |
| 6,327,628 B1 | 12/2001 | Anuff et al. |
| 6,339,826 B2 | 1/2002 | Hayes et al. |
| 6,360,363 B1 | 3/2002 | Moser et al. |

(Continued)

FOREIGN PATENT DOCUMENTS

| | | |
|---|---|---|
| WO | WO 2004/006132 A1 | 1/2004 |
| WO | WO 2004006132 A1 * | 1/2004 |

OTHER PUBLICATIONS

Office Action for U.S. Appl. No. 11/765,375 (Jan. 31, 2011).

(Continued)

*Primary Examiner* — Shin-Hon Chen
(74) *Attorney, Agent, or Firm* — Kilpatrick Townsend & Stockton LLP

(57) ABSTRACT

Roles and policies are used to provide display and access to data in a flexible manner. Users and/or web applications can be mapped to user roles that dictate which displays or other application resources are available to the user or application. Roles are assigned to web applications individually, allowing for user roles to be used without requiring an independent mapping of users to roles. In some cases, application roles can be centrally managed, so that presentation systems also avoid the need for an independent mapping of user or application roles.

19 Claims, 19 Drawing Sheets

U.S. PATENT DOCUMENTS

| | | | |
|---|---|---|---|
| 6,385,627 B1 | 5/2002 | Cragun | |
| 6,397,222 B1 | 5/2002 | Zellweger | |
| 6,460,141 B1 | 10/2002 | Olden | |
| 6,477,543 B1 | 11/2002 | Huang et al. | |
| 6,484,261 B1 | 11/2002 | Wiegel | |
| 6,542,993 B1 | 4/2003 | Erfani | |
| 6,574,736 B1 | 6/2003 | Andrews | |
| 6,581,054 B1 | 6/2003 | Bogrett | |
| 6,662,300 B1 | 12/2003 | Peters | |
| 6,697,805 B1 | 2/2004 | Choquier et al. | |
| 6,738,789 B2 | 5/2004 | Multer et al. | |
| 6,757,822 B1 | 6/2004 | Feiertag et al. | |
| 6,769,095 B1 | 7/2004 | Brassard et al. | |
| 6,772,332 B1 | 8/2004 | Boebert et al. | |
| 6,832,313 B1 | 12/2004 | Parker | |
| 6,854,035 B2 | 2/2005 | Dunham et al. | |
| 6,857,012 B2 | 2/2005 | Sim et al. | |
| 6,859,878 B1 | 2/2005 | Kerr et al. | |
| 6,873,988 B2 | 3/2005 | Herrmann et al. | |
| 6,892,307 B1 | 5/2005 | Wood et al. | |
| 6,931,549 B1 | 8/2005 | Ananda | |
| 6,934,934 B1 | 8/2005 | Osborne et al. | |
| 6,944,761 B2 | 9/2005 | Wood et al. | |
| 6,978,379 B1 | 12/2005 | Goh et al. | |
| 7,003,578 B2 | 2/2006 | Kanada et al. | |
| 7,047,522 B1 | 5/2006 | Dixon et al. | |
| 7,093,261 B1 | 8/2006 | Harper et al. | |
| 7,093,283 B1 | 8/2006 | Chen et al. | |
| 7,124,413 B1 | 10/2006 | Klemm et al. | |
| 7,185,192 B1 | 2/2007 | Kahn | |
| 7,219,140 B2 | 5/2007 | Marl et al. | |
| 7,272,625 B1 | 9/2007 | Hannel et al. | |
| 7,475,146 B2 * | 1/2009 | Bazot et al. | 709/227 |
| 7,861,289 B2 | 12/2010 | Meyer et al. | |
| 7,861,290 B2 | 12/2010 | Meyer et al. | |
| 7,865,943 B2 | 1/2011 | Hayler et al. | |
| 7,886,352 B2 | 2/2011 | Pandrangi et al. | |
| 7,904,953 B2 | 3/2011 | Meyer et al. | |
| 2001/0039586 A1 | 11/2001 | Primak et al. | |
| 2001/0044893 A1 | 11/2001 | Skemer | |
| 2001/0047485 A1 | 11/2001 | Brown et al. | |
| 2002/0107920 A1 | 8/2002 | Hotti | |
| 2002/0169893 A1 | 11/2002 | Chen et al. | |
| 2002/0178119 A1 | 11/2002 | Griffin et al. | |
| 2002/0188869 A1 | 12/2002 | Patrick | |
| 2003/0046576 A1 | 3/2003 | High et al. | |
| 2003/0069874 A1 | 4/2003 | Hertzog et al. | |
| 2003/0078959 A1 | 4/2003 | Yeung et al. | |
| 2003/0110448 A1 | 6/2003 | Haut et al. | |
| 2003/0126464 A1 | 7/2003 | McDaniel et al. | |
| 2003/0146937 A1 | 8/2003 | Lee | |
| 2003/0167455 A1 | 9/2003 | Iborra et al. | |
| 2003/0200350 A1 | 10/2003 | Kumar et al. | |
| 2004/0024812 A1 | 2/2004 | Park et al. | |
| 2004/0117493 A1 | 6/2004 | Bazot | |
| 2004/0162905 A1 | 8/2004 | Griffin et al. | |
| 2004/0215650 A1 | 10/2004 | Shaji et al. | |
| 2004/0250118 A1 * | 12/2004 | Andreev et al. | 713/201 |
| 2005/0021656 A1 | 1/2005 | Callegari | |
| 2005/0246338 A1 | 11/2005 | Bird | |
| 2005/0256894 A1 | 11/2005 | Talanis et al. | |
| 2005/0257267 A1 | 11/2005 | Williams et al. | |
| 2006/0167858 A1 | 7/2006 | Dennis et al. | |
| 2006/0280191 A1 | 12/2006 | Nishida et al. | |
| 2007/0056026 A1 | 3/2007 | Britton et al. | |
| 2007/0240063 A1 * | 10/2007 | Cheng et al. | 715/741 |
| 2008/0250388 A1 | 10/2008 | Meyer et al. | |

OTHER PUBLICATIONS

"USData Centers Chooses Baltimore SelectAccess to Enable Next Generation Security Solutions for eBusiness", Business Wire, 2 pages (Apr. 4, 2001).

Bertino et al., "TRBAC: A Temporal Role-Based Access Control Model", ACM Transactions on Information and System Security, 4(3):191-223 (Aug. 2001).

Covington, et al., "Securing Context-Aware Applications Using Environment Roles", ACM workshop on Role Based Access Control, Proceedings of the Sixth ACM Symposium on Access Control Models and Technologies, 11 pages, (2001).

Georgiadis, et al., "Flexible Team-Based Access Control Using Contexts", ACM workshop on Role Based Access Control, Proceedings of the Sixth ACM Symposium on Access Control Models and Technologies, 7 pages, (2001).

Goh, "Towards a More Complete Model of Role", Symposium on Access Control Models and Technologies, Proceedings of the third ACM workshop on Role-Based Access Control, 7 pages, (1998).

Hayton, et al. "Access Control in an Open Distributed Environment", 12 pages, (1998).

Koved, et al., "Security Challenges for Enterprise Java in an E-Business Environment", IBM Systems Journal, 40(1):130-152, (Jan. 2001).

Koved, et al.,"Security Challenges for Enterprise Java in an E-Business Environment", IBM Systems Journal, (Jan. 2001) retrieved from: http://portal.acm.org/citation.cfm?id=1011436, p. 1, last visited: Oct. 24, 2007.

Microsoft, "Microsoft Windows XP Professional", copyright 1981-2001, 3 pages.

Sandhu, et al., "Role-Based Access Control Models", IEEE Computer, 29(2):38-47 (Feb. 1996).

Tzelepi, et al., "A Flexible Content and Context-Based Access Control Model for Multimedia Medical Image Database Systems", International Multimedia Conference, Proceedings of the 2001 workshop on Multimedia and security: new challenges, 4 pages, (2001).

Yao, et al., "A Model of OASIS Role-Based Access Control and its Support for Active Security", ACM workshop on Role Based Access Control, Proceedings of the Sixth ACM Symposium on Access Control Models and Technologies, 11 pages, (2001).

* cited by examiner

FIG. 14

USER ROLE MAPPING IN WEB APPLICATIONS

CLAIM OF PRIORITY

This application is a continuation of U.S. patent application Ser. No. 11/917,764 filed on Nov. 2, 2010, which is a continuation of U.S. patent application Ser. No. 11/765,303 filed on Jun. 19, 2007, which claims priority to U.S. Provisional Application No. 60/826,633 filed on Sep. 22, 2006 and to U.S. Provisional Application No. 60/883,398 filed on Jan. 4, 2007, all of which are hereby incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Web applications have become increasingly popular within the enterprise as a result of their flexibility of deployment and their relatively intuitive interfaces, but web applications present potential problems in the enterprise environment due to security and governance issues.

BRIEF DESCRIPTION OF THE DRAWINGS

FIG. 14 shows an exemplary product UI catalog.

DETAILED DESCRIPTION

Some embodiments of the present invention may be useful in reverse proxy and Single Sign On (SSO) environments.

Figure 1:
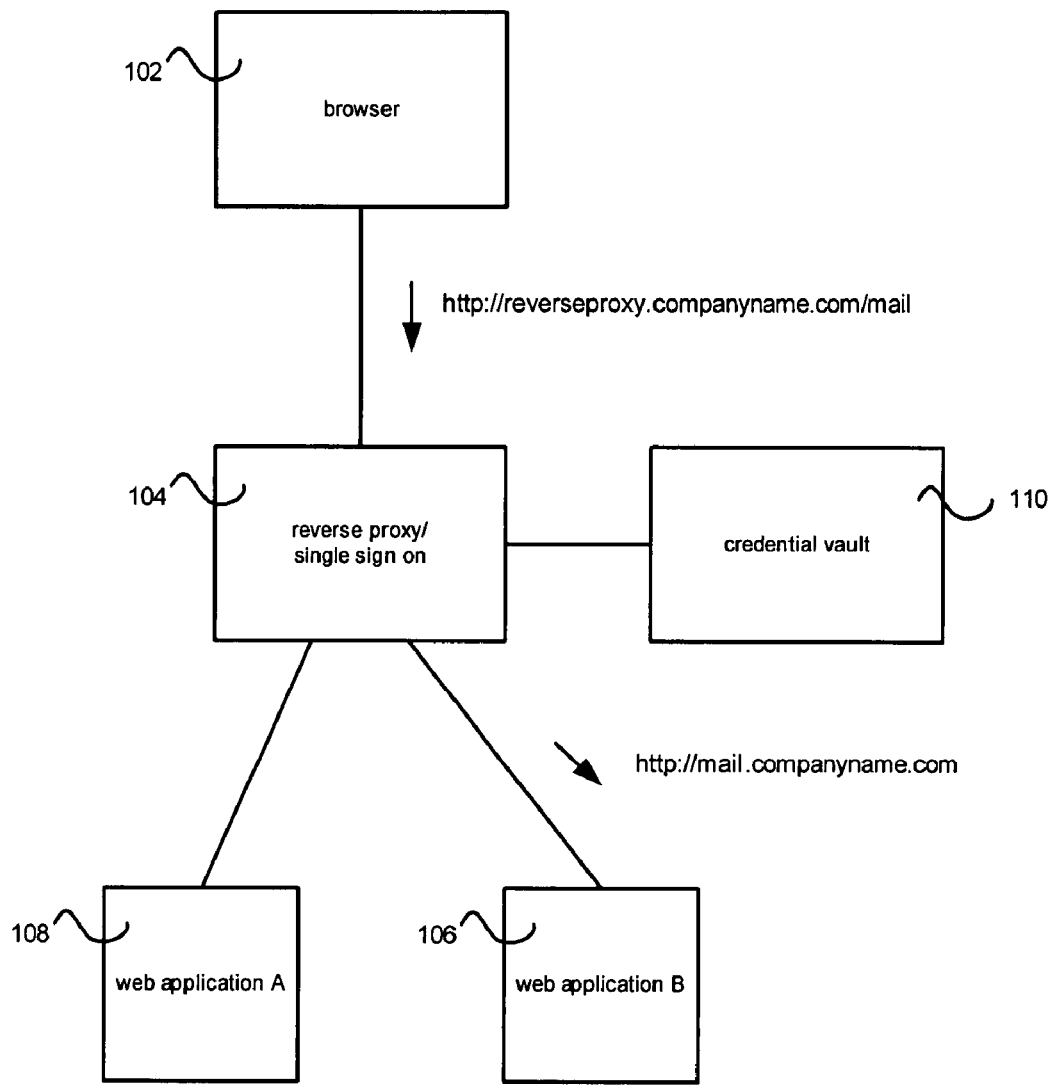
FIG. 1 illustrates a reverse proxy system of one embodiment.

FIG. 1 shows an exemplary reverse proxy, single-sign-on environment. A user browser 102 can access functionality through the reverse proxy 104. In the example of FIG. 1, a request for "http://reverseproxy.companyname.com/mail" is sent to the reverse proxy 104 and mapped to a resource 106 at "http://mail.companyname.com". In one embodiment, the reverse proxy 104 can be set up to access the web application instances 106 and 108.

For purposes of this application a reverse proxy can be any system that can do such a reverse mapping. In one embodiment, a reverse proxy is a server that proxies content from a remote web application to an end-user and may or may not modify that content.

No additional or supplemental functionality, such as SSO, should be imputed to the meaning of the term "Reverse Proxy" or "Proxy".

Supplemental functionalities can include authentication to determine who the user is; authorization to determine if the user has access to the requested resources; transformation functionality to use tags to combine data from different applications, such as web applications and/or rewrite URLs within a response to point to the reverse proxy 104. The functionality can also include gathering analytics and auditing data.

Authentications and authorizations can be part of a SSO system such that all requests through the reverse proxy 104 only require a single sign on.

Authorization can be done by having the reverse proxy 104 handle the mapping of users for a web application to roles. In one embodiment, the web applications can use different roles while the mapping of users to user can be controlled by the reverse proxy 104.

In one embodiment, different types of authentication can be ranked in order of security. The authentication can be used to access the application if the SSO authentication has a security authorization at or above that required by the application.

The use of a reverse proxy can also allow for centralized governance. The reverse proxy can keep a central record of web application usage statistics.

Single sign on can be enabled by having the reverse proxy 104 send credentials (such as user names and passwords) from a credential vault 110 to the application.

In an exemplary case, the rewriting of URLs can be done by checking the URL for a prefix mapped by the reverse proxy and then converting the prefix to point to the reverse proxy. For example, "http://mail.companyname.com/billing" can be converted to "http://reverseproxy.companyname.com/mail/billing". Adaptive and pagelet tags are discussed below in more detail and are a way to combine functionality from applications.

Credential Vault

One embodiment of the present invention concerns the control of passwords in a credential vault. For the purpose of this application a credential vault is any storage location for credentials (such as passwords).

It is desirable that any passwords in the credential vault remain secure. For this reason, these passwords can be encrypted.

One embodiment of the present invention comprises encrypting a number of secondary passwords with a primary password. The secondary passwords can be passwords to applications accessed through a reverse proxy. The primary password can be for a single sign on system such as a reverse proxy. The secondary passwords can be stored in a credential vault 202. An encrypted secondary password can be decrypted from the credential vault using the primary password and provided to an application.

The primary password can be a password to a reverse proxy system or SSO system. The secondary passwords can be passwords to remote web applications. The secondary passwords can be encrypted with a function, such as a hash, of the primary password. A fixed string can be encrypted and stored in the credential vault in the same manner. This encrypted fixed string can be used to test to see if the primary password has changed since the secondary passwords and fixed string have been encrypted. The user can be prompted to input the new and old primary passwords, if the primary password has been changed. The secondary password can be decrypted using the old primary password and reencrypted using the new primary password.

Figure 2A:
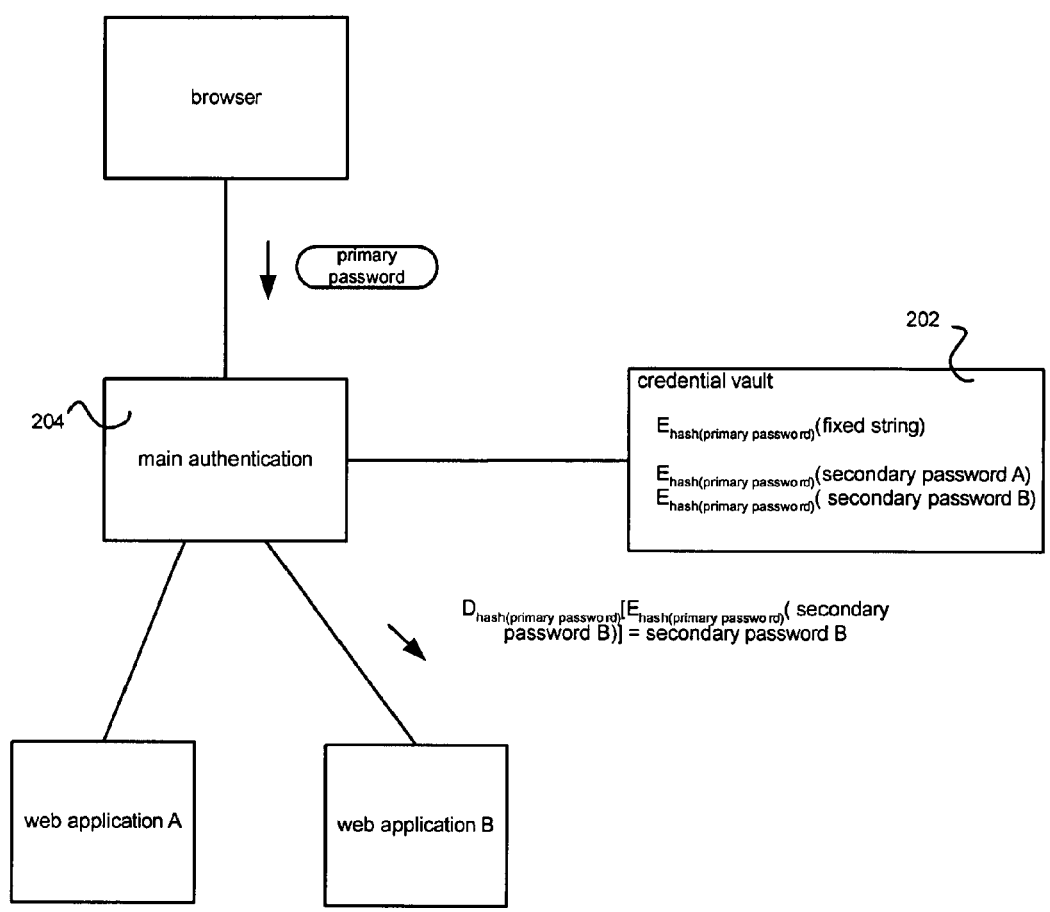
FIGS. 2A-2B illustrates a method of encrypting a credential vault.

FIG. 2A shows an example wherein a primary password 201 is used by a main authentication component 204 to authorize a user. The primary password 201 can be used to encrypt the secondary passwords stored in the credential vault. For example, an encrypted password can be given by:

$$E_{hash(primary\ password)}(\text{secondary password})$$

and the secondary password can be reconstructed using:

$$D_{hash(primary\ password)}\ [E_{hash(primary\ password)}(\text{secondary password})]$$

Where $E_x(y)$ is the encryption of y using key x, and $D_x(y)$ is the decryption of y using key x. The key can be a hash, or any other function, of the primary password. Any type of encryption can be used.

Figure 2B:
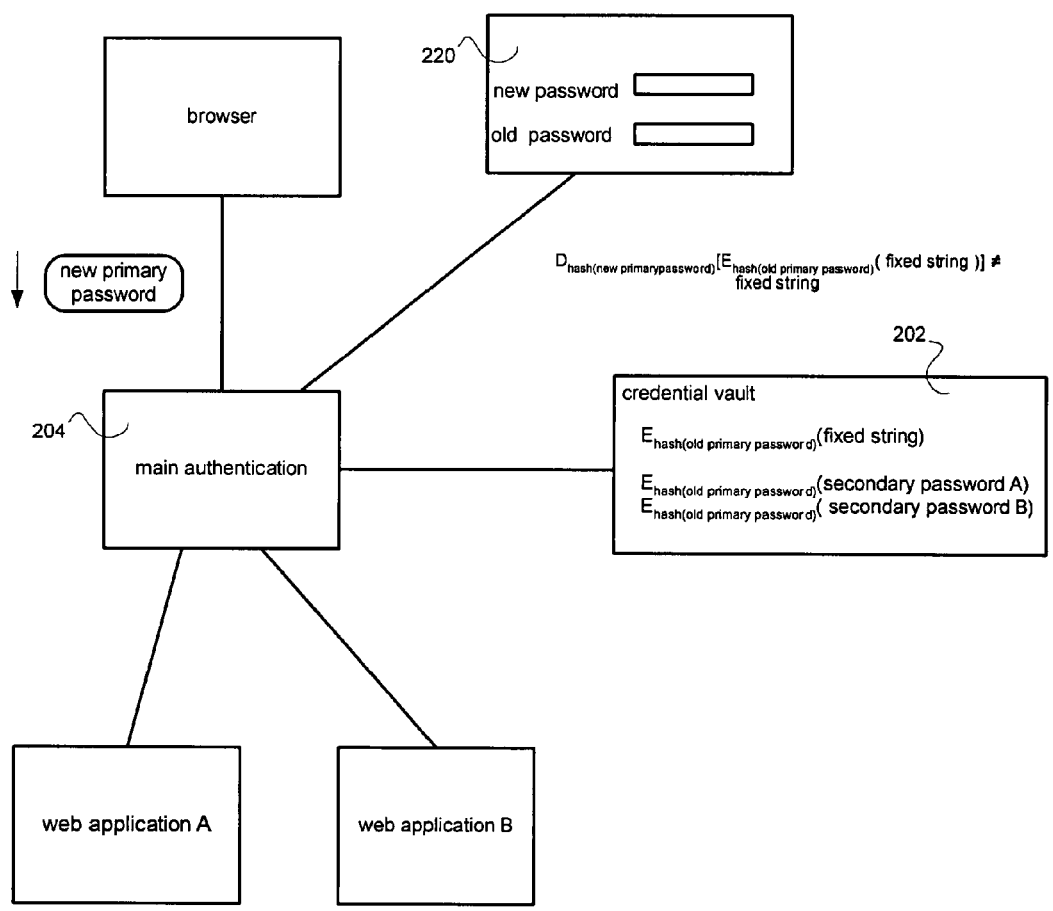

FIG. 2B shows the example when the primary password has changed. In that case:

$$D_{hash(new\ primary\ password)}\ [E_{hash(old\ primary\ password)}(\text{secondary password})] \neq \text{secondary password}$$

To avoid sending the wrong secondary password to an application a known string can be encrypted and a test can be done, If:

$$D_{hash(new\ primary\ password)}\ [E_{hash(old\ primary\ password)}(\text{known string})] \neq \text{known string}$$

Then the user can be prompted to input the old and new password with a page 220. The encrypted secondary passwords can then be decrypted with the old primary password then re-encrypted with the new password.

This system avoids the problems of an admin user easily decrypting the credentials of a user. Anything that the system knows, the admin user will generally be able to know as well. For example, if the security system is configured to mutate all stored passwords with the same key, an admin user, who has access to the box running the security system, can decompile the program and figure out the encryption method. The admin user can then apply that decryption method to every password in the credential vault.

Since the credential vault password is encrypted with a user's password or a hash of the password, an admin won't have access to a way to decrypt the secondary password. If a user's primary password changes, all credential vault passwords are no longer retrievable.

In one embodiment, whenever a user enters a password into an Authenticator, the Authenticator can pass the password to Security Service for validation. The Security Service can use this password (or a one way hash of this password) to encrypt any passwords that get stored in the credential vault. The user's password can be a symmetric key which need not be persisted anywhere.

The user's password can also be used to encrypt a static string, such as "BOJAMBLES", which is known to Security Service. This encrypted String can be persisted to the database.

| Id | encrypted("BOJAMBLES)" |
|---|---|
| User1 | asdkfjlasdkfjalsdkjfklasdjflksdjf |
| User2 | sdfsjkl23jkl23jkl |

The next time the user logs in to the reverse proxy server, this password can again be sent to Security Service. If Security Service can log in to the back-end repository with this password, it can do another check. Security Service can use the latest sent password to decrypt the BOJAMBLES string. If the decrypted value is indeed BOJAMBLES, Security Service knows that the user's password has not changed. The security service can now use this password to decrypt every password in User1's credential vault using the last sent password. User1 now has access to all his credential vault passwords for auto-login with backend apps.

Assume User1 now changes his password to POKEMONRULEZ.

User1 now tries to access a resource and the reverse proxy server can ask for a login (assuming session expired after password change). User1 now logs on with the new password. This password gets sent to Security Service. It can validate the password with a back-end repository, then it can attempt to decrypt BOJAMBLES with POKEMONRULEZ. The security service can then realize that the user's password has changed. The security service can then let the reverse proxy system know that the user's password has changed.

The reverse proxy system can then display a page to the user. This page can say something like: "the security service has detected that your password has changed recently. In order to re-encrypt your credentials, please enter both your new and old password. Otherwise, the security service cannot be able to re-encrypt your credentials and you can be forced to relogin to all your applications".

If User1 is able to recall his previous password and enters it in to the form, the reverse proxy system can send the two passwords back to the security service. The security service can now be able to decrypt BOJAMBLES with the old password. Once that is validated, the security service can decrypt all of the user's credentials in the vault. The security service can then re-encrypt those passwords with the new password, and also re-encrypt BOJAMBLES with the new password.

Credential acquisition can also be an important part of the credential vault. If a user logs in to the remote web application, we can acquire their password and store it in the credential vault.

Role Abstraction

Roles and policies can allow the display and access to data in a flexible manner. Users can be mapped to roles and policies to indicate whether users (as a result of one of these roles) have access to a display or other application resource. A description of one system using roles and policies is given in the U.S. patent "System and Method for Maintaining Security in a Distributed Computer Environment" U.S. Pat. No. 6,158, 010 which is incorporated hereby reference.

Requiring each web application to implement roles and policies can complicate the development of these web applications. One embodiment of the present invention is a way for web applications to use roles without doing the mapping of users to those roles.

Figure 3A:
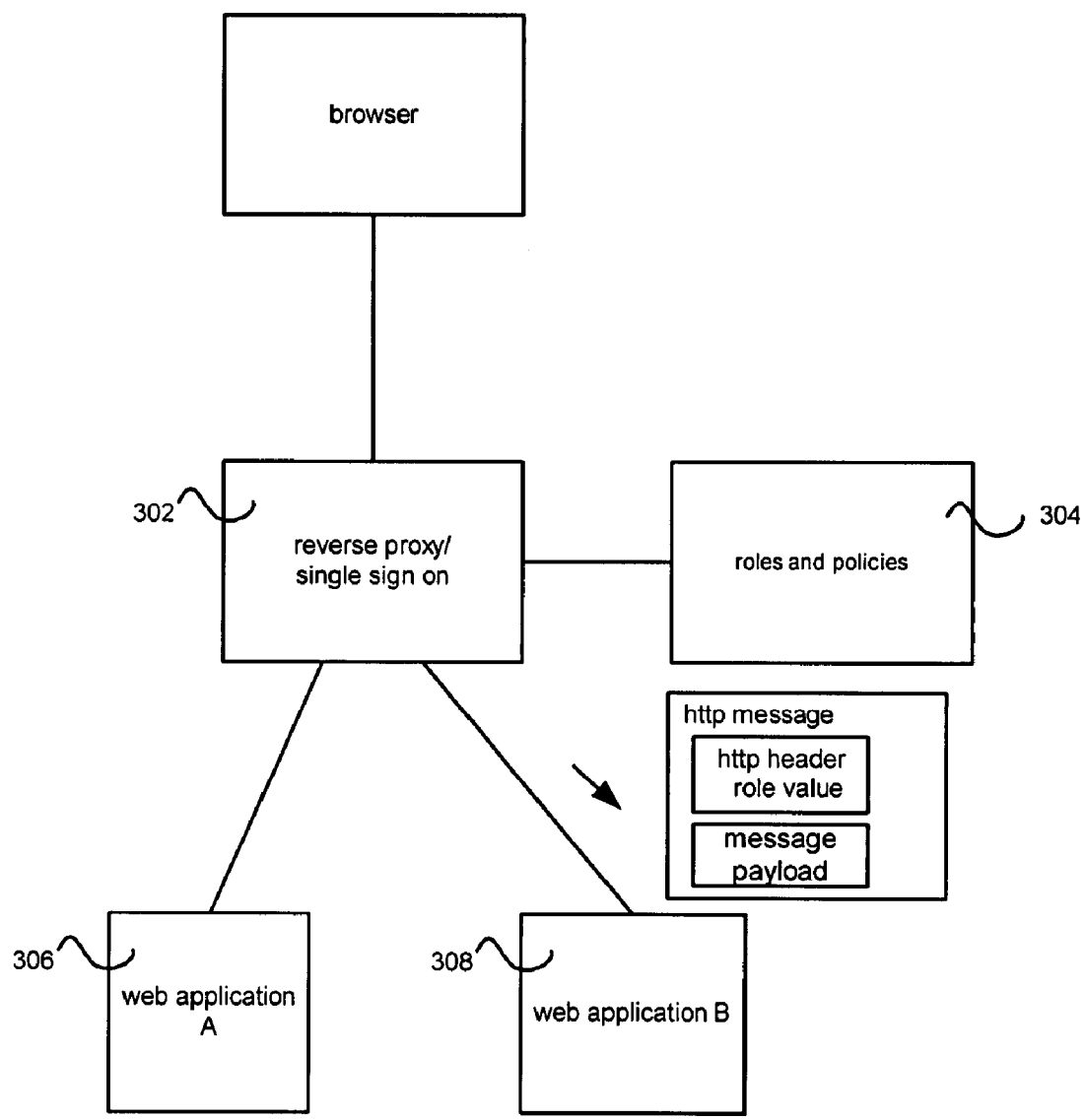
FIGS. 3A-3B illustrates a role abstraction system.

As shown in FIG. 3A, a reverse proxy 302 can maintain role mappings and policies for a web application in a central store 304. The web applications 306 and 308 can be written such that certain roles are defined for the web application.

One embodiment of the present invention is a method comprising maintaining a central store 304 of application role mappings at a reverse proxy server 302; receiving a request for a web application at the reverse proxy server (such as from browser 310); determining the proper user role for the web application at the reverse proxy server 302; and sending the proper user role as part of a HTTP header 312 to the web application 308.

The web application 308 can use the user role without doing an independent mapping of the user to a role. The reverse proxy server can interrogate the web application to determine the set of roles used by the web application. The reverse proxy server can implement policies to determine a user's access to the web application. As described in more detail below, code for the web application can include a tag to cause the reverse proxy system to insert a second web application into the displayed page. This second web application can use independent user roles. The reverse proxy server 302 can look up roles for multiple web applications that are combined into a single presentation to the user.

Administrators can specify which roles the web application support in the administration UI.

Figure 3B:
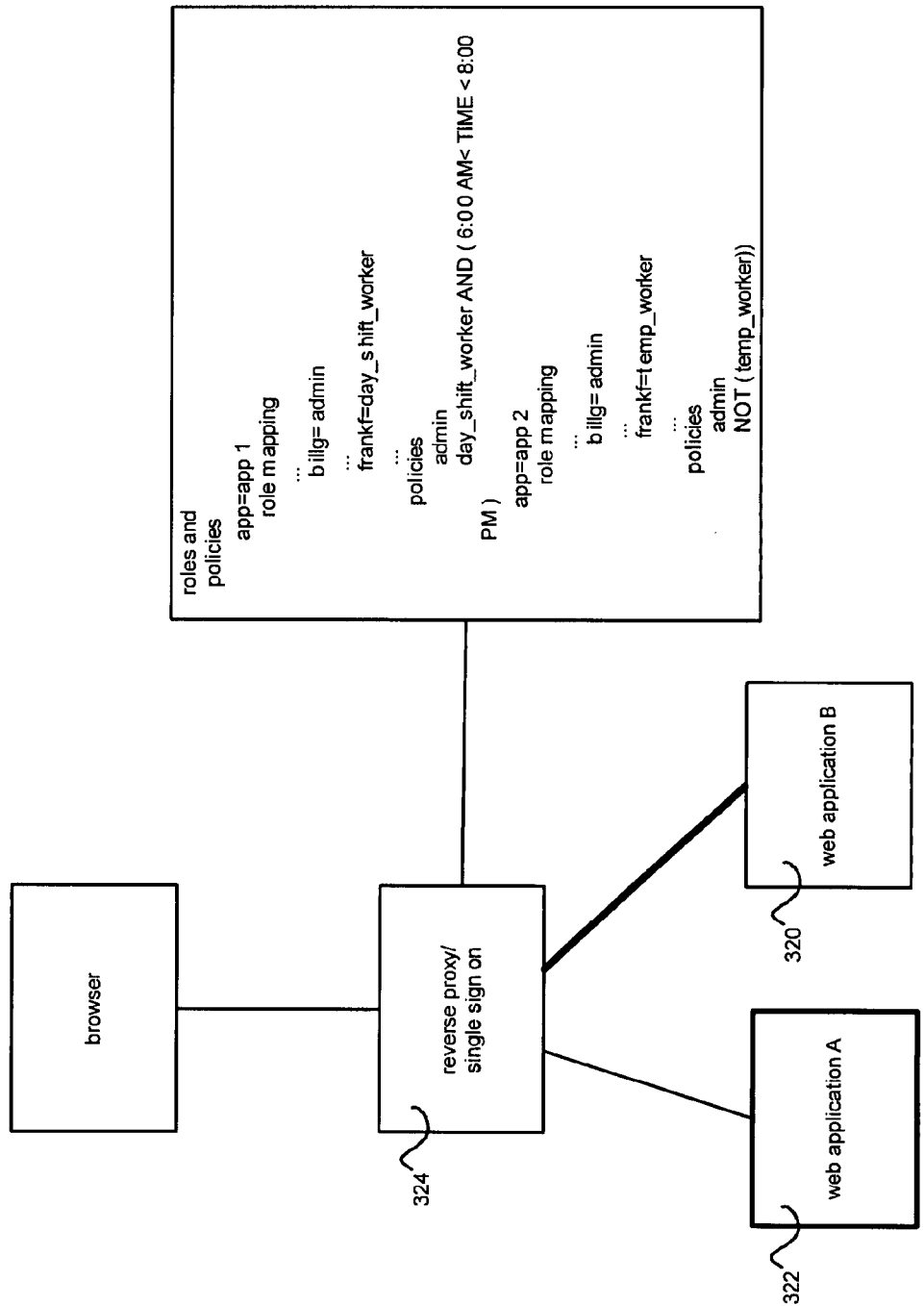

FIG. 3B shows an example where a user "FrankF" can access a web application 325 only within a specified time period as a result of a mapped role and policy for application 320. The role mapping and policies for "FrankF" can be different for web application 322 than for web application 320 and this can be managed at the reverse proxy server 302.

In one case, the web application 320 can include a pagelet tag (described below) that cause the proxy server 324 to insert a display from web application 322 into the display for web application 320.

In one embodiment if a user, such as "FrankF", is unable to access the web application 322 independent of web application 320, the pagelet will not be displayed to the user.

Pagelets and Adaptive Tags

Pagelets can be comparable to portlets in that they both contain user interfaces (UIs) that can be displayed in more than one consuming application. But, in one embodiment, there are significant differences.

Portlets can only be displayed in one type of consuming application—a portal. In fact, most portlets are written using proprietary code which requires that they be consumed in a particular vendor's portal. Pagelets, on the other hand, are a much more general technology. Any application when viewed using the runner reverse-proxy can consume any pagelet.

Portlets often require that the consuming application be written in the same language or on the same platform as the portlet. Pagelets can be invoked using XML, a language and platform independent standard, so pagelets and their consumers can be written in different languages and on different platforms.

Portlets, because of their link to portals, assume a specific environment for resolving security and role questions. Pagelets can generalize the functionality, so that security and roles can be customized for any environment.

Portlets, again due to their link to portals, assume a specific UI paradigm (e.g. view modes). Pagelets require no such constraints. Any standard web technology (i.e. any technology supported by web browsers) can be used to generate any type of UI and that UI will be rendered in the consuming application.

Figure 4A:
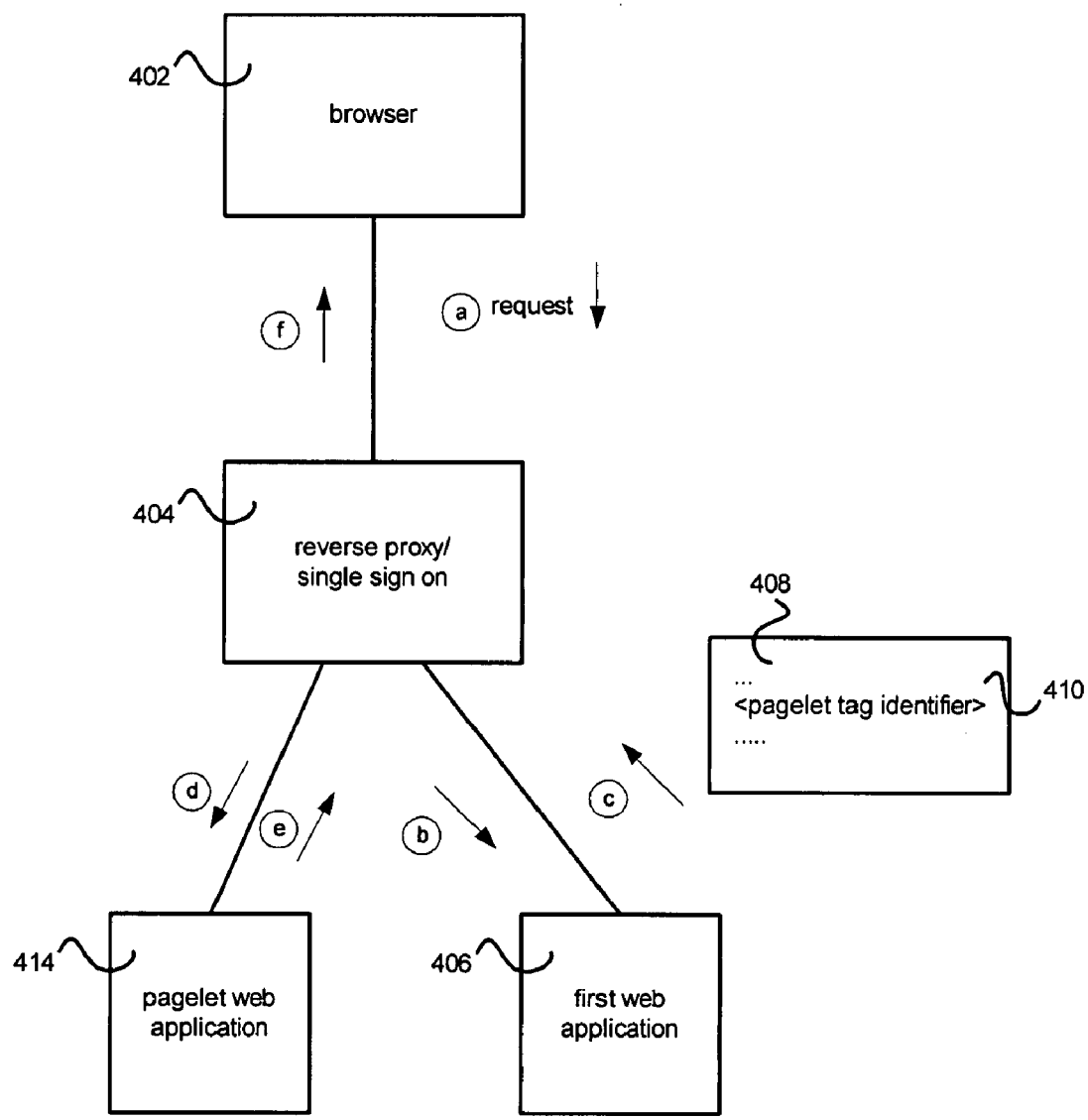
FIG. 4A illustrates the use of pagelet tags.

FIG. 4A shows an exemplary system using pagelet tags. The browser 402 provides a request to the reverse proxy system 404 in step A. The reverse proxy system 404 can check for authorization based on Roles and Policies as discussed below. Assuming these are good, the request can be rerouted to a web application 406 in step B. The first web application 406 can respond with code 408 that includes a pagelet tag 410 in step C. The reverse proxy system 404 can determine the pagelet web application 414 based on the pagelet tag 410. Assuming that the authorization from the user is good, the pagelet code can be requested in step D and the pagelet code can be returned in step E. The pagelet can be added into a first web application page as a combined presentation and provided to the browser in step F. URLs in the combined presentation can be modified to point to the reverse proxy system.

The user roles can be sent to the web applications in an HTTP header so that the web application need not do an independent mapping of the user to a role. The tags can include a namespace and ID.

One embodiment of the present invention comprises determining a pagelet web application from a tag in a first web application and inserting the pagelet web application into the display of a page of the first web application.

A reverse proxy server adapted to receive user request for web application can obtain web application code for the first web application and interpret a tag in the first web application to indicate a pagelet web application. Pagelet web application code, from the pagelet web application and web application code, from the first web application, can be mereged and a combined presentation can be provided.

Non-Invasive Insertion of Pagelets

One embodiment of the present invention is a non-invasive way to insert pagelets into a web page. In some cases, it is desired to not modify the source code of a web page using pagelet tags. For example, the web application may be obtained from a third party or it would be otherwise undesirable or difficult to modify the web application code. In this embodiment, a proxy, such as a reverse proxy, can search for an identifier, such as a name or a code pattern, in the web page and then use this identifier to determine whether to insert the pagelet.

Figure 4B:
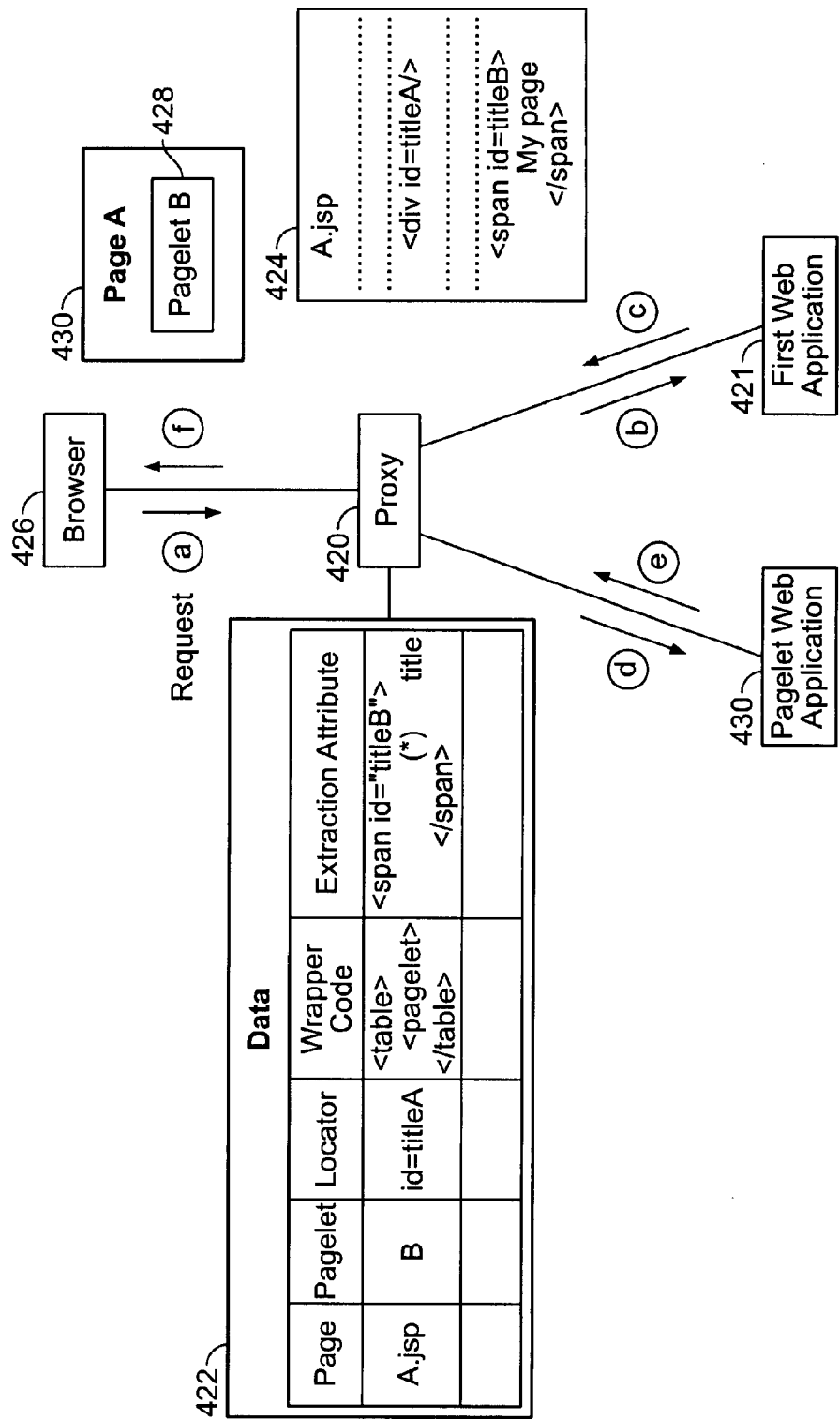
FIG. 4B illustrates a non-invasive way to insert a pagelet that does not use pagelet tags.

FIG. 4B shows one example of a non-invasive pagelet insertion method. In this example, proxy 420 keeps a table 422, or other data structure, that indicates what web page(s) a pagelet is to be inserted into. The table 422 can include an indication of the page that the pagelet is to be inserted into and an indication of the pagelet to be inserted.

In the example of FIG. 4B, the table 422 indicates page "A.JSP" and pagelet "B". When page "A.JSP" 424 is obtained by the proxy 420 from source 421 to send to a browser 426, pagelet "B" 428 can be inserted into the displayed page 430.

The table 422 can also include a location indicator that can indicate to proxy 420 where in the web page to insert the pagelet.

The indication of page and location can be by pattern matching. For example, a search string can be indicated and each page with the string can have the pagelet inserted. In one embodiment, the web page indication can use Boolean operators such as "AND" and "OR".

Optionally, the table 422 can indicate wrapper code for the pagelet. In the example of FIG. 4B, the wrapper code indicates that the pagelet is to be inserted into a table on the web page. The use of wrapper code can help the pagelet be used in different display contexts.

The table 422 can also optionally include attributes that are to be obtained from the page and provided to the pagelet. In the example of FIG. 4B, the attribute is a title that is obtained from the web page and provided to the pagelet for display. This example shows extraction info and attribute name. The string indicated by the extraction info on the web page is given the value indicated by the attribute and then given to the pagelet. More than one attribute/extraction pair can be used to provide attributes to a single pagelet.

Looking at FIG. 4B, in one embodiment, in step A, a request is received at proxy 420 for the first web application. The proxy 420 gets the web application code from the first web application 421 in steps B and C. The proxy 420 can then use the data 422 to determine whether a pagelet is to be inserted.

In the example of FIG. 4B, web page code 424 is a page that a pagelet is to be inserted into. In steps D and C, the pagelet is obtained from pagelet web application 430. In step E, the pagelet 428 (pagelet B) is inserted into page 430 (Page A) to produce a combined application that is sent to the browser 426.

One embodiment of the present invention comprises determining a pagelet web application by recognizing a particular page in a first web application to indicate a pagelet web application and inserting the pagelet web application into a pre-configured section of a page of the first web application. The first web application page and the location to insert the pagelet web application can be determined either programatically or by specifying a specific page or location directly. This embodiment allows a pagelet web application code to be inserted into a first web application, where the first web application code has not been modified prior to the first web application being proxied.

Interstitial Pages

Figure 5:
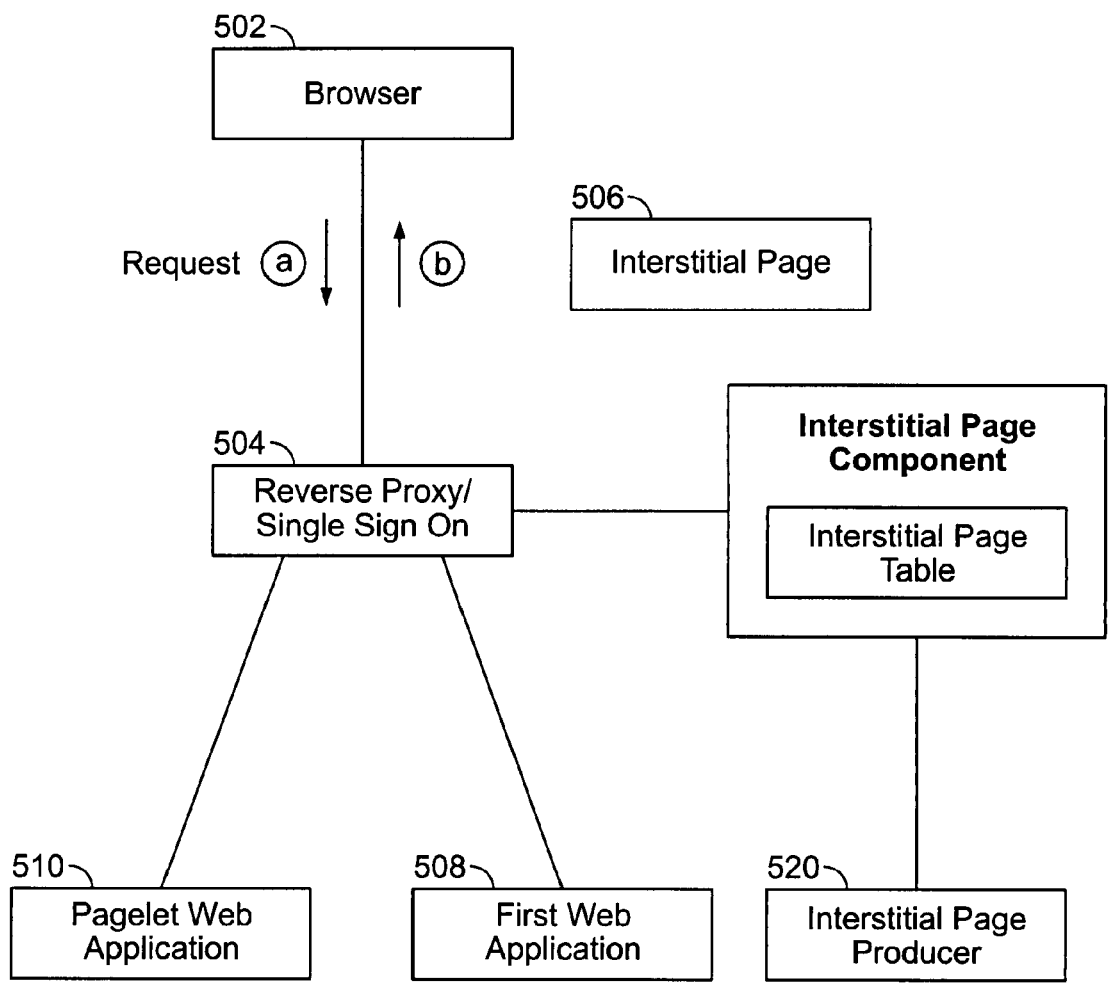
FIG. 5 illustrates the use of interstitial pages.
Figure 6:
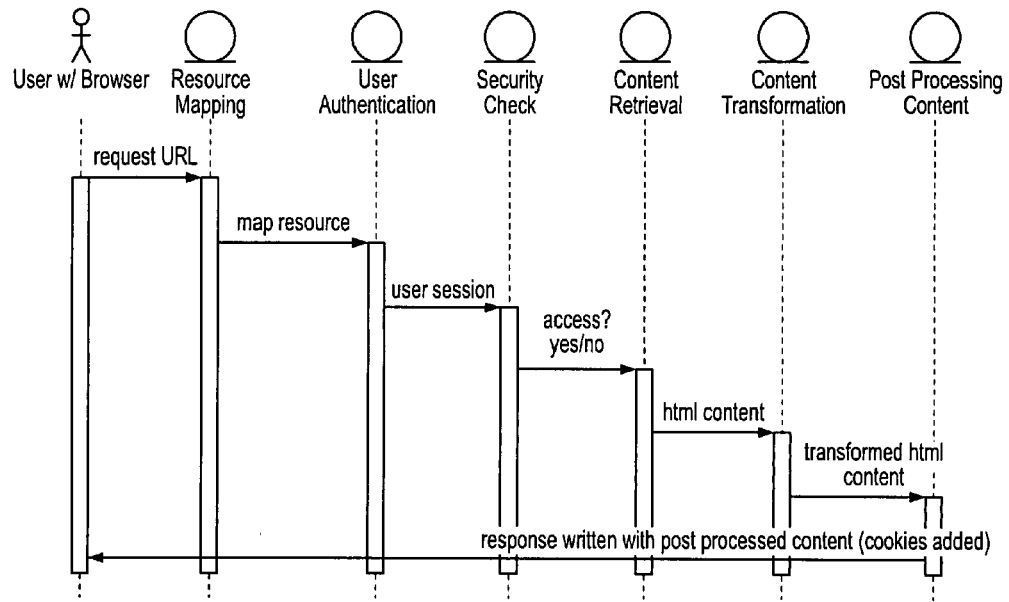
FIG. 6 illustrates request/response management.
Figure 7:
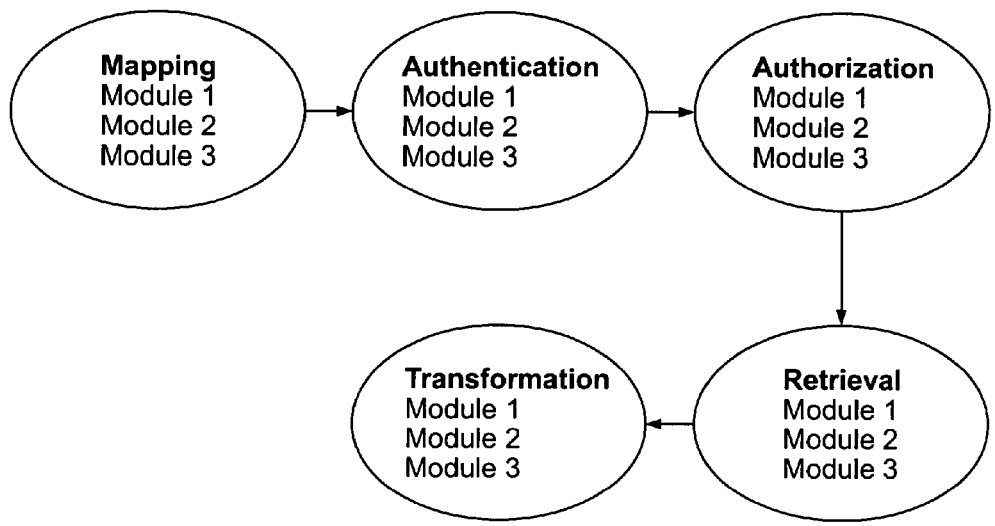
FIG. 7 shows an exemplary module system.

FIG. 5 shows an example of an interstitial page system. In this example, a request from browser 502 is received by reverse proxy 504 in step A. The reverse proxy server checks to see if the requested URL is associated with an interstitial page. If so, in step B, the interstitial page 506 is provided to the browser without needing to access web applications 508 and 510.

A reverse proxy server can produce interstitial pages to the user. The interstitial pages need not be generated with the web application code.

The reverse proxy can block access to the web application until the specified interstitial pages have been processed.

In one embodiment, the interstitial page HTML can comes from a separate web application. This allows you to write one web application that can provide interstitial pages to many web applications. Alternately, there can be different interstitial pages for different web applications.

In addition, while interstitial pages usually come before you can access the web application, they can come at different points in the login cycle. Interstitial pages can be provided before logging in, and after logging in, in any combination.

Different interstitial pages can be used for different resources, users, or other conditions.

In one embodiment, at least one interstitial page is used to receive a user password as a warning page and/or a license agreement page. The interstitial page can include user info. In one embodiment, the user need not be signed in to receive the interstitial pages.

Exemplary Embodiment

An exemplary embodiment of a system using methods of the present invention is described below. The following exemplary embodiment is not meant to be limiting as to terms, definitions and the like. For example, language in this section is not intended to limit or define the claim terms but only to describe how the components work in the particular exemplary embodiment. This section merely describes one exemplary way to implement the present invention. Other architectures implementing the methods and systems of the present invention can be done.

In one embodiment, Pagelets can be composed of two basic parts: a front-end pagelet tag and a Pagelet Engine. The pagelet tag can be used to insert a pagelet into HTML. The pagelet tag can then replaced by a reverse proxy server with the content of the pagelet. The Pagelet Engine can be a massively parallel pagelet processing engine that is used to retrieve multiple pagelets from back end resources simultaneously.

Pagelet configuration information can be persisted in an IPersistentPagelet interface.

The Pagelet Tag can be a simple tag that can allow one to specify the pagelet ID and include data to be passed to the pagelet. In one embodiment, there can be two kinds of data passed to the pagelet. The first is tag attributes, and the second is an XML payload. Standard xhtml tag attributes in the pagelet tag (i.e. not pt: attributes) can be passed to the pagelet directly. The XML payload can allow the HTML author of the consuming page to include more complicated data to be passed to the pagelet.

An exemplary pagelet tag can look like this:

```
< pt:ensemble.inject pt:name="al-collab:discussion"discussionid="21">
    <discussion>
        <expandedmessages>
            <messageid>27<messageid>
            <messageid>36<messageid>
            <messageid>144<messageid>
        </expandedmessages>
        <currentmessage>
    <messageid>27</messageid>
        </currentmessageid>
    </discussion>
</pt:ensemble.inject
```

Pagelets can be identified by a unique combination of namespace and pagelet name. These values can be constant when pagelets are migrated or moved to different servers. Pagelet names can be unique within a namespace. Namespaces are also known as Pagelet Libraries. Namespaces and pagelets can be concatenated together separated by a colon to provide a unique reference to a pagelet (i.e. financeapp:myvacationhours).

The namespace can be any text string, such as "financeapp" or "Urn://www.mycomp.com/apps/finance". The namespace can be a part of the pagelet. Namespaces need not be required to be between parent resources as customers may have several near-identical resources that differ only in security that each contains different, but related pagelets from the same back-end resource or multiple back-end resources. This can require a check for pagelet uniqueness within a namespace whenever new pagelets are created or pagelet namespaces are edited.

A Pagelet Engine can allow the pagelet system to retrieve multiple pagelets simultaneously. In order to retrieve content, a client component can create a Request Chain composed of individual Requests. Each request can contain all of the information necessary to retrieve a single pagelet. This information can include the ID of the pagelet, the back-end resource URL, the pagelet attributes, and the XML payload.

The Request Chain can then send off multiple HTTP requests to retrieve the data, and the data can be available to the client component after all requests have returned or timed out. The data can then be transformed and converted into a Markup Array.

The Pagelet Request Flow can involve two passes through the HTML data. The first pass can collect the pagelet data and initiate content retrieval, while the second pass can convert the standard Adaptive Tags and replace the pagelet tags with the pagelet data.
1. User requests page from the Reverse Proxy Server.
2. The Reverse Proxy Server can retrieve main page content from remote server.
3. Transformer can converts HTML into markup fragments.
4. 1$^{st}$ pass through markup fragments can be done to convert URLs and retrieve pagelets and pagelet data.
5. Pagelet security can be checked
6. A Request Chain can be initiated for all the pagelets simultaneously and wait until all pagelet content is retrieved.
7. Return content can be processed for login pages.
8. Returned content can be processed for Adaptive Tags in individual tag engines.
9. Adaptive Tags in the main page can be processed. Individual pagelet tags can insert the processed pagelet content into the HTML output.
10. Transformed and processed HTML content can be returned to the end user.

In one embodiment, pagelet tags work in place. The pagelet tags can be placed in a DHTML area so they can be refreshed individually. In one embodiment, an HTML page with placeholder data for slow pagelets can be returned. The Request Chain can be stored on the session and have it continue to retrieve the slow data in the background. Then, the end users' browser can initiate an AJAX request to the reverse proxy server for the additional pagelet content, which could then be filled in dynamically. This can mitigate the problem of slow pagelets.

The Reverse Proxy System can manage Primary and Resource Authentication, as well as Primary Authorization. The Reverse Proxy System can determine if this user is logged in to the reverse proxy system using the correct authentication method to see this pagelet, whether this user has permission to use this pagelet, and perform Auto-login to remote pagelet servers.

A login sequence for primary pagelet Authentication/Authorization can look something like this:
1. User requests page containing pagelets.
2. The reverse proxy server checks access on each requested pagelet.
   a. If user is logged in to the resource at the correct authentication level, but still does not have access to a pagelet, that pagelet can be replaced with an "Access Denied" HTML comment.
   b. If user is not logged in to the reverse proxy server, or is logged in at too low an authentication level, add to unauthorized pagelet list.
3. Alternately, the unauthorized pagelets can be replaced with login links to upgrade the user's session to the appropriate level.
   a. Authentication module can determine the highest auth level required by an unauthorized pagelet, and attempt to log the user in using that auth method.
   b. If login is successful, the Authentication Module can redirect the user to the original page.
4. If there are no unauthorized pagelets, retrieve and display the pagelet content.

An auto-login sequence for pagelet remote servers can look something like this:
1. User requests page containing pagelets.
2. The reverse proxy server retrieves content for each requested pagelet.
3. LoginPageDetector is run on each pagelet response.
4. For each pagelet response that contained a login page:
   a. The Auto-login component is used to generate a new pagelet request to handle the login page.
   b. All of the new pagelet requests are sent off in parallel.
   c. Return to step 3 to process responses.
5. Pagelet responses (all non-login pages) are transformed and inserted into the output page.

An auto-login sequence for pagelet remote servers that requires the user to fill out a login form can look something like this:
1. User requests page containing pagelets.
2. The reverse proxy server retrieves content for each requested pagelet.
3. LoginPageDetector is run on each pagelet response.
4. If a previously processed login page is returned (implying that login failed), the current request is stored on the session and the pagelet login page is displayed to the user.
5. The user fills out and posts the form.
6. The credential information is retrieved and stored in the credential vault (if enabled).
7. The user is redirected to the original page.

Remote pagelet data can be checked for login requests by all Auto-login components (i.e. Form, Basic Auth, etc. . . . ).

In one embodiment, there are two main requirements for Pagelet JavaScript and Style Sheets. The first requirement is that there be a way to put JavaScript and Style Sheets into the Head element of the HTML page. The second requirement is that duplicate .js and .css files only be included once per HTML page.

Pagelet developers can mark their JavaScript & style sheet links to be included in the head using a special JavaScript tag (i.e. <pt:common.includeinhead>). Pagelet consumers can then need to include a special Include JavaScript Here tag (i.e. <pt:common.headincludes>) in the Head element of their HTML page. Pagelet JavaScript from the include-in-head tags can then be included in the output of the Head Includes tag. The Includes tag can also filter out duplicate .js and .css files.

The head includes tag can be optional. If the tag is not present, then JavaScript and cascading style sheets can be added at the end of the head tag in the main page. If the main page does not have a head tag, a head tag can be added at the beginning of the page. This can require the Transformer to identify the head element when parsing the page. The head-includes tag can be used when control over the insertion of the pagelet JavaScript and Security Service within the head element is required. There need be no way to specify the order of includes from various pagelets.

The includeinhead tag can work within a pagelet to add Style Sheets and JavaScript to the main page, but it can also be used directly in a main page. In one embodiment, since the includeinhead tag filters Style Sheets & JavaScript file includes to remove duplicates, a main page developer could include their Style Sheets & JavaScript includes in the includeinhead tag, which would ensure that there are no duplicate files included from the pagelet and main page.

In one embodiment, during In-place Refresh, JavaScript and Style Sheets cannot be inserted into the head element, as it has already been displayed. Therefore, the includeinhead tag does not function in in-place refresh pagelets. In order to facilitate building simple in-place refresh pagelets, the includeinhead tag can be ignored during in-place refresh of a pagelet. This means that a pagelet author can use the includeinhead tag to insert JavaScript libraries into the main page the first time the pagelet is displayed on a page, but that the JavaScript libraries can not be re-included during in-place refresh of the pagelet.

In transparent proxy mode, the transformURL function is only be used on pagelet content; general resource content doesn't need it. In non-transparent proxy mode, transformURL function is needed for all Javascript URLs.

If a page requires transformURL function, then the reverse proxy server code can automatically insert to include the transformation Javascript library, as well as an initialization Javascript statement similar to the PTPortlet constructor in portal.

In-place-refresh libraries: by default, pagelet content need not be set to in-place-refresh; by using an inplacerefresh tag, pagelet developers can turn on in-place refresh (IPR). With IPR turned on, all URLs within pagelet content are prefixed with JavaScript which does in-place refresh.

If IPR is not turned on, they can manually insert the inplacerefresh tag around a URL to transform that URL into in-place-refresh link. (This tag can be applied to URLs in resource content as well).

If a resource content page uses in-place refresh (through tags), or has a pagelet inside it which uses in-place refresh, the reverse proxy server can automatically insert the Javascript includes for in-place refresh on the page. Alternatively, the developer can add an inplacerefreshjslibrary tag on a resource or pagelet to make the reverse proxy server insert the in-place refresh libraries. Then the developer can be able to use the .refresh calls that Scripting Framework libraries provide.

In-place refresh Javascript libraries can also contain Javascript Session Prefs functions in them. So if a resource uses session prefs, it can include the inplacerefreshjslibrary tag to tell the reverse proxy server to include in-place refresh Javascript libraries.

Below is a list of exemplary public Javascript functions that Scripting Framework can support for developers:

public static function getPageletByName (namespace, id)
    Returns a single portlet, given a namespace and portlet id (pageletname) NOTE: There is no restriction against having multiple pagelets on the same page which have the same namespace (since you can put the same pagelet on the page more than once), so portlet lookup by name in these cases is not guaranteed.
public static function getPortletByUniqueID(id)
    Returns a single portlet, given a pagelet unique ID which is passed down via CSP.
public static function getSessionPref(name)
    Get a single session pref
public static function getSessionPrefs(names)
    Get multiple session prefs
public static function setSessionPref(name,value)
    Set a single session pref
public static function setSessionPrefs(hash)
    Set multiple session prefs
public function clearEvent(eventName,eventNamespace)
    Clears the event listener for an event public function clearRefreshInterval( )
    Sets the refreshInterval of the portlet to 0 and clears any current refresh timers.
public function deleteSessionPref(name)
    Deletes a single session pref
public function deleteSessionPrefs(array)
    Deletes multiple session prefs
public function formGetRefresh(form)
    Requests updated content from the server by submitting a form GET request
public function formPostRefresh(form)
    Requests updated content from the server by submitting a form POST request
public function formRefresh(form)
    Requests updated content from the server by submitting a form
public function getRefreshInterval( )
    Returns the refreshInterval of the pagelet
public function getRefreshURL( )
    Returns the refresh URL of the pagelet
public function raiseEvent(eventName,eventArgs,eventNamespace)
    Raise a new event
public function refresh(url)
    Refresh the portlet content from the server, using URL if provided
public function refreshOnEvent(eventName,eventNamespace)
    Associate portlet refresh action with a specific event public function
registerForEvent(eventName,eventCallback,eventNamespace)
    Register to be notified of an event
public function setInnerHTML(html)
    Sets the innerHTML of the pagelet from a string
public function setRefreshInterval(refreshInterval,startNewRefreshTimer)
    Sets the refreshInterval of the pagelet
public function setRefreshURL(url)
    Sets the refresh URL of the pagelet
private function PTPagelet(namespace, uniqueid, containerID, refreshURL, refreshInterval)
    Constructor that the reverse proxy server can put in for every pagelet The Javascript library which does only transformation can have the following functions:

private function transformURL(url)
    Transform a URL to be gatewayed private function PTPagelet(pageletid, containerID, remoteRequestURL, remoteBaseURL, resourcePrefixURL, resourceGatewayPrefixURL)

Pagelet discovery can include retrieving a list of available pagelets and the following data about each pagelet:

Pagelet name, description, and HTML sample code
Pagelet parameters (name, description, type, and mandatory)
Pagelet payload XML Schema URL
pagelet meta-data (name value pairs)

Pagelet consumer developers can go to an HTML page to find pagelet information. Pagelet developers/administrators can have the option of removing pagelets from this list. In one embodiment, since consuming resource security checks cannot be handled automatically, the list of allowable consumer resources should be included on the page.

In order to simplify the reverse proxy server server, this UI need not be hosted as part of the reverse proxy server, but should rather be combined with the login server. This can be available through a known URL, which can then be exposed through the reverse proxy server if desired. The reverse proxy server should come with a pre-configured resource that point to this known URL, although by default no one should be able to access the resource.

Accessing the Pagelet Catalog UI need not require the reverse proxy server admin user login, although it can be secured via basic auth with a static user name. This security should be easy to disable. The pre-existing resource can be setup to auto-login using the static user name.

This UI can be a simple set of jsp or jsf pages that access the reverse proxy server database and display the pagelet information. Ideally, this UI can also be available to be copied and hosted on a developer website or other location. However, since the pages can be dynamic, that can require the pages to be crawled or manually saved from a browser. The index links can also need to be rewritten to point to static pages.

The UI can include both dynamic pagelets, and the tag libraries included with the reverse proxy server.

In one embodiment, since performance is not crucial on the admin server, the pages need not be cached and can access the database for every page view.

Pagelets can be discoverable programmatically. This can allow an application (such as Holland) to discover which pagelets are available to the current user. Since pagelet security is enforced programmatically, pagelet developers/administrators need not be able to remove their pagelet from this list (via the Publish checkbox). Since the Pagelet Discovery Client can always be running inside the context of a the reverse proxy server resource, the results can only contain pagelets that can be consumed by the current resource.

A simple Java only API in the client can be provided that can allow an application to query for the available pagelets for the current user in the current request. The API can do automatic filtering of the results based on user access and consuming resource restrictions. The API can also allow filtering of the pagelet results based on other criteria, such as last modified. The queries can return either basic information about the pagelet, such as it's name and description, or full information for the pagelets.

The queries can be processed by a simple the reverse proxy server based web service on the Admin UI box. The web service can require a valid the reverse proxy server security token from the client. The web service can query for the pagelets available to the consuming resource, and then evaluate the Security Service security policies for the pagelet parent resources to see which ones are visible to the user in the current request.

In order to provide the correct security filtering, the current request information (i.e. user, IP, time, etc. . . . ) can be passed by the client to the web service. The EDK on the remote resource should already have all of the request headers and information necessary.

The pagelet information can be published to a secured registry for programmatic discovery and IDE integration.

Pagelet Discovery Web Service APIs can be exposed as a client-side API similar to the Embedded Development Kit (EDK). The client can be Java only and a Java Archive (JAR) can be provided as one of the reverse proxy server build artifacts.

The underlying transport can be done by turning the PageletManager query class into a web service using RAT. The web service can return all query information in a single response, rather than sending individual requests for pieces of data. This means that a pagelet query could theoretically be quite expensive. The best practice for querying can be to query for pagelet info for large numbers of pagelets, and then query for the entire pagelet information for an individual pagelet, or a small number of pagelets.

```
public class PageletManager {
        public IPageletInfoQueryResult QueryPageletInfo(PageletFilter _filter,
            RunnerSecurityContext);
        public  IPageletQueryResult   QueryPagelets(PageletFilter   _filter,
            RunnerSecurityContext);
}
public class RunnerSecurityContext {
    public RunnerSecurityContext(String _IPAddress, int _CurrentResourceID, String
        _RequestURL, OKHTTPHeaders _headers, RunnerSecurityToken, _token);
}
public class PageletFilter {
    public void addSearchProperty(PageletSearchProperty _property, String _value);
    public void addSearchProperty(PageletSearchProperty _property, String[ ] _values);
    public void setResultsRange (int _firstItem, int _lastItem);
}
public enum PageletSearchProperty {
    name, namespace, ID;
}
Public interface IPageletQueryResult {
    public int GetTotalResults( );
}
public interface IPageletQueryResult extends IPageletQueryResult {
    public List<IPagelet> GetPageletResults( );
}
public interface IPageletInfoQueryResult extends IPageletQueryResult {
    public List<IPageletInfo> GetPageletInfoResults( );
}
public interface IPageletInfo {
    public int GetID( );
    public String GetName( );
    public String GetDescription( );
    public String GetNamespace( );
}
public interface IPagelet extends IPageletInfo {
    public string GetCodeSample( );
    public string GetPayloadSchemaURL( );
    public int GetParentResourceID( );
    public boolean GetIsAllowAllConsumers( );
```

```
    public int[ ] GetConsumerResources( );
    public List<IPageletParameter> GetParameters( );
    public Map<String, String> GetMetadata( );
}
public interface IPageletParameter {
    public String GetName( );
    public String GetDescription( );
    public String GetType( );
    public boolean GetIsMandatory( );
}
```

When inserting a pagelet tag into a resource, developers can be able to specify an XML payload within a pagelet tag. That payload can be transferred to the remote tier over HTTP, within the HTTP request for the pagelet content.

The payload can be sent in the body of a POST request—in our opinion, as discussed above, the pros overweigh the cons. Other CSP data can be sent in HTTP headers, as in previous protocols. Non-payload pagelet requests can be sent as GETs; requests with payload can be sent as POSTs.

In order to encourage best practices around pagelets, sample pagelets can demonstrate the following principles/practices:

How to describe how much screen real-estate a pagelet needs, as well as how the pagelet consumer can request the pagelet to display in a certain size.

Skinnable using style sheets and can consume a common set of style classes (possibly based on WSRP/JSR168).

How to include meta-data specifying the URL to an HTML or image prototype to show composite app developers what the pagelets can look like. This prototype can be hosted on the pagelet server.

How to convert simple portlets to pagelets. This sample code can show, among other things, how to deal with portlet/user preferences that are available in portlets but not in pagelets.

The sample pagelet code can look something like the following, although this is not a definition of the IDK API.

```
<%@ page language="java" import="com.plumtree.remote.pagelet.*" %>
<%
// get the pagelet idk
IPageletContext pageletContext = PageletContextFactory.createPageletContext(request,
    response);
IPageletRequest pageletRequest = pageletContext.getRequest( );
String styleSheetOverride = pageletRequest.getPageletAttribute("StyleSheetOverride");
String pageletSize = pageletRequest.getPageletAttribute("RecommendedSize");
// If the pagelet consumer has specified an alternate style sheet, use that
if (null != styleSheetOverride)
{
%>
<pt:common.includeinhead>
<link type="text/css" href="<%=styleSheetOverride%>" rel="StyleSheet"/>
</pt:common.includeinhead>
<%
} else
{
// otherwise use the standard stylesheet
%>
<link type="text/css" href="/styles/mypageletstyles.css" rel="StyleSheet"/>
<%
}
// pagelet content
//get the pagelet/portlet idk
IPortletContext portletContext = PortletContextFactory.createPortletContext(request, response);
IPortletRequest portletRequest = portletContext.getRequest( );
String settingValue = portletRequest.getSettingValue(SettingType.Portlet, "myPageletActionID);
//if the entry has already been set, display it here
if ((null != settingValue) && (myPageletActionID == "2"))
{
%>
<p class="pagelet-notification-text">Pagelet action successfully completed.</p>
<%
}
%>
<p class="pagelet-standard-text">Hello world style override pagelet content.</p>
<%
if ((pageletSize != null) && (pageletSize == "large"))
{
%>
// Display complete data in a table
<%
```

-continued

```
} else {
// If the pagelet is supposed to display in small mode, just display a link to the data
%>
<a class="pagelet-link" href="datalink.html">Click here to view complete data.</a>
```

The pagelet components list can include components that are used exclusively during pagelet processing, as well as other modules that are involved in the pagelet processing lifecycle.

The Tag Engine can process both tags and pagelets. The Tag Engine Module can use the Tag Engine shared component to process the tags, and then processes the pagelets. This module can control the overall pagelet flow, utilize other components, and delegate processing to other modules.

The same retriever can be used both for pagelets and regular resource requests. Retriever can know what type of request it is (through an argument passed to it) and may do some things differently (create multiple parallel requests for pagelets vs. only one for resources; different timeout; pass through different parameters to CSP library, etc).

The reverse proxy server can support CSP features both on resources, and on pagelets. The reverse proxy server can support a subset of the portal's CSP features.

There can be a CSP library (not a module) created which can handle adding/processing of CSP headers. This library can be called by retriever can appropriate arguments.

public void ProcessCSPRequest(IProxyUserSession session, IPTWrappedRequest browserRequest, IOKHttpRequest remoterequest, IRunnerResource resource, ISessionPrefs sessionPrefs, int requestMode, String strConsumingURI, IPagelet pagelet, String strImageserverURI);

public void ProcessCSPResponse(IProxyUserSession session, IOKHttpRequest remoterequest, IRunnerResource resource, ISessionPrefs sessionPrefs, int requestType);

User Info, Roles, user id, user name, login token can be available off IProxyUserSession interface.

Session Prefs can be available from ISessionPrefs interface. IRunnerResource object can contain a list of user info prefs, session prefs, login token sending info to send to remote tier.

ImageserverURI and Comsuming Resource URI (for pagelets only) can be passed into the CSP library by the retriever. CSP libraries can have different modes: regular (resource); pagelet, and in-place-refresh. The mode can be passed in by retriever.

When pagelet data is retrieved from the remote server, it can be checked for login pages. This could happen the first time a remote server is accessed by a particular user, or if the session times out. The Auto-login Module can identify and process remote login pages for a resource, including pagelets.

The Auto-login Module can run during the onTransformContent phase and process all remote responses for login pages. Since pagelet processing essentially duplicates normal page processing many times on a single page, the Auto-login component can be broken out into separate classes so that it can be used by both the Auto-login Module and the Pagelet processor (TagEngine Module). This can include both form based login and basic auth login.

The Auto-login component can be used to check all pagelet responses for login pages. If login pages are detected, the module can be used to generate a login request for the remote resource. This can then be processed using the Retriever. The response can be checked again for login pages and used in place of the original response once the login cycle is finished.

In order to maintain performance, pagelet responses can be checked for login pages, and then all login pages can be processed in parallel. Even though this is done in parallel, the login cycle for each pagelet could comprise multiple pages, which may mean all pagelets would have to wait until the pagelet with the longest login cycle had finished. A pagelet login is expected to be infrequent so this should not affect normal pagelet usage very much.

In addition, if the credential vault is being used and login fails for a pagelet, the Auto-login Component (& Tag Engine) can display the login page to the user so they can login successfully. The Auto-login Component then needs to capture the login information from the user's request, store it in the credential vault, and then process the originally requested page.

The Pagelet Discovery API can be a standalone web service. It can be deployed to the same embedded Tomcat server as the Admin UI and Login Server. There can be a Java-only client similar to the EDK.

The Pagelet Catalog UI can be a simple set of JAVA Server Pages (JPS) Java Server Faces (JSF) pages that display a list of available pagelets and a detail view for pagelet information. This can be setup so it can easily be configured to be either protected by basic auth with a static username/password or unprotected.

The UI can be a combination of static HTML pages generated by our tagdocs utility, and jsp/jsf pages to view the pagelets. The static tagdocs index can be included as a jsp include into the complete index. The PageletListBean and the PageletViewBean can handle data access using RMS.

The reverse proxy server can provide both its own unique tags, as well as extensions to the common tags provided by the Portal. It can also provide the set of portal tags specified in the PRD. In order to maximize interoperability between pagelets and portlets, the portal can be upgraded to include the new common tags. The portal can also know to ignore the reverse proxy server tags, rather than treating them as an error.

Exemplary Reverse Proxy Server tags can be included in the tag library:

| Auth Source Tag | |
|---|---|
| Tag | authsourcedata |
| Description | This stores a list of available auth sources for the currently requested resource in memory. The data is stored as a collection, and each item in the collection is a data object containing information about the auth source (id, name, description) accessible through the data object dot notation ($curauth.name). |
| Attributes | |
| id | The key used to store the data list in memory.. |
| scope | Which scope (tag, request, application, etc . . .) to use to store the data list in memory. |

```
<pt:runner.authsourcedata pt:id="authsources"/>
<pt:logic.collectionlength pt:data="authsources" pt:key="numauths"/>
<pt:logic.if pt:expr="($numauths)>1">
```

Auth Source Tag

```
<pt:logic.if-true>
    <!--display as HTML drop down -->
</pt:logic. if-true>
<pt:logic.if-false>
    <!--display as hidden input -->
</pt:logic. if-false>
</pt:logic.if>
```

Resource Link Tags

| Tag | resourcelink |
|---|---|
| Description | This stores the URL to a specific resource, if available, in memory. |

Attributes

| | |
|---|---|
| resourceid | The resource ID. |
| id | The key used to store the data in memory. |
| scope | Which scope (tag, request, application, etc . . . ) to use to store the data in memory. |
| Tag | resourcedata |
| Description | This stores a list of resources in memory that are available to the current user. The data is stored as a collection, and each item in the collection is a data object containing information about the resource (id, name, description, url) accessible through the data object dot notation ($curresource.name). |

Attributes

| | |
|---|---|
| id | The key used to store the data list in memory. |
| scope | Which scope (tag, request, application, etc . . . ) to use to store the data list in memory. |

These tags behave similarly to the ptdata tags in the Portal.

Pagelets

| Tag | inject |
|---|---|
| Description | This tag is replaced with the output of the specified pagelet. |

Attributes

| | |
|---|---|
| namespace | The pagelet namespace. |
| id | The pagelet ID. |
| Tag | pageletaccessdenied |
| Description | This tag displays a custom "access denied" error message when a user does not have proper security to see a pagelet. If this tag does not exist, a generic "access denied" message can be displayed, otherwise the contents of this tag can be shown. |

The pagelet tag is simply the way to add a pagelet to an HTML page.

```
<pt:ensemble.inject pt:name="al-collab:discussion" pt:id="discussion" discussionid="21">
    <discussion>
        <expandedmessages>
            <messageid>27<messageid>
            <messageid>36<messageid>
            <messageid>144<messageid>
        </expandedmessages>
        <currentmessage>
            <messageid>27</messageid>
        </currentmessage>
    </discussion>
</pt:ensemble inject>
<pt:ensemble.inject pt:name="al-collab.discussion" pt:id="discussion" discussionid="21">
    <pt:pageletaccessdenied>
        <B>Unable to display the current pagelet. Please contact your system administrator.</B>
    </pt:pageletaccessdenied/>
</pt:esemble.inject>
```

Role Tag

| Tag | roledata |
|---|---|
| Description | This stores a list of the roles in memory that the current user has available. The data is stored as a collection, and each item in the collection is a variable containing the role name. This can be used with the foreach tag to iterate over role data. |

Attributes

| | |
|---|---|
| id | The key used to store the data list in memory. |
| scope | Which scope (tag, request, application, etc . . .) to use to store the data list in memory. |

`<pt:ensemble.roledata pt:id="myroles"/>`

| Tag | roleexpr |
|---|---|
| Description | This tag evaluates a role expression and stores the result in memory. It is designed to work with the logic.if tag. |

Attributes

| | |
|---|---|
| expr | An expression consisting of the hasRole keyword followed by an application role. This expression evaluates whether or not the current user has the specified role. |
| key | The key used to store the data in memory. |
| scope | Which scope (tag, request, application, etc . . .) to use to store the data in memory. |

`<pt:ensemble.roleexpr pt:expr="hasRole admin-role"/>`

User/Group/Role Picker Tag

| Tag | picker |
|---|---|
| Description | This tag selects a user/group/role and passes the result to the specified JavaScript function. |

Attributes

| | |
|---|---|
| form | The form of the HTML element to display (link, button, or URL). If the form is URL, anything nested within this tag can not be displayed. Default is link. |
| type | The type of object to select (user, group, or role). |
| multi | A boolean specifying whether or not the user can select multiple items. Default to false. |
| Jscallback | The JavaScript callback. This method can be passed a 2d javascript array containing the type (user, group, or role), name, and ID of each selected item. |

`<pt:ensemble.picker pt:type="user" pt:jscallback="myJSCallbackfunc"/>`

This tag can output an HTML element that can display a pop-up page containing the picker. The picker can be a simple list with filter box, similar to the ones used in the reverse proxy server admin UI.

Analytics Tag

This tag may or may not be included in the reverse proxy server, depending on details of the Analytics integration.

| Tag | Analytics |
|---|---|
| Description | This sends an analytics event to the analytics server. |

Attributes

| | |
|---|---|
| Id | The event id. |
| Data | The event data. |

`<pt: ensemble.analytics pt:id="myeventid" pt:data="myeventdata"/>`

| | The reverse proxy server Debug Tags |
|---|---|
| Tag | debug |
| Description | These outputs debug information about the current roles or experience definitions Definitions (i.e. how did you get the current role and/or login page). |
| Attributes | |
| Type | The type of debug info to display (role or experience definition). |

```
<pt:ensemble.debug pt:type="role"/>
<pt: ensemble. debug pt:type="experience definition"/>
```

| | The reverse proxy server In-place Refresh Tags |
|---|---|
| Tag | inplacerefreshjslibraries |
| Description | This tag includes the JavaScript libraries necessary for in-place refresh on a page. |
| Attributes | |
| Tag | inplacerefresh |
| Description | This tag enables or disables in-place refresh on the current page. |
| Attributes | |
| enable | 'true' enables in-place refresh, 'false' disables in-place refresh. If this attribute is not present, in-place refresh is enabled for the contents of the tag, and then the previous in-place refresh setting is restored. |

```
<pt: ensemble.inplacerefreshjslibraries/>
<a href="full-page -url>normal link </a>
<pt: ensemble.inplacerefresh pt:enable="true"/>
  <a href="in-place-refresh-url>in-place link</a>
</pt: ensemble.inplacerefresh pt:enable="false"/>
or
<pt: ensemble.inplacerefresh>
  <a href="in-place-refresh-url>second in-place link</a>
</pt: ensemble.inplacerefresh>
```

Common tags can be shared between the reverse proxy server and portal. They can include new tags (with the reverse proxy server specific implementations) and enhancements to the pre-existing general tag libraries for specific the reverse proxy server needs.

Tags can be used for doing conditionals using tags. A variety of expr tags (such as the roleexpr tag) can store Boolean results for use by the if tag. This can simplify the if tag, and avoid the problem of having to figure out if the expression is an integer expression, a role expression, or something else.

| Tag | if |
|---|---|
| Description | This tag evaluates an expression and then displays either the if-true or if-false tag contents. |
| | Attributes |
| expr | A Boolean value. This can be input as an tag variable using the $ attribute notation (i.e. pt:expr = "$myboolean"). |

The corresponding if-true and if-false tags do not have any attributes. They are simply displayed or not displayed depending on the results of the tag expr parameter.

| Tag | iftrue |
|---|---|
| Description | This tag is displayed if the surrounding if tag evaluates to true. |
| Tag | iffalse |
| Description | This tag is displayed if the surrounding if tag evaluates to false. |
| Tag | intexpr |
| Description | This tag evaluates an integer expression and stores the result in memory. |
| Attributes | |
| expr | An integer value or a tag variable, followed by an integer comparator, and then another integer value or tag variable. The tag variables must evaluate to an integer and be in $ attribute notation surrounded by parentheses. The following comparators are allowed: '==', '!=', '<', '>'. |
| key | The key used to store the data in memory. |
| scope | Which scope (tag, request, application, etc . . .) to use to store the data in memory. |
| Tag | boolexpr |
| Description | This tag evaluates a boolean expression and stores the result in memory. |
| Attributes | |
| expr | A boolean value or a tag variable, followed by a boolean comparator, and then another boolean value or tag variable. The tag variables must evaluate to a boolean and be in $ attribute notation surrounded by parentheses. The following operators are allowed: '&&', '\|\|', '==', and '!='. |
| key | The key used to store the data in memory. |
| scope | Which scope (tag, request, application, etc . . .) to use to store the data in memory. |

```
<pt:logic.intexpr pt:expr="($numauths) > 1"/>
<pt:logic.if pt:expr="$if-result">
    <pt:logic.iftrue>
        <!-- This is displayed if expr evaluates to true. -->
    </pt:logic.iftrue>
    <pt:logic.iffalse>
        <!-- This is displayed if expr evaluates to false. -->
    </pt:logic.iffalse>
</pt:logic.if>
```

An alternate way of handling the expression tags is to have the arguments be tag attributes, rather than having an expression string that the tag parses. For example:
    <pt:logic.intexpr pt:value1="$numauths" pt:operator=">" pt:value2="1"/>
CollectionLength Tag
The collectionlength tag can be necessary to enable conditional logic based on how many auth sources or resources are returned (i.e. empty, a single item, or a list).

| Tag | collectionlength |
|---|---|
| Description | This tag evaluates the length of a collection and stores the result in memory. |
| | Attributes |
| data | The key used to store the collection. |
| key | The key used to store the result in memory. |
| scope | Which scope (tag, request, application, etc . . . ) to use to store the data in memory. |

Variable Tag Enhancement
This tag can be converted for use with the collection tag so that you can create collections of variables, in addition to collections of data objects. This can be useful for the rolesdata tag. The collection tag can also need to be updated to mention the new related child tag, as well as a warning not to mix data types in a collection.
Error Tags
These tags can allow the reverse proxy server errors to be formatted as desired on a custom error page. There are two ways to implement this. The first can require either adding an API to the Tag Engine to allow the reverse proxy server to set error messages for a user. The reverse proxy server can then need to set the error information before displaying an error page to the user. The second involves implementing the reverse proxy server specific error tags that meet a common error tag API specified by the tag engine.

| Tag | error |
|---|---|
| Description | This tag displays errors on the page so that they can be placed and formatted as desired. If the errortext tag is included inside this tag, the contents of this tag can only be processed if there is an error. If the child tag is not present, then the error messages can be formatted and displayed from this tag in the standard style. |
| Tag | errortext |
| Description | This tag displays the current error text on the page so that it can be placed and formatted as desired. |
| Attributes | |
| text | This attribute allows you to override the error text with text of your own choosing. |

```
<pt:common.error/>
  or
<pt:common.error>
  <p>
    <pt: common.errortext/>
  <p/>
</pt:common.error>
```

| Tag | errorcode |
|---|---|
| Description | This tag stores the error code in tag memory. |
| Attributes | |
| key | The key used to store the data in memory. |
| scope | Which scope (tag, request, application, etc . . .) to use to store the data in memory. |

```
<pt:common.errorcode pt:key="myerrorcode"/>
```

User Info Tag

| Tag | userinfo |
|---|---|
| Description | This stores and retrieves user info data. |
| Attributes | |
| info | The name of the user info data. If this is used alone, the data can be retrieved. |
| value | The value to store in user info. |

```
<pt:common.userinfo pt:info="email"/>
<pt:common.userinfo pt:info="email" pt:value="test@test.com"/>
```

Head Includes Tag Set

| Tag | includeinhead |
|---|---|
| Description | This marks JavaScript & Security Service links to be included in the Head element of the HTML page by the headincludes tag. If no headincludes tag is present, it can be included at the bottom of the Head element, or a Head element can be inserted if there is none. If a .js or .css file is marked for inclusion multiple times, it can only be included once. This tag can be ignored during automatic in-place refresh requests, although custom in-place refresh solutions can need to remove this tag during refresh to function correctly. |
| Attributes | |
| Tag | headincludes |
| Description | This tag allows JavaScript and Style Sheet include information to be added to a specific point in the Head element of an HTML page, as required by the XHTML specification. If a .js or .css file is included multiple times, it can actually only be included once in the Head element. |

Head Includes Tag Set

| Attributes | |
|---|---|

```
Main page HTML:
<head>
    <script type="text/javascript" src="http://acme.com/main.js"/>
    <pt:common.headincludes/>
</head>
Pagelet HTML:
<pt:common.includeinhead>
    <script type="text/javascript"><!--JavaScript --></script>
    <script type="text/javascript" src="http://acme.com/test.js"/>
    <link rel="stylesheet" href="http://acme.com/test.css"
      type="text/css"/>
</pt:common.includeinhead>
```

In one embodiment, in the reverse proxy server proxy, URLs for various links in the HTML returned by resources are transformed in the reverse proxy mode, but not for transparent proxy mode. For pagelets, URLs can be rewritten in the transparent proxy mode—Javascript refresh can have the same domain, machine name, and port as the main page, otherwise ugly browser warnings appear. Another reason for rewriting URLs is branding: customers want a consistent URL experience for their users in the URL. (i.e. machine name/host doesn't change).

A "mini-gateway" for URLs inside pagelets can be used, both in transparent and reverse proxy mode. All URLs within can be rewritten with a following scheme, like the following:

http[s]://includingresourcehost:port/includingresource-path/PTARGS_pageletresourceid/pageletrelativeurl For example:

Consuming resource with an external URL: http://runner.bea.com/crm/ can include a pagelet. Pagelet's parent resource can have internal URL: http://collab.bea.com/ and its ID in the reverse proxy server DB is 15. Pagelet has internal URL http://collab.bea.com/discussion/pagelet.jsp. Within the pagelet, there can be a link to http://collab.bea.com/discussion/viewthreadjsp.

User can hit http://runner.bea.com/crm/main.aspx, which includes the discussion pagelet. The link within a pagelet can get rewritten to http://runner.bea.com/crm/PTARGS_15/discussion/viewthread.jsp. This link can be composed of the consuming resource URL followed by the PTARGS, pagelet ID, and the remainder of the link in the pagelet after the pagelet parent internal URL.

Internally, mini-gateway can be a resource mapper which extracts resource ID from the URL and sets the appropriate resource on IntermoduleData. On pagelet URLs, it gets called instead of the regular resource mapper.

Embodiments of the present invention can provide a proxy and SSO solution that interoperates with a portal product. In one embodiment, there can be three major components to: proxy, administration console, and core resource API. These can be called RProxy, Admin Console, and Core API respectively.

In support of the primary components can be the additional, top level features of Auditing, Analytics, and Development Tools.

RProxy can support two modes of operation: reverse and transparent. These two modes can interoperate seamlessly. The end user only needs to be aware of when DNS changes are needed; they do not need to know about the distinction between transparent and reverse proxies.

In reverse proxy mode, RProxy can map resources based on the first part of the destination path in a request. For example, if a user requests proxy.external.com/resourceA/somepage.html then, according to user defined rules, the reverse proxy server map that traffic to resourceA.internal.com/somepage.html. This mode of operation requires content rewriting so that URLs in the HTML returned from a resource point to the reverse proxy server and not to the resource itself. Transparent proxy mode can use DNS configuration such that IP addresses of the desired, external hostnames point to RProxy. In this configuration, RProxy can use the request hostname to determine where to redirect traffic. For example, www.resourceA.com can have an IP address identical to proxy.external.com, and RProxy can accept a request to www.resourceA.com/somepage.html and redirects it to the internal address resourceA.internal.com/somepage.html—HTML content rewriting is required in this case. Alternatively, RProxy may map the resource to the internal address 192.168.1.2 and this host is configured with the hostname www.resourceA.com—in this case HTML content rewriting is unnecessary because the host resourceA is configured using its externally facing DNS name, www.resourceA.com, which has a external DNS address mapping to the same IP as proxy.external.com. That is, www.resourceA.com returns URLs that point to itself at www.resourceA.com (instead of returning URLs that point to an internal hostname).

Finally, these two modes can be used in combination such that www.resourceA.com has an IP address identical to proxy.external.com and www.resourceA.com/appB is mapped to resourceA.internal.com/appB. The users should be aware from the UI and from logs that a true transparent proxy case requires adding a new, internal only DNS entry that map to the internal IP address. This applies when the protected resource has an identical machine name to the external DNS name. For example, mail.ford.com can have an external IP address identical to RProxy. The protected resource can have a hostname of mail.ford.com as well. The user can manually add a DNS entry for an arbitrary internal hostname, say mail.internal. ford.com and map it to the internal address, say 192.168.1.2. When they configure an RProxy Resource, they can specify that mail.ford.com maps to mail.internal.ford.com. The machine mail.ford.com can retain its hostname internally and externally (so no URL rewriting is needed), and RProxy can know how to properly redirect the traffic.

The following are general steps for processing a request. When the reverse proxy server proxy receives a request from the browser there can be several things that can to happen:
1) the reverse proxy server can determine which remote server this request refers to. For example: request for http://runner.plumtree.com/mail should be forwarded to the remote server named http://mail.plumtree.com. This stage is called Resource Mapping.
2) Also, the reverse proxy server can determine who the user is and potentially provide a way for the user to identify her. This stage is called Authentication.
3) Having mapped the resource and identified the user, the reverse proxy server can now determine if this user has access to the requested resource. This is the 3$^{rd}$ stage we call Authorization.
4) Assuming that Authorization stage succeeded, the next thing the reverse proxy server can do is to forward the request to the remote server and get the response. This stage can be called Retrieval.
5) Since the reverse proxy server provides application assembly functionality, the response from the remote server can contain some instructions for the reverse proxy server to do something. These are called tags. The reverse proxy server also needs to re-write URLs within the response to make sure they point back to the reverse proxy server and not to the original server. This stage is called Transformation.
6) And finally, the reverse proxy server can send the response back to the browser. This stage is called Post-Processing.

These stages can be conceptually the same for any kind of request, in other words, no matter if the reverse proxy server received an upload request or download request, WebDAV request or Secure Sockets Layer (SSL) request—the logical stages that the request has to go through can be the same. On the other hand, the behavior of each of the stages could be different for different kind of requests. For example, transformation stage does not do anything for responses containing binary data (images/word documents/etc). Another example is that URL re-writing rules are different for normal pages and pagelet responses.

Another point to keep in mind is that logic to handle a particular type of request might span multiple stages. For example, a FormPickerModule can responsible for detecting login forms served by remote applications and automatically logging the users into those apps. In order to do this, it can add data to the request (retrieval stage) and examine the date of the response (transformation stage).

RProxy can manage ACLs on Resource Objects to determine if a user (who has already authenticated with RProxy via SSO login) has access to a requested resource. The reverse proxy server uses Role Based Access Control (RBAC), based on users, groups, and roles as defined below.

Furthermore, user customizable rules can be mapped to resources. For example, a rule can be created that says, "If a user is from IP address range 192.168.0.1 to 192.168.0.254 then always allow access." Or, "if a user is accessing this from 8 am to 5 pm, allow access, otherwise deny." Custom rules are the most likely use of scripting.

RProxy can accept X.509 (PKI) certificates when establishing SSL connections with remote resources. There need be no certificate management for remote resources. Client certificates between RProxy and the browser user can be supported using SSL/TLS in the web application server itself. We can not support certificate configuration per resource.

Single Sign On can enable a user to login to RProxy once and not login again until their SSO session times out or is explicitly logged out. SSO encompasses every aspect of login, authentication, interactive login pages, experiences, and rules. There are several different kinds of primary authentication (i.e. form, 3$^{rd}$ party SSO, basic auth, etc. . . . ), and different resources can require different kinds of authentication depending on their desired level of security.

Figure 8A:
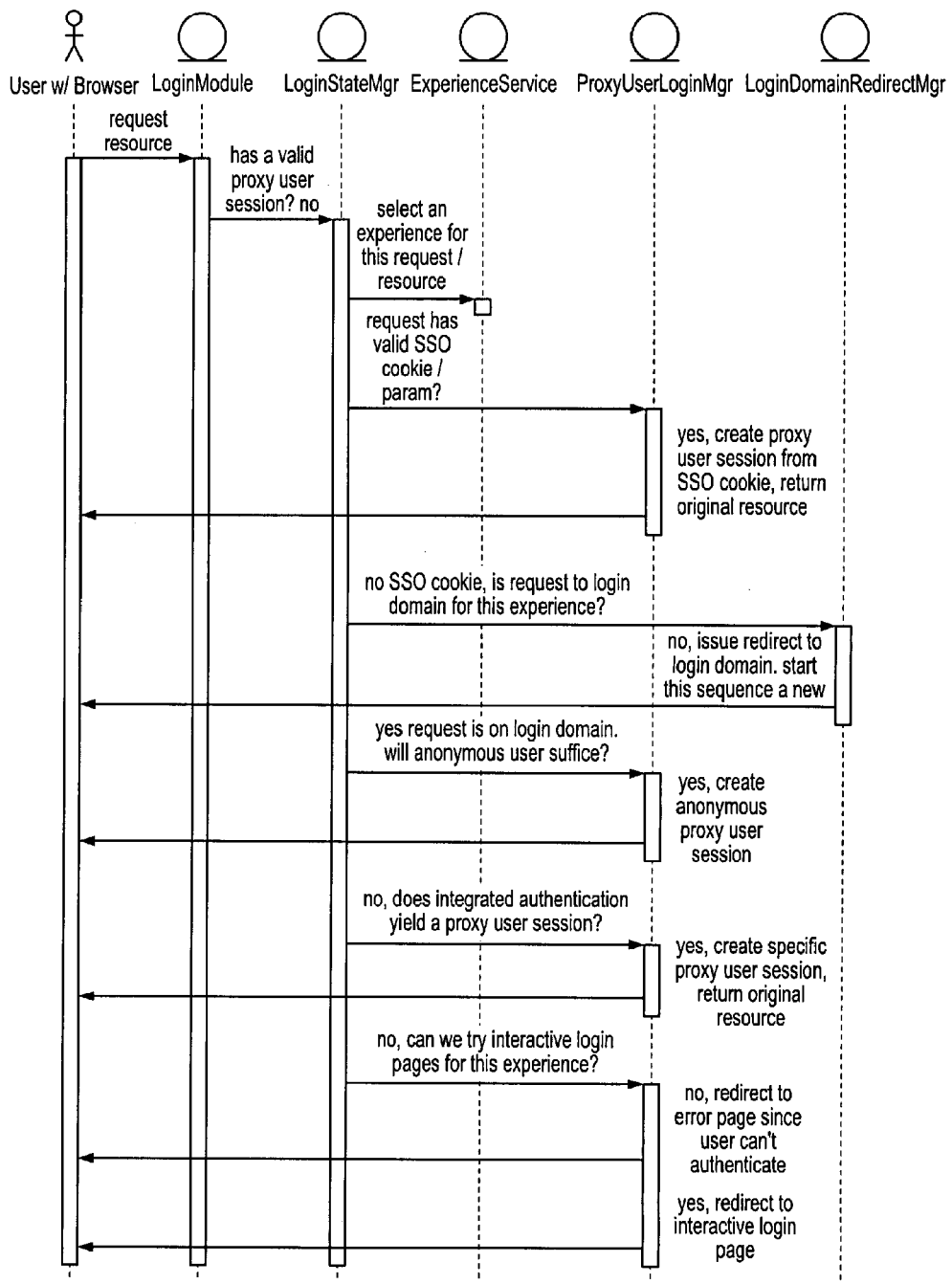
FIG. 8A shows an exemplary single-sign-on and authorization system.
Figure 8B:
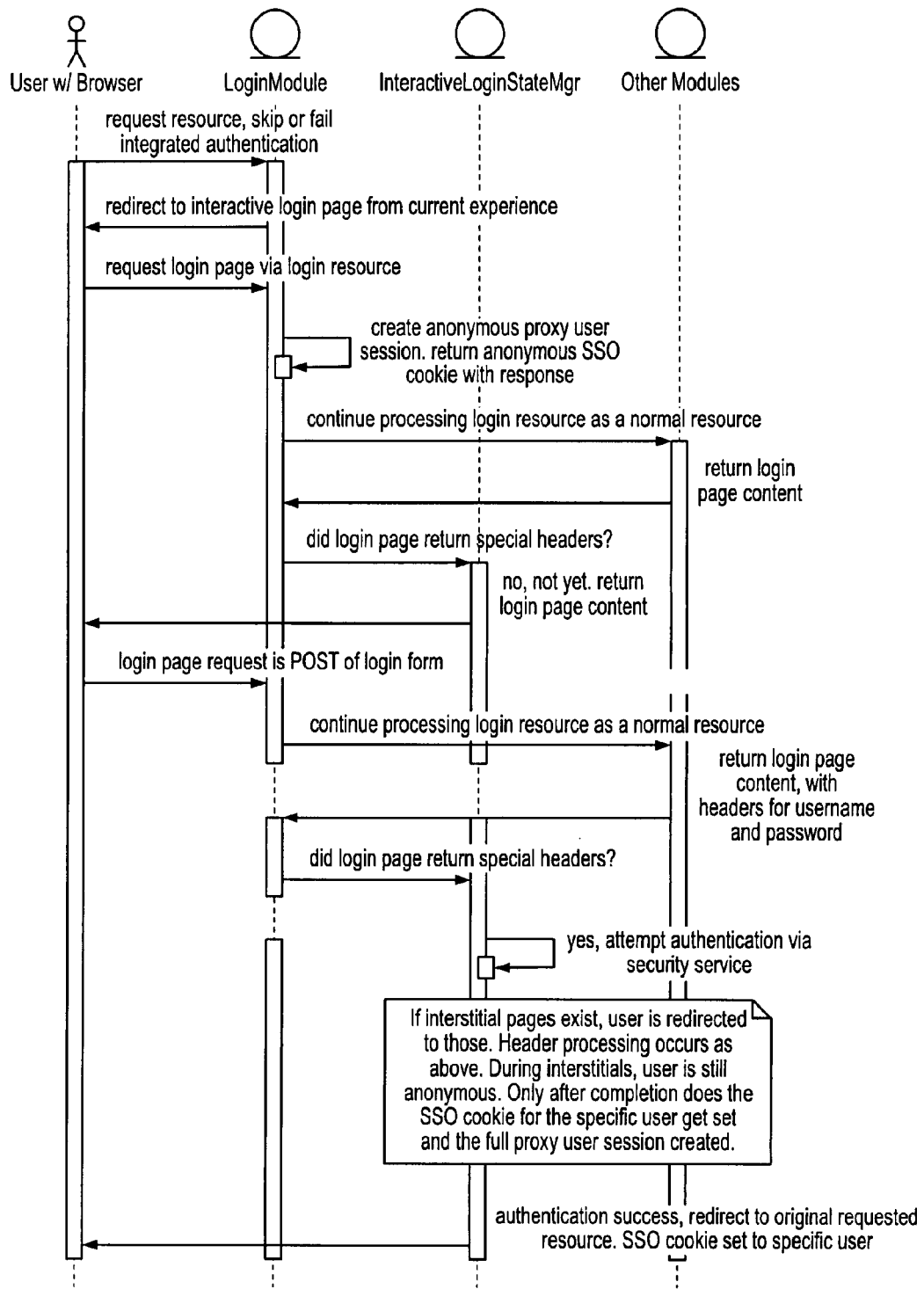
FIG. 8B shows an exemplary interactive system with interstitial pages.

FIG. 8A shows exemplary single sign on and authentication. FIG. 8B shows exemplary interactive login and interstitial pages.

In order to authenticate users to RProxy, a login page can be presented that allows the user to input their username, password, and specify an authentication source. Authentication may instead be automatic, as can be the case with Windows Integrated Auth. After authentication, an SSO cookie can be set that indicates the user has a valid login to the system, and the user should not be prompted for login again until this expires or the user can be logged out.

Authentication sources can be portal specific and can supported via a tag that users can put into their login page.

RProxy supports WML login pages through complete replacement of the login form, as described below.

Anonymous access can use the same access and authentication mechanisms and need not be special cased within the code. Anonymous access does not require user authentication. For G5/G6 the reverse proxy server it can be not possible to create new users because the security service can be implemented using the portal.

SSO Login supports kiosk mode: "is this a public computer?" When enabled, this causes cookie deletion under certain conditions (e.g. browser close) that might not otherwise occur. This can be similar to Outlook web access shared computer versus private computer.

SSO Login supports kiosk mode through ssoconfig.xml. Users can disable the usage of cookies by specifying negative timeout values. Specifying a negative timeout value can cause the cookie to expire when the browser closes.

In one embodiment, kiosk mode and cookie expiration may be moved from ssoconfig.xml to the experience definition.

RProxy can allow customers to completely replace the login page UI. This can be accomplished by configuring an experience rule through an administrative UI to use a specified remote login page instead of the default page. This remote page can then be free to provide different experiences for users based on their locale, browser-type (i.e. wml/BlackBerry), requested resource, etc. . . .

Login pages can be hosted on a remote server called the login server and the user can create new, custom login resources and experience definitions that refer to any remote host.

In order for remote login pages to properly display, RProxy can provide access to the original HTTP Request information. This information can be used to determine what kind of page to display.

HTTP Request Headers—All headers from the original request can need to be forwarded to the remote resource.

Cookies—All cookies can need to be forwarded to the remote resource

HTTP Request Data—The remote login resource can need access to the following data from the original HTTP Request: Protocol, Remote Address (IP), Remote Host, Scheme, ServerName, ServerPort, is Secure Requested Resource—Which RProxy resource can be being requested/accessed.

Sample Login Pages

The reverse proxy server can ship with sample experience definitions available in both JSP and ASP.NET. Those pages can include login, usage agreement and error pages. These pages can be internationalized.

Any complicated pages can have both a simple version (installed on the reverse proxy server) and a complicated version that can not be active when shipped.

The simple login page can prompt for the username and password. Depending on how many auth sources are available for the current resource, it can either store the auth source as a hidden input or display a drop down for the user to choose an auth source.

The complicated login page can choose one of several login pages based on the user's request (i.e. from what subnet, in what language (this can only be a comment), what type of browser—blackberry).

A guest user can have a distinct identity and may have user profile data. An anonymous user's identity can be unknown, though we may know key information such as their IP address. An anonymous user can not have user profile data or a credential vault. Both anonymous and guest users have session data (and thus, "session prefs"). Guest users need not exist in the reverse proxy server. There need be no way to create a new user in the security service.

When a resource supports anonymous access, no authentication need be necessary. Any user can see the resource using an anonymous proxy user session or as a specific user.

SSO logout occurs when a user clicks on a logout link that can be specified by an URL pattern for a resource. This URL pattern can be configurable through the admin UI. When this URL pattern is matched, the SSO logout procedure can fire. After that procedure is completed, the user can be redirected to the sso logout page URL specified on the experience definition.

There can be two cookies which manage/persist/recreate user sessions in the reverse proxy server: PTSSOCOOKIE and PERSISTEDPTSSOCOOKIE. Both cookies have timeout values that are configurable in ssoconfig.xml. The user can disable the use of both cookies by specifying a negative timeout value. Positive values for the timeout of these cookies can force them to be persisted to the user's harddisk.

PTSSOCOOKIE—This cookie can be designed to be short-lived. The duration of this cookie can be enforced by linking HttpSessions to this object via a relationship managed by the LoginTrackingService. The relationship can be managed by the LoginTrackingService because this is the only object in the reverse proxy server that really manages application-scoped variables.

Because a user's session exists across domains, application-scoped variables can be the only way to track and persist data across domains.

When a user's HttpSession expires (this can occurs when the user is not actively using this httpSession), the death or invalidation of this HttpSession can be intercepted by a session listener called RunnerHttpSessionListener. This session listener can query the LoginTrackingService for all the active HttpSessions bound to this user. It can then remove the HttpSession which just expired. If after that, there are no active HttpSessions left for this user, the user can be removed entirely from the LoginTrackingService and the user's SSO session can have effectively expired. This can make it impossible for a user to reconstruct the reverse proxy server session by sending a PTSSOCOOKIE.

PTSSOCOOKIE can be essentially linked to active HttpSessions. However, the removal of a user from the LoginTrackingService/Map triggered by the lack of active HttpSessions can be a weak form of logout. That means that if a PERSISTEDPTSSOCOOKIE is available (i.e., ssoconfig.xml has a positive value for this cookie's expiration and the user possesses one), the user's session can still be restored if the reverse proxy server receives a PERSISTEDPTSSO-COOKIE. However, if the timeout for PERSISTEDPTSSO-COOKIE is negative, then the removal of a user from the LoginTrackingMap can effectively force a user to log in again for his next reverse proxy server request.

PERSISTEDPTSSOCOOKIE—Cookie can be designed to be a long-term cookie (such as 1 week). The cookie's expiration can be managed in two places: 1) on the cookie itself through the Cookie class, and 2) via the LoginTrackingService. We have redundancy to remove or mitigate the risk of a user being able to hack his cookie and extend the lifetime of his cookie. We achieve this by simply tracking the username and session expiration date on the LoginTrackingService. When a user sends a PERSISTEDPTSSOCOOKIE, that cookie's expiration time must validate against the LoginTrackingService before the server proxy server can recreate the user's session. PERSISTEDPTSSOCOOKIE need not be linked to a user's active HttpSession(s). Therefore, a user may not log into the reverse proxy server for a few days and still be able to use his PERSISTEDPTSSOCOOKIE to rebuild his previous reverse proxy server session. That can be the primary function of this cookie. It can be designed for low-security environments.

URL PATTERN LOGOUT—When an URL pattern is detected as being a SSO logout URL, a user can be strongly logged out. This means that the reverse proxy server can go in and invalidate all known HttpSessions the user has registered. The reverse proxy server can also clear the user out of the LoginTrackingMap, which disables the recreation of a user's session via PTSSOCOOKIE. The reverse proxy server can finally set an expiration date to some time in the past in LoginTrackingService, which can disable the recreation of user session via PERSISTEDSSCOOKIE.

SSO login can perform authentication behind the scenes so that Active Directory, LDAP, and other identity source can be used to verify a username, password and other login credentials. The user can be unaware this is occurring; then merely login to the reverse proxy server.

RProxy can delegate to the Security Service for authentication via an authentication source, such as Active Directory or the portal user database. We have abandoned any thoughts of integrating WebLogic Server or BEA Core Security for the Reverse Proxy Server Springbok.

RProxy can provide intrinsic support for Basic Auth.

Proxy Authenticators

In the PRD these can be referred to as "primary authentication." These are the authenticators that fire from the proxy to a user's browser. They can be top level object and their authentication level and name can be changed. The order can be Currently, there can be a 1-to-1 mapping of authenticator to matching experience definition.

There can be only one interactive authenticator (for interactive login pages). Aside from the interactive authenticator, the remaining authenticators are "integrated". This can be legacy terminology. All authenticators, other than the form authenticator, are integrated.

Security Service Login Token Timeout

The Security Service plans to can have login token timeout. RProxy can provide a useful integration story for existing Windows Integrated Auth, Netegrity, Oblix, and other customers that have preexisting SSO solutions. Windows Integrated Auth and Netegrity/Oblix integration can occur via external authenticators.

For WIA, the idea can be to write a web application for IIs and enable WIA for that application. The application itself knows how to receive forwarded request from the reverse proxy server, authenticate the WIA user with the security service to generate a login token, the forward the login token back to the reverse proxy server to perform linegrated authentication to complete SSO login. WIA/ Simple and Protected GSSAPI Negotiation Mechanism(Spnego) request diagram.

Figure 9:
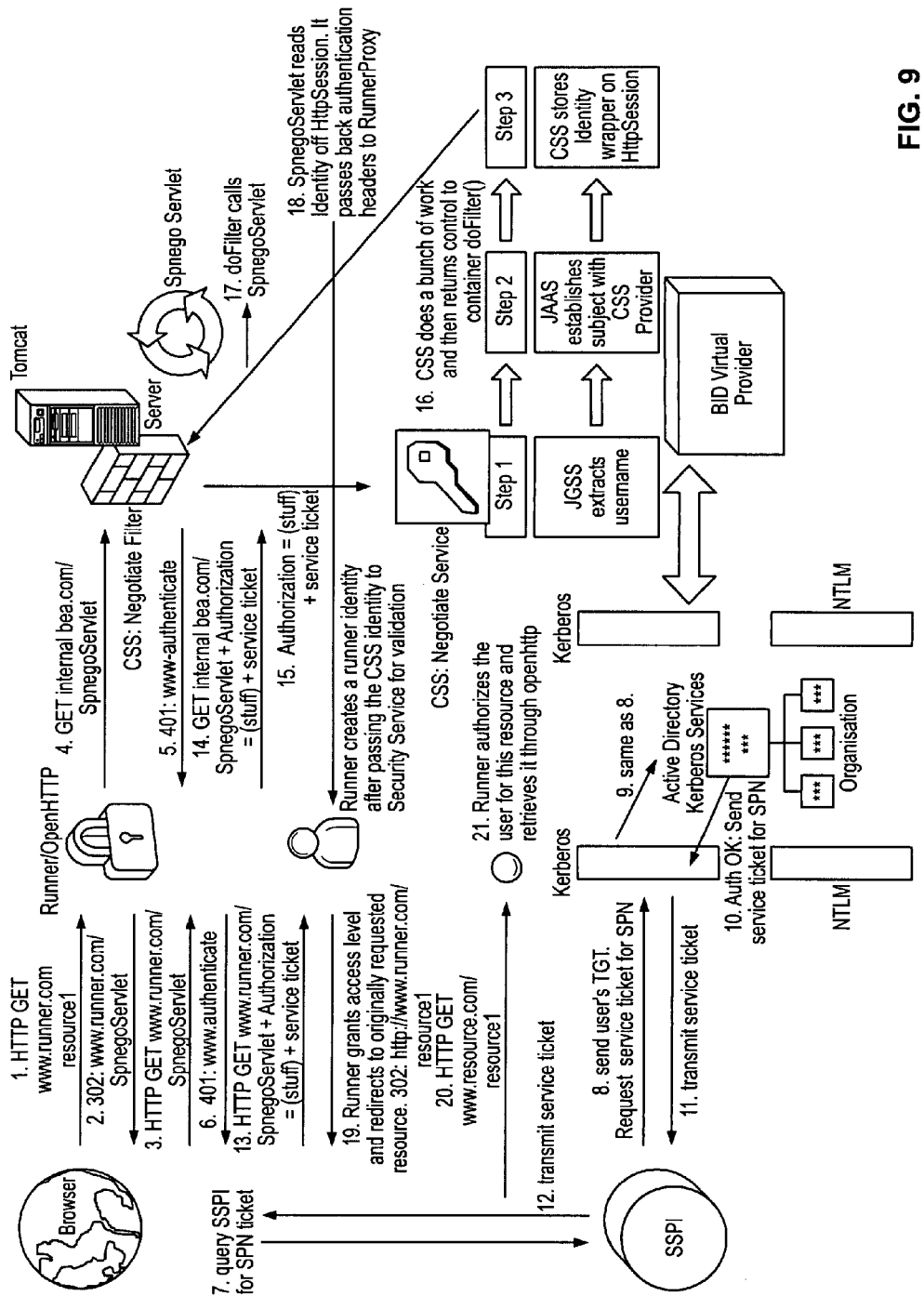
FIG. 9 illustrates an exemplary request flow system.

FIG. 9 illustrates an exemplary request flow.

Summary of Request Flow

1. A user can open a browser and enters in an URL: http://www.runner.com/resource1
2. The reverse proxy server can intercept the request. The reverse proxy server can determine that the user doesn't have an access level high enough for /resource1. The reverse proxy server can determine that the only authenticator which can grant that access level can be the Spnego Authenticator. The Spnego Authenticator sets a 302 response to the spnego servlet: 302 http://www.runner.com/SpnegoServlet.
3. Browser can follow the 302 and does an HTTP GET www.runner.com/SpnegoServlet
4. The reverse proxy server can recognize that the user needs an anonymous session to access /SpnegoServlet. It can create one and fetches the /SpnegoServlet from the internal address of http://internal.bea.com/SpnegoServlet.
5. The request to http://internal.bea.com/SpnegoServlet can be handed to Tomcat. Tomcat can pass control to the Security Service Negotiate Filter. The Negotiate Filter can call the Security Service Negotiate Service to do some processing, but that can be left out of the diagram for simplicity. The Security Service Negotiate Service can recognize that this request need not be authorized because there are no Authorization headers on the request. It can respond with a 401 and sets the header WWW-Authenticate.
6. The reverse proxy server can pass the Filter's response back to the browser as is.
7. The browser can see the WWW-AUTHENTICATE header and, if properly set up correctly, can query SSPI for a security token for the service that returned the header. The SPN can be generally of the form <servicename>/<machinename>. User can query for these SPNs from LDAP.
8. SSPI can send the user's Ticket Granting Ticket to Kerberos. This Ticket Granting Ticket was given to the user after he completed his window's login. This Ticket Granting Ticket establishes this user's identity to Kerberos and can be used to retrieve a security token for the SPN which just asked the user to identify himself.
9. Kerberos queries Active Directory's LDAP repository for security data for the requested SPN.
10. Active Directory validates the user's TGT and returns a service ticket for the requested SPN.
11. Kerberos can relay this service ticket back to SSPI
12. SSPI can relay this service ticket back to the browser
13. The browser can encapsulate this service ticket into a security blob and sends it back as an Authorization header.
14. The reverse proxy server can grant anonymous access to internal.bea.com/SpnegoServlet as before, except this time the request has an Authorization header containing the SPNEGO security blob.
15. Security Service Negotiate Filter can receive the request from the container. It can call the Security Service Negotiate Service to examine the contents of the Authorization header.
16. The Security Service Negotiate Service can parse the SPNEGO security blob and does basic validation (i.e. verifies that this is a valid SPNEGO token). If this validation fails, Security Service Negotiate Service can NOT instantiate a SPNEGO Token object. User can verify this in ptspy. If the token validates, Security Service can call JGSS to extract the user identity from the SPNEGO security blob. Security Service can then call JAAS to log this user into a provider. This provider can be swappable and can be an LDAP provider. This can be replaced in m7 by a Virtual Provider to speed up efficiency and eliminate some extraneous LDAP calls. After the user has been validated against the provider, Security Service can wrap the JAAS subject into a wrapper class called an Identity. This Identity can then be stored on the HttpSession. After that, the Negotiate Service returns control to the container.
17. Tomcat can call the SpnegoServlet.
18. SpnegoServlet reads the Security Service Identity off the HttpSession. If one is found, the servlet can return security data (username, ssovendortype, etc) in the form of http headers.

19. The reverse proxy server can parse the response for the security headers. If they are found, the reverse proxy server can validate this user against Security Service over SOAP. This is not in the diagram. If Security Service validates the user, the reverse proxy server can create an Identity for the user and grant the access level associates with the Spnego Authenticator. It can also flush a 302 to the response buffer to the original resource that the user requested in step 1 (i.e. 302: Http://www.runner.com/resource1). It can also send back the reverse proxy server cookie which contains the access level that the user has acquired.
20. The browser sees the 302 on the http response and follows it (i.e., issues a HTTP GET: www.resource.com/resource1). The browser can also attach the cookie that was attached in the previous step.
21. The reverse proxy server can examine the request and can find a cookie with an access level equal to that which is associated with the Spnego Authenticator. The reverse proxy server can authorize the request to /resource1 and retrieve this resource for the user.

Figure 10:
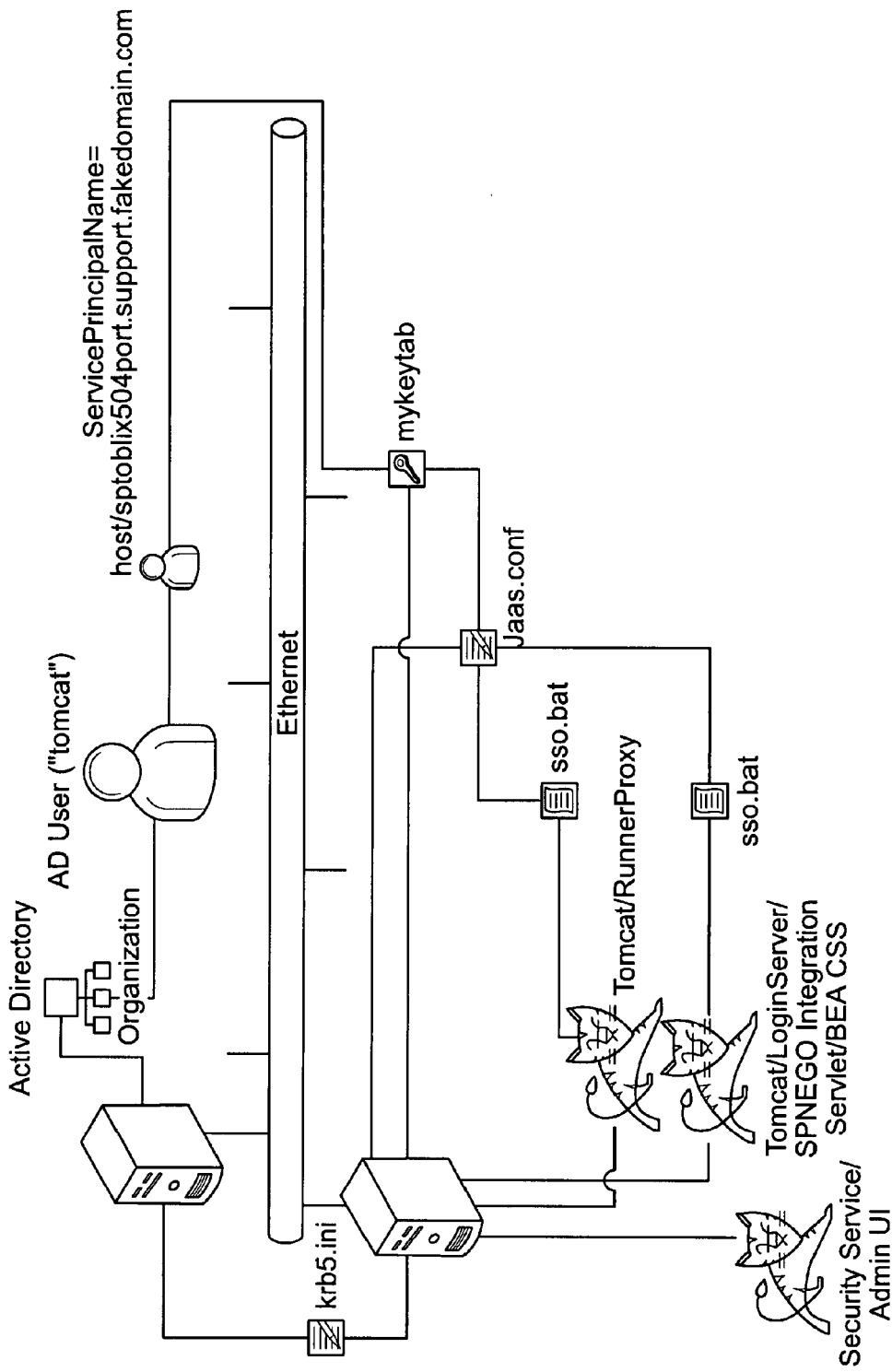
FIG. 10 shows an exemplary deployment of Spnego.
Figure 11A:
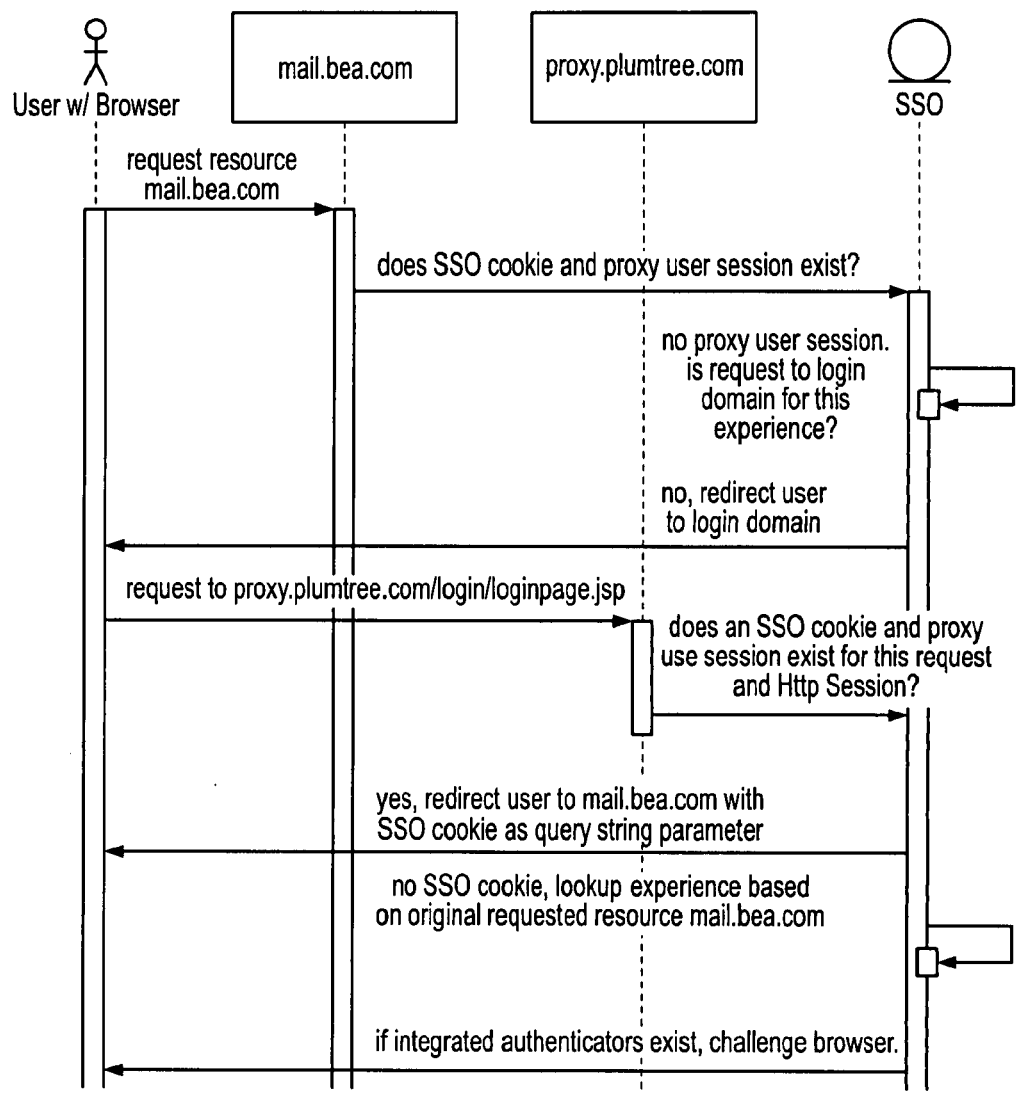
FIGS. 11A-11B shows an exemplary SSO.
Figure 11B:
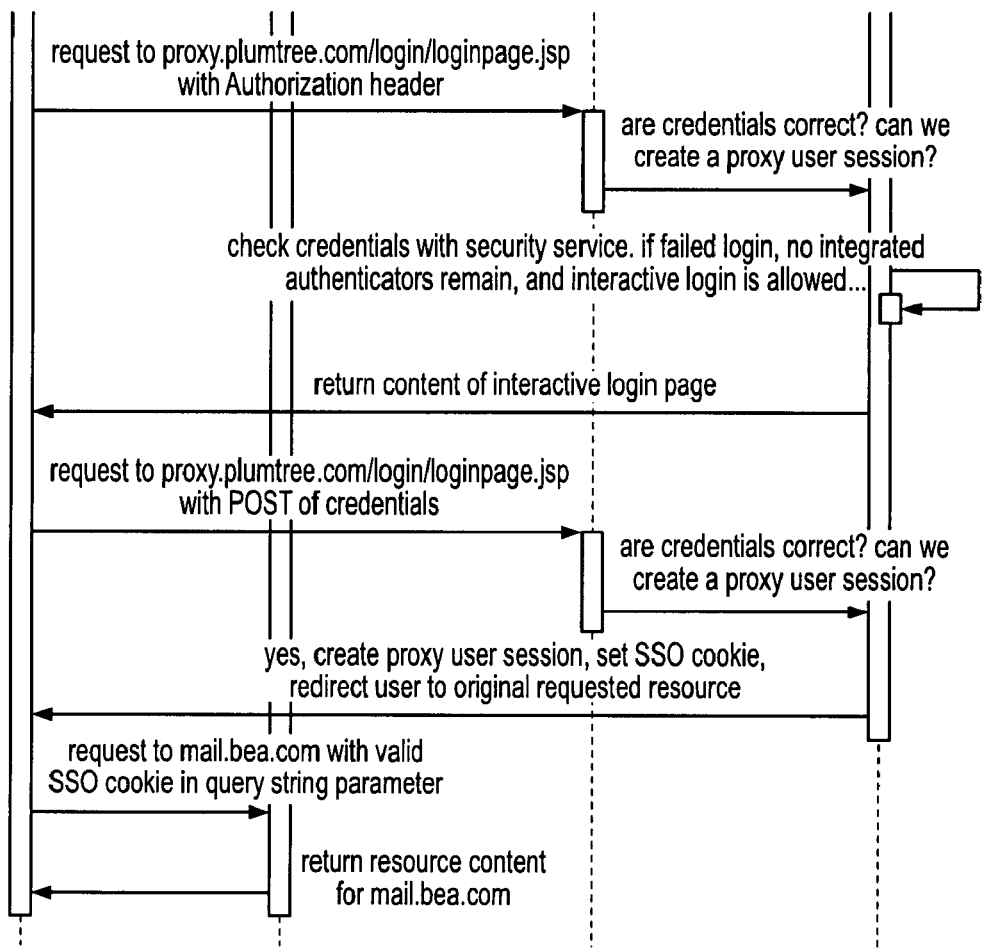

FIG. 10 shows an exemplary deployment of Spnego.

Diagram components can be briefly summarized. Further details can follow and are available on this wiki page.

Security Service/Admin UI—Tomcat instance which serves both Security Service war and Admin UI war.

Tomcat/RunnerProxy—Tomcat instance which serves Proxy war.

Tomcat/LoginServer/SPNEGO Integration Servlet/BEA Security Service—Tomcat instance can host the login server war. At the time of this writing, the SPNEGO Integration Servlet can be deployed with this war, along with the BEA Security Service jars. These can be decoupled at a later point in time.

sso.bat—a short .bat file can be temporarily set java opts to load jaas.conf jaas.conf—a short txt file can configure this Tomcat instance to run as a specific SPN. Also points to the SPN's keytab file.

krb5.ini—a txt file containing information so that this server can know where to find various kerberos services Active Directory—Active Directory can be a term that can refer both to Window's Kerberos Authentication Services and Window's LDAP repository.

AD User—A user that can be created. This user can be used as a container for a SPN which can run Tomcat.

ServicePrincipalName(SPN)—An SPN can be an LDAP attribute that can be associated to a container object, such as a user. When a user wishes to authenticate with SPNEGO through their IE browser, the IE browser can query Active Directory and obtain a service ticket for the SPN which can be running Tomcat.

WIA between the browser and RProxy requires sticky sessions or the browser would re-authenticate each time with RProxy. WIA between RProxy and remote resources in HS requires cached connections identified by user, so the SSO cookie must have secure user information that cannot be spoofed.

Remote Delegated SSO Integration Pages

Since many current portal customers use custom SSO integrations for their own in-house SSO solutions, we need to support this in the reverse proxy server. In order to avoid customizations in the core RProxy code, we can use a remote integration framework. Rather than writing code integrations for Netegrity and Oblix, those can be provided as sample integrations using the remote framework.

Customers with Oblix/Netegrity already installed can use their SSO solution to protect the cross-domain login form. This can then forward to a remote resource that can recognize the SSO cookie and return the data to the reverse proxy server.

RProxy can detect that a user needs to be integrated against an SSO solution, the user can be forwarded to a remote servlet specified in the UI. That servlet can manage the interaction with the SSO product and retrieve the SSO credentials. These credentials can then be passed back to RProxy through headers. RProxy cab then create a new user session using those credentials.

Experience Definitions and Rules

An Experience Definition can contain a number of properties that can be used by the reverse proxy server to determine the user's experiences related to the user's primary authentication to the reverse proxy server (authentication source, login page, interstitial pages, etc), before an unauthenticated user can accesse a protected the reverse proxy server resource. An experience definition can be selected based on rules (experience rules), using conditions such as which resource being requested, the IP address of the request origin, and/or other supported condition types.

Each experience rule refers to multiple resources that it can apply to. The experience rule contains at least the following:

Loging resource: Default Login Resource
Associated resources: Resource1, Resource2, ResourceN
Basic Auth, Interactive Login Page.
Windows Intergrated Authentication
Internal login endpoint suffix: /loginpage.Jsp
Internal interstitial endpoint suffix: /interstitialpage.jsp
Internal error endpoint suffid: /errorpage.jsp
Post logout external URL:
    http://anotherhost.bea.com/postlogout.jsp
Maximum interstitial visits: 1

An explanation of each of these fields follows:

Login resource: this can be a normal resource under the covers but it has additional restriction. Its external URL determines where the user can be redirected to in order to begin the login sequence.

Associated resources: these are the resources that the experienced can apply to.

Associated proxy authentications: these are the authenticators that can fire if the experience is selected. The interactive authenticator always fires last.

Internal login endpoint suffix: this suffix can be appended to the external URL prefix of the login resource to determine the loginpage endpoint, which can be where users are redirected at the start of the interactive login.

Internal interstitial endpoint suffix: same deal but this can be for interstitials. Note that if the user wants to make interstitials come firs, they just flip the endpoints.

Internal error endpoints suffix: same, but for errors. These pages only get visited when an error occurs.

Post logout external URL: this URL can be visited after SSO logout occurs. If it's not specified, the user can be redirected to the original requested resource (then the SSO login sequence begins anew).

Maximum interstitial visits: this can be the number of times a user can visit interstitial pages before causing an error. This prevents the user from not clicking the "I agree" in a consent page and visiting if forever, and also prevents accidental loops since the administrator can write customer interstitial pages.

The experience delimitation's external URL login path, /login above, can be reserved by the login resource. This prevents any other resources from mapping to the login path(s). The path "/" alone can be an invalid external URL login path.

Experiences can also have conditions that determine when it can be selected based on time of day, request IP, etc.

The login and interstitial pages can make decisions about what to display to a given user/request (such as the language based on User-Agent, what style of page based on IIP addresses, etc.).

They can also embed tags to be processed like any resource. RProxy can provide the login and error pages with relevant information: the original request headers, requested resource information, et al.

If maximum interstitial visits is 1, there can be not maximum enforced for this experience definition.

Interactive Login Sequence (Login Pages and Interstitials)

In the examples, the primary login hostname can be proxy.runner.com. When the SSO login sequence can be initiated for a request, the following occur:

1. An experience definition can be chosen based on the original requested resource, the request itself, and the current user.
2. RProxy redirects the user to the external login endpoint: https://proxy.runner.com/login/loginpage.jsp During the login sequence, HTTP headers can be used to communicate information between RProxy and the login/interstitial/error pages. This can be similar to the CSP headers used between the portal and portlets. All relevant request information can be forwarded from the user's browser to the login pages via HTTP headers, such as User-Agent and IP address.

3. RProxy returns the login HTML content to the user, rewritten in the same manner as a normal relative resource, e.g. links are rewritten to point to the external URL login path: proxy.runner.com/login and so a post link to the original login page would go to: https://proxy.runner.com/login/loginpage.jsp
    a. If the login page is unavailable, a default login page can be returned from a local RProxy file as a fallback. Thus, even if the server hosting the login pages is down, user login can still occur.
    b. If the default is unavailable, an RProxy error page can be returned. This can be the user customizable page at errorpage.jsp or if that cannot be contacted, an error page from a local file, and if that is unavailable a hard coded error.
4. The user enters username, password, and authentication source information and submits the login page, which can be forwarded to the mapped internal login URL.
    a. The internal URL receiving the form post or get with query string can be responsible for parsing out the username, password, and other information and then responding to RProxy with empty HTML content but with the headers:
    runner_username=username
    runner_password=password
    (There are other headers, see LoginPageHeader in the code.) This means that for every login, an additional request can be sent to the internal login URL than otherwise might be necessary if RProxy was parsing username/password information from a form submission. The benefit can be that the user customized login page can parse the submission and use whatever fields they need. (This might be a requirement for ASP.NET or JSF components that create form and component IDs in sequence based on the other components on the page and therefore may have submit fields on a page that change.) RProxy detects the login headers and, instead of returning a response to the user's browser, attempts authentication with those credentials.
    b. If authentication fails, the user can be sent to the login page again, and tags or headers can be used to describe the error.
5. After authentication succeeds, a user session can be created but marked as attempting interstitials.
    a. If interstitial pages are configured, RProxy redirects the user to the interstitial page endpoint. The user Meta data and other information can be sent in HTTP headers.
    https://proxy.runner.com/login/interstitialpage.jsp
    RProxy continues to forward user requests that are to:
    https://proxy.runner.com/login
        Until a page returns the HTTP header: runner_interstitial_complete=true. The interstitial sequence ends in error if either the maximum interstitial visits are reached or the header runner_interstitial_complete=false is returned.
    b. If the interstitial fails the user can be sent to the error page.
6. When interstitial pages are complete or if none are configured, the user session can be logged in and the user can be redirected to the original requested resource.

SSO sends the following 302 redirects to the browser:
To a login domain
    e.g. when the requested domain crm.bea.com is not the primary SSO cookie login domain of proxy.plumtree.com
To a login page after integrated authenticators fail for a resource or if there are none
To the interstitial page after login page completion
To the original requested resource after login success
To an error page when an error occurs There are several different ways that the reverse proxy server can authenticate the user to the back end-resource:
None (Authentication disabled)
Basic/Digest Authentication
Form based Authentication
Delegated Authentication (Windows Integrated, Netegrity, Oblix, etc. . . . )
No Authentication By default, the reverse proxy server can not authenticate the user to the back-end resource. This handles the case of anonymous access back-end resources, as well as the case where a company, due to security concerns, does not want the reverse proxy server to manage user passwords in its Credential Vault.

Basic/Digest Authentication

The reverse proxy server can provide a way to authenticate a user using basic/digest authentication. This involves detecting the authentication challenge header in a resource response and resubmitting the request with the appropriate user credentials. This can be essentially a simpler version of the Form based Authentication solution described below.

The Basic/Digest Authentication for a resource can check the HTTP headers of resource responses looking for authentication challenges. If a challenge is detected, the user's name and password can be supplied to the resource without the user seeing the challenge. If the response comes back again, meaning that an incorrect name or password was supplied, then the challenge can be passed on to the user. Once the user responds to the challenge, the reverse proxy server can add that username and password to the Credential Vault, if it is configured to be used.

In order to setup Basic/Digest Authentication for a resource, the administrator can configure the username and password, similar to the form fields in Form based Authentication. There are three possible ways to fill out these values:

User Profile—the value for the field can be retrieved from the user's profile data Credential Vault—the value for the field can be retrieved from the user's credential vault. There are two options for using the credential vault: automatic (The reverse proxy server handles all details), and choosing an element from a credential vault (this allows sharing credentials between resources, which should not be allowable by default).

Constant—this type can be used to specify constant field values. Administrators enter a value for the field and that value can be used for all users in all cases.

Form Based Authentication

Form based Authentication can be the most common form of login for web applications, although many enterprise web applications use some kind of SSO technology.

The reverse server proxy can detect login pages, automatically fill them out and display the final page without bothering the user. If there is a login failure, the reverse proxy server can display the login page to the user and then store the credentials the user fills out for later use. This can be essentially a multi-app "Remember My Password" feature.

Defining a Login Page

Even though we call it login page detection, the reverse proxy servers feature can be a lot more generic than that. The reverse proxy server can detect particular pages and issue GET or POST requests in response to those pages, thus simulating a particular user action.

Login pages are defined on the resource level by the administrator. Administrators can define several login pages. When defining a login page, the Administrator has to enter the following information:

Login Page URL Pattern—a pattern that describes a set of URLs for a particular login page Login Page Text Pattern—a pattern that describes the particular content that identifies a login page. This also requires two Booleans to describe how to use the text pattern: Use for Login Page Detection and User for Action URL.

Login Page Action URL—a complete URL of the page that can be used to submit the form data.

Set of form fields that a login form contains. The following information can be specified for each form field:

Field name—the name of the input element in the HTML form

Field type—the type of the value. This attribute describes where the reverse proxy server should get the value for the field when doing automatic form submission. Possible values are User Profile—the value for the field can be retrieved from the user's profile data Credential Vault—the value for the field can be retrieved from the user's credential vault. There are two options for using the credential vault: automatic (The reverse proxy server handles all details), and choosing an element from a credential vault (this allows sharing credentials between resources, which should not be allowable by default).

Default—in case when the field has a default value (i.e. <input type="hidden" name="query" value="blah"/>, Administrator can choose Default type to tell the reverse proxy server to extract this default value from the form and use it in the form post.

Constant—this type can be used to specify constant field values. Administrators enter a value for the field and that value can be used for all users in all cases.

Field value—depending on the type the value might be ignored (Default type) or refer to the constant that can be sent to the remote server (Constant type) or refer to the name of the user profile or credential vault setting.

In cases when no fields are specified, the GET request to the remote server can be issued as a result of detecting a login page.

It can be important to remember that the main purpose of this feature can be to automate logins into remote applications. In some cases logging in might be a multi-step process. In order to support such cases, the reverse proxy server can allow defining multiple login pages for a single resource.

Login Page Detection

Detecting login pages can be pretty trivial once the user has the right data. RProxy relies on the administrator to enter all the necessary data through the admin UI. Login pages are defined by 3 attributes: Login Page URL Pattern, Login Action URL and Login Page Text Pattern. Out of these 3 attributes only two are used during detection phase. Those are Login Page URL Pattern and Login Page Text Pattern. Login Page URL Pattern can be used to detect login pages based on the URL. For example, you know that the URL for the Plumtree portal's login page always looks like http://servername/porta/server.pt?*space=Login*

Notice that Login Page URL Pattern only support * wildcard. It can not support any other wildcards.

Sometimes the URL of the login form is always different (Amazon™). However, the login form always looks the same. This means that it can be possible to detect the login page based on the content of HTML returned from the remote resource. And this can be what Login Page Text Pattern is used for. Login Page Text Pattern can be a regular expression written using Java RegEx rules. When this field is specified, the reverse proxy server can check every page returned from the remote server to see if it matches the specified regular expression. For example:

<form.*action=\"?(.*/sign-in[^\"]*)\".*>

The above regular expression can be used to detect login pages on the Amazon™ website. Basically, it looks for the form on the page with action URL that has a word sign-in in it. Notice the parenthesis; they are used to define a group within the regular expression. This means that when the reverse proxy server encounters a login form on the page that looks like this:

<form name="sign-in" action="/gp/flex/sign-in/select.html/102-6407777-8688900?%5Fencoding=UTF8&protocol=https" method="POST"> it can extract the URL into a separate group. This means that the call to Matcher.group (0) can return the full <form name="sign-in" . . . method="POST"> string and the call to Matcher.group(1) can return only the action URL /gp/flex/sign-in/select.html/ . . . / . . . &protocol=https This is a very important feature, especially in cases like Amazon™, where the Login Form POST URL can be dynamic. In order to support dynamic Form POST URLs the reverse proxy server can allow an administrator to leave the Login Form Action URL field blank when defining the login page and instead specify a regular expression that would extract the Action URL from the action attribute of the form.

The Login Page Text Pattern can be controlled by two Booleans that specify when it should be used (i.e. for login page detection and/or Action URL extraction).

The class that implements this logic can be called PTLoginFormDetector and can be in the FormPicker project.

Each response can be checked against the entire set of login pages defined for that resource. This means that the more login pages are defined for a resource, the more time the reverse proxy server can need to check every response against all of them. We believe this is a reasonable compromise, but we need to performance test this piece of code.

Since certain form pages only occur after the main login page (i.e. a usage agreement), we could only check for these immediately after another login form occurred, if there was a performance problem with checking for too many login forms.

The reverse proxy server can send authentication data to remote resources, including HTTP headers and cookies. The reverse proxy server can also automatically perform form POSTs in order to submit user login data when remote resources present a login page so that the user does not see this login page. When form POST fails and the user cannot be logged in, they are presented with the remote resource login page.

Login Data Submission

The reverse proxy server can detect a login page it can try to automatically submit login data to the remote server, emulating a user filling out a login form. After we detect the login form we know all the information that we need to submit the data: Login Form Action URL and the list of fields. For each field we know its name, type and value. It can be therefore possible to iterate through the list of fields and generate either a body for the POST or a query string for the GET. Once we have the data and know the Action URL, you can submit the request to the remote server.

When configuring login form info, the administrator can be able to select whether the form can be submitted as a GET or a POST. In a GET request, all of the form fields can be treated as query string arguments, or if there can be no form fields, the action URL can be sent as a plain URL. This feature can allow the reverse proxy server to simulate almost any action a user would take in response to seeing a particular page.

Acquiring a User's Data

In order for the reverse proxy server to automatically log a particular user into a remote application, the reverse proxy server has to know the user's credentials (username, password, etc.) How does the reverse proxy server acquire this information?

When the reverse proxy server tries to generate a POST data to send to the remote server, it can try to go through all of the defined fields and get their values. At that time it can be possible to detect if the values for some of the fields have not yet been entered. When such a situation can be detected, the reverse proxy server can do two things: it can forward the login page to the user and it can set a flag on the user's session that indicates that a login page was just displayed to the user.

Under normal circumstances, the user can fill out the login page as they normally would if the reverse proxy server was not installed. When the user submits the form, the information goes back to the reverse proxy server. At that point the reverse proxy server knows which login form was submitted (because of the flag on the session), it knows the names of the fields that need to be captured (those are the fields that did not have data entered for them) and it knows the data for those fields (since the user just typed all the information in and sent it to the proxy). Having all this information makes it trivial to extract the data from the browser's POST request.

Dealing with Login Failures

What happens when the user's password on the remote system has changed or expired? How does the reverse proxy server detect such cases and acquires new credentials for the user? When a user's credentials change on the remote system, sending old credentials that the reverse proxy server has stored can result in a login failure. Since we are dealing with web applications, login failures are usually dealt with in two ways: either the remote application just shows the login page again (possibly with some additional text) or the remote application shows an error page with a link that says "click here to try again").

Based on the assumptions laid out above, we can claim that when the same login page can be displayed twice in a row (without displaying any non-login pages in between), then this can be a good indication of a failed login. So, what about a case when an error page is displayed? It can be possible to reduce that case to the previous one by defining this error page as a login form in the reverse proxy server. Since the expected user action can be clicking on a link (GET request), the administrator can just define a new login page in the reverse proxy server's admin UI, leave the set of fields empty, set it to GET, and set the Login Action URL to the URL of the link (we can use a regular expression to extract that info). Voila, we just reduced the case of separate error pages to the case of a repeated login page.

When the reverse proxy server detects a failed login it forwards the login page to the user and then switches to the mode of acquiring credentials.

Delegated Authentication

The reverse proxy server can be able to authenticate a user to a back end resource using the credentials from a $3^{rd}$ party SSO solution (i.e. Windows Integrated Authentication, Netegrity, Oblix, etc. . . . ). This can most likely involve forwarding the appropriate header to the resource.

In some cases, before forwarding content from the remote server to the browser, the reverse proxy server has to transform the data that it had received from the remote server. There are several types of transformations.

URL Re-Writing

Consider a case when an internal resource with the URL http://mail.plumtree.com/ can be mapped through the reverse proxy server to the URL http://runner.plumtree.com/mail. When the user hits the reverse proxy server URL, her request can be forwarded to http://mail.plmtree.com/ and she can be presented with some HTML page. What should happen to the links on that HTML page that point back to the original URL? The user might not have direct network access to mail.plumtree.com and therefore such links should be re-written to point back to http://runner.plumtree.com/mail.

The reverse proxy server leverages HTMLTransformer code from the portal to provide this functionality. You can learn more about this stage by looking at the code in the PTTransformerModule class. Such re-writing should only be needed in cases when the external URL can be different from the internal URL.

Tag Transformation

The reverse proxy server can be not only a proxy, but also a development platform for the composite application. One of the features that it provides to simplify the development of various applications can be support for adaptive tags. The idea is very simple: The reverse proxy server knows information about users, resources, security, etc. When an application includes a special tag into its HTML output, the reverse proxy server can find those tags and replace them with some user-specific data, or potentially perform some action of behalf of the remote application, etc.

After a response is returned from a remote resource, tag processing occurs. Tag processing also occurs on login and interstitial pages. Identifying tags within the text of the response can be again done by leveraging the HTMLTransformer and Tag Engine code from the portal. The tag processing can be controlled by the PTTagEngineModule class. Tag processing can be implemented using the same Tag Transformation Engine as in the 6.0 Portal. This engine has been componentized so that it can be reused by RProxy.

RProxy serves error pages in various contexts: login failure, maximum login attempts exceeded, permission denied when accessing a resource, et al.

The error page displayed can be chosen based on the resource being accessed and the current experience definition (which contains the URL of the error page). Error pages can not vary depending on the type of error. The remote server can have complete control over the HTML of the error page, and can simply include the error message by adding an RProxy error text tag to the content. In effect, error pages can work the same way as login and interstitial pages.

Error Request Information

In order to properly support customization of Error UI pages, RProxy can provide the remote error pages with certain information. This includes the information necessary for login requests (described earlier—including HTTP Headers, cookies, and request information), as well as the following information:

Error Type—What kind of error has occurred (i.e. Login, Request, Server, Other)

Error Code—A code for the specific error that has occurred (i.e. Invalid password, remote server unavailable, no such resource).

Error Severity—The severity level of the error (i.e. Warning, Error, Fatal).

The actual error message can be included on the remote error page through an error tag. Providing error types and codes to the remote server can allow the error page to make the decision to display the error or not, or to replace it with a custom error message.

The Adaptive Tag Engine from the 6.0 portal can be componentized and reused in the reverse proxy server. This involves several major tasks:

Remove portal dependencies from codebase.

Convert Tag Engine to Factory/Interface pattern in case the reverse proxy server needs different engine functionality than the Portal.

Unify Engine implementation details into a single easy-to-use class.

Write additional unit tests for the engine.

The reverse proxy server can utilize and maintain a specific set of tags that can be common with the portal tag engine. This can include the existing core and logic tag libraries from the portal, including any upgrades and bug fixes to the tags. There can also be a common tag library which can contain tags thought to be common to all applications that could integrate with the tag engine (currently portal and the reverse proxy server). This library can include error and user info tags. The portal tag libraries can have to be upgraded to match the reverse proxy server in the future.

In addition to providing support for the core engine tags (logic, html, i18n, etc. . . . ), the reverse proxy server can also need new tags to cover concepts only relevant to the reverse proxy server. These include:

Resource Links (data tags similar to current portal navigation data tags)

The Reverse Proxy Server Auth Sources (similar to current portal auth source tag, but per resource)

Pagelets (front end to pagelets, can be discussed in detail below)

The reverse proxy server Debug Tags for Roles and Experience Definitions (how did you get the current role and/or login page)

The reverse proxy server Info Tags (Role & User)

Analytics Tag (Add any analytics event you want)

Paglets are composed of two basic parts: a front-end pagelet tag and a pagelet engine. The pagelet tag can be sued to insert a pagelet into HTML. It can be then replaced by the reverse proxy server with the content of the pagelet. The pagelet engine can be a massive parallel pagelet processing (mp3) engine that can be used to retrieve multiple pagelets from band end resources simultaneously.

Pagelet Tag:

The tag can be a simple tag that can allow a user to specify the pagelet ID and include data to be passed to the pagelet. There can be two kinds of data passed to the pagelet. The first can be tag attributes, and the second can be an XML payload. The standard xhtml tag attributes in the pagelet page (i.e., not pt: attributes can be passed to the pagelet directly. The XML payload allows the HTML authority to include more complicated data to be passed to the pagelet. A pagelet tag can look like this:

```
<pt:ensemble.inject pt:name="al-collab:discussion"discussionid=21">
    <discussion>
        <expandedmessages>
            <messageid>27<messageid>
            <messageid>36<messageid>
            <messageid>144<messageid>
        <expandedmessages>
        <currentmessage>
    <messageid>27<messageid>
    <currentmessageid>
    <discussion>
</pt:ensemble.inject>
```

The massively Parallele Pagelet Processing (mp3) Engine can allows the pagelet system to retrieve multiple pagelets simultaneously. In order to retrieve content, a client component can create a Request Chain composed of individual Requests. Each request can control all of the information necessary to retrieve a single pagelet. This information includes the ID of the pagelet, the back-enc resource URL>, the pagelet attributes, and the XML payload.

The Request Chain can send off multiple HTTP request to retrieve the data, and the data can be available to the client component after all requests have returned or timed out. The data can then need to be transformed and converted into a Markup Array.

Pagelet Request Flow

The pagelet request flow can involve 2 passes through the HTML data. The pass can collect the apgelet data and initiate content retrieval. While the second pass can convert the standard adaptive tags and replace the pagelet tags with the pagelet data.

User request page from the reverse proxy server.

The reverse proxy server retrieves content from the remote server.

Transformer converts HTML into markup fragments.

$1^{st}$ pass through markup fragments can be done to convert URLs and retrieve pagelets and pagelet data.

MP3 request chain can be initiated for all the pagelets simultaneously and waits until. All pagelet content can be retrieved for all the pagelets simultaneously and waits until all pagelt content can be retrieved.

Returned content can be processed for adaptive tags in individual tag engines (pagelet tags not allowed).

Adaptive tags in the main page are processed. Individual pagelet tags insert the processed pagelet content into the HTML output. Transformed and processed HTML content can be returned to the end user.

Pagelet JavaScript and Style Sheets

There are two main requirements for pagelet JavaScript and Style sheets. The first requirement can be that there can be a way to put JavaScript and Style Sheets into the head element of the HTML page. The second requirement can be that duplicate .js and .css files only be included once per HTML page.

Pagelet developers can need to mark their JavaScript and Style sheet links to be included in the head using a special JavaScript tag (i.e. <pt:common.incudeinhead>).pagelt consumers can then need to include a special Include JavaScript Here tag (i.e. <pt:common.headincludes>) in the Head element of their HTML page. Pagelet JavaScript from head tags would then be included in the output of the Head Includes tag. The Includes tag would also filter out duplicate .js and .css files.

Security Model

Two types of security exist in the reverse proxy server. The first can be security enforcement exercised on RProxy consumers, whose action can be to access a particular resource. This security can be managed through resource policies, and dictates whether a user has access to a resource. The second can be internal security exercised on RAdmin administrators, whose action can be to configure RProxy. This security dictates whether which the reverse proxy server constructs can be viewed or configured by a particular administrator.

Proxy Security

The reverse proxy server resource can be protected by its resource policy, which describes the conditions under which a user may be granted access to the respective resource, and the roles associated with those conditions.

Resource Policy API

The following interfaces compose the subsection of the Rules API that can be specific to policies:

IResourceRuleFactory can be the entry point to policies. It can be used to generate an IResourceRuleService based on the CRE or Security Service implementations.

IResourceRuleFactory:
   IResourceRuleService GetResourceRuleService(POLICY_ENGINE_TYPE)
     enum POLICY_ENGINE_TYPE {CSS, CRE}

IResourceRuleService can be the main entry point to the policy rule manager and evaluator.

IResourceRuleService:
   IResourceRuleManager GetResourceRuleManager( )
   IResourceRuleEngine GetResourceRuleEngine( )
   IResourceConditionTypeManager GetResourceConditionTypeManager( )

IPolicyRuleEngine can be the run-time role evaluation engine.

IPolicyRuleEvaluator
   List<IResourceRuleRole> getRoles(IRunnerIdentity user, IRunnerResource resource, Map context)

IResourceRuleManager administers policies, rules, roles, and conditions.

Creating a policy rule IResourceRule automatically creates the associated IResourceRuleRole and IResourceBackendRole.

IResourceRuleManager: extends IRuleManager
   List<IResourcePolicy> GetPolicies( )
   IResourcePolicy GetPolicy(int policyID)
   List<IResourceRole> GetPolicyRoles( )
   IResourceRole GetPolicyRole(int roleID)

IResourceRoleRule extends IRule
   IResourcePolicy GetPolicy( )
   IGroup[ ] getGroups( )
   void addGroup(IGroup)
   void removeGroup(IGroup)
   IUser[ ] getUsers( )
   void addUser (IUser)
   void removeUser (IUser)
   IResourceRole GetRole( )

IResourceRole
   IResourceRoleRule getRule( )
   IResourceBackendRole getBackendRole( )
   IResourcePolicy getOwningPolicy( )

IResourceBackendRole
   IResourceRole getResourceRole( )

A default IResourcePolicy can be created when each IRunnerResource is created. In Springbok, there is one and only one policy per Resource.

IResourcePolicy
   void addRole(IResourceRole role)
   void removeRole(IResourceRole role)
   IResourceRole[ ] getRoles( )
   IRunnerResource getOwningResource( )
   IResourceConditionTypeManager extends IConditionTypeManager. It simply limits the conditions that are retrieved, but adds no other functionality.

Policy Evaluation

When a request comes in to RProxy, the target resource and the incoming subject can be specified in the context Map. "Subject" encapsulates the following elements that describe the context of the request:
   the user's identity
   the environment under which the request can be being made
   the time of day
   the date
   the IP address of the requesting computer RBAC Security The policy of the requested resource can be then evaluated, which decides whether this particular request can be granted access in the form of a simple "YES" or "NO" answer.

Security designs can be based on role-based security (Role-Based Access Control, or RBAC). To be clear, what this means is that a resource policy defines one or more roles that can access the resource, and describes what it means for a user to be in each of these roles. Then, an incoming subject can be granted access to the resource if and only if the subject meets the criteria of one of those roles.

This can be in contrast to Access Control List (ACL) security, where control over a resource can be defined by a list of explicit users or groups that can access the resource. The ACL on a resource typically defines what actions can be performed on resource by each group. RBAC can be more easily managed than ACL security when there are many users and groups, which can be true in our case.

For a given resource, a set of security roles can be specified. Each role can be composed of the set of users and groups that can be considered for this role, and a series of rules that describe the conditions under which a subject can be considered to be part of this role.

The rules for a role are a series of conditions that are combined with the Boolean operators "AND" and "OR" and nesting to return a "YES" or "NO" decision on whether a subject can be in the role. Notice, the Boolean operator "NOT" can be unsupported for Springbok for purposes of semantic clarity.

A rule condition can of the following types:

| Subject attribute | Number of Arguments | Possible Value Types | Possible conditions |
|---|---|---|---|
| IP Address | One | An IPv4 or IPv6 address with optional subnet mask | Equals |
| Time | Two | 1st Arg: Time of Day 2nd Arg: Time of Day | Between (crossing over midnight is valid) |
| Date | One or Two | 1st Arg: YYYY/MM/DD 2nd Arg: YYYY/MM/DD | Equals (one arg) or Between (two args) |
| Day of Week | One | Weekday or Weekend | Equals |
| User Attribute | Two | 1st Arg: valid user profile element 2nd Arg: a string with no regular expressions | Equals or Contains |
| — | One | A rule (must already exist) | Is True |

Each resource has an associated policy, and each policy contains a set of defined roles. Each role can be a set of users and groups that can be considered for the role, and a set of rules under which a subject can be considered part of this role.

An incoming request subject can be evaluated against each role for a particular resource, and if the subject can be found to be in one or more roles, the access decision can be "YES" and the set of matching roles can be then passed on to the protected resource as additional information.

Security Service Rule Engine

Security Service provides extensive flexibility in evaluating rules, and requires no external dependencies.

Policy Implementation and Dependencies

Resources policies have two distinct components; policy rule evaluation and policy persistence. On both accounts, policy rules and experience rules have the same structure of complex Boolean operators tying together conditional statements. Valid types of conditions overlap in both cases. The only notable architectural and functional difference can be that top-level experience rules are evaluated sequentially, while top-level resource policy rules are evaluated with Boolean operators.

Clearly, the similarities in resource policies and experience rules beg for a common persistence API and rule engine. Referencing the Experience Rules section of this document, the strategy in persistence can be to construct rules that are stored in elemental form so that they can be modified and retrieved incrementally through a rule builder UI, and keep these rules synchronized with a rule engine.

The proposed API for building rules in the Experience Rules section satisfy the requirements of Resource policies, as does the rule engine interface. However, the rule engine should be provided via Security Service's extensive rule evaluation capabilities rather than Portal 6.0's implementation of the Core Rule Engine.

Security Service Integration Overview

Security Service v1 provides an expressive set of security features, but has some constraints to which the reverse proxy server must work around in order to provide authorization via Security Service. Security Service works in the following way: Security Service provides a set of security services including authentication, authorization, and role mapping. Each of these services communicates through Security Service via a plug point and can be swapped in and out with different implementations of the same service. Because of this, each service can be called a "provider" and default providers come packaged with Security Service for each of the services. For example, the default role mapping provider can be implemented based on the XACML standard.

Providers are swapped via mBeans, and security configuration can be also performed by manipulating mBeans. Runtime security evaluation can be performed via a separate set of interfaces.

For role mapping, configuration may be not straightforward, because the XACML provider does not provide an interface for direct manipulation of XACML constructs. Manipulations are limited to the addition, deletion, and replacement of XACML policies. Policies can be passed in as either raw XACML strings or the Policy object that can be part of the CSS/XACML policy schema, which can be found at com.bea.common.security.xacml.policy (in cssenv.jar).

Common Rules API

Policies and experience rules are both constructed out of potentially nested and complex Boolean expressions, and based on product requirements, also share many of the same basic conditions. Because constructing a rule schema is a significant enough effort, it makes sense to share as much as the effort involved between the two as possible. Experience rules and Resource policies are different in functional aims but are distinctly similar in their form and composition. This has led to an effort to consolidate their design, API, and implementation as much as possible. The benefits of this are:
  elimination of duplicate efforts
  a common API allows for the potential for a shared management UI
  code reuse The following API defines generic interfaces for representing rules and expressions, including different types of operators and condition types. The rule management API for creating, loading, saving and deleting rules and expressions is also defined as part of the common interfaces. The goal of the common API is to provide a unifying interface for representing both resource policies and experience rules such that the different management consoles (UI) for these different types of rules can use the same API for managing and displaying the rules. In addition, common API encourages code reuses between resource policy and experience rule implementations.

Definitions:
  Expression: a set of conditional clauses separated by operators (AND/OR) that evaluates to either TRUE or FALSE. The most basic expression consists of just a single conditional clause (e.g., [IP-address=192.168.0.1]). Expressions can be nested to form a more complex expression.
  Rule: an expression that is associated with an action, such that when the expression evaluates to TRUE, the action can be chosen/executed. In essence, a rule is an IF-THEN statement, with the expression being the IF part and the action being the THEN part. The action can be producing an object ID (for example, an Experience Definition in the case of Experience Rules) or just a Boolean outcome (for example, access or no-access in the case of Policy Rules).

Rules API
Java Package: com.plumtree.runner.rules
Rule and Expression Interfaces
IExpression:
Property: int id
Property: String name Property: String description
Property: Date created
Property: Date lastModified
boolean isComplexExpression( )
ISimpleExpression extends IExpression
Property: int conditionTypeID //(e.g., Accessed Resource, IP address, Time, etc)
Property: int conditionOperatorTypeID //(e.g., equal, greater-than, between, etc)
Property: String conditionValueStr
Property: String conditionValue2Str //(for condition types that require 2 input values, e.g., time condition that requires start time and end time)
IComplexExpression extends IExpression
Property: int operatorTypeID //(e.g., AND operator, OR operator)
Property: Set<IExpression> subExpressions( )
void AddSubExpression(IExpression s)
void RemoveSubExpression(IExpression s)

An expression is either a simple expression (i.e., the most basic expression containing only a single conditional clause), or a complex expression (i.e., containing sub-expressions joined together by a logical operator).

The following properties are used by a simple expression to specify a conditional clause:
conditionTypeID, which indicates what type of condition it is, e.g., IP address or time.
conditionOperator, which indicates the type of equality/range operator (equal, greater than, etc) used in comparing the condition value.
conditionValue, which is the value to compare the condition against, e.g., 192.168.0.1 for an IP-address condition type.

The following properties are used by a complex expression to construct an expression tree:
subExpressions, which lists the sub-expressions this expression depends on
operatorTypeID, which indicates the relation between the sub-expressions, i.e., either the sub-expressions are AND-ed or OR-ed together, or negated (NOT-ed).

IRule:
Property: IExpression condition
Property: int actionValue
Property: int id
Property: String name
Property: String description
Property: Date created
Property: Date lastModified By definition, a rule is an expression that has an associated action value with it, such that when the expression evaluates to true, the action value can be used. If we think of nested expressions being a tree of sub-expressions (recursively), the top-level (root) node is the one that can be referenced by a rule (to form the expression for its condition).

Condition Type and Operator Type Interfaces

Examples of condition types can be Requested-Resource, or client-IP-address, time, etc. Given input values, a condition type can evaluate to either TRUE or FALSE. Most condition types take in only a single condition value (e.g., IP address==<value>) but some may take two condition values (e.g., time between <value1> and <value2>).

IConditionType:
Property: int conditionTypeID
Property: String name
EnumSet GetSupportedConditionOperators( )
int GetConditionValueCount(ConditionOperator op)
boolean Evaluate(Map context, ConditionOperator op, Object conditionValue)
boolean Evaluate(Map context, ConditionOperator op, Object conditionValue1, Object conditionValue2)
Object ConvertValueFromString(String strValue)
String ConvertValueToString(Object value)
enum ConditionOperator (EQUAL, NOT_EQUAL, GREATER_THAN, LESS_THAN, GREATER_THAN_OR_EQUAL, LESS_THAN_OR_EQUAL, BETWEEN):
Property: int operatorTypeID
ConditionOperator valueOf(int operatorTypeID)
enum OperatorLogical (AND, OR, NOT):
Property: int operatorTypeID
OperatorLogical valueOf(int operatorTypeID)
boolean Evaluate(List<Boolean> subExpressions)

Why do we have ConditionOperator and OperatorLogical in separate enums? ConditionOperator is an equality or range operator used in constructing a condition (which consists of a condition type, a condition operator, and one or two condition values), while OperatorLogical is used for constructing nested expressions that are joined together using either AND or OR operators, or negated (NOT). Since we cannot use a ConditionOperator in place of an OperatorLogical, and vice versa, it provides a better type-safe checking to separate the enum.

Rules Management API
Object Manager Interfaces (Management API)
IExpressionManager:
List<? extends IExpression> GetExpressions( )
List<? extends IExpression> GetExpressions(Map contextFilter)
IExpression GetExpression(int expressionID)
ISimpleExpression CreateSimpleExpression( )
IComplexExpression CreateComplexExpression( )
void SaveExpression(IExpression expr)
void DeleteExpression(IExpression expr)
IRuleManager:
List<? extends IRule> GetRules( )
List<? extends IRule> GetRules(Map contextFilter)
IRule GetRule(int ruleID)
IRule CreateRule( )
void SaveRule(IRule rule)
void DeleteRule(IRule rule)
IConditionTypeManager:
IConditionType GetConditionType(int conditionTypeID)
List<? extends IConditionType> GetConditionTypes( )

Rules Architecture Strategy

The strategy for the unified and experience/resource-specific issues is:
Interfaces
the core API for managing rules has been consolidated into one unified API
experience rules and policy rules have specific managers as well
experiences and policies have separate (non-shared) engines for evaluation Experience Rules/Definitions In the reverse proxy server, an Experience Definition is a set of properties that defines a user's experience when logging in to the reverse proxy server and when using the reverse proxy server. Typically, use cases include selecting which login page to use (for the primary authentication), which authentication source to use by default, which error page to display when an error occurs, etc. An experience definition can be selected conditionally based on rules (experience rules), using conditions such as which resource being requested, the IP address of the request origin, and/or other supported condition types.

An administrator can compose rules based on Boolean expressions (using AND/OR operators on conditional clauses). These rules can have priority (ordering) assigned to them and can be processed in order until the first match (i.e., the first rule that evaluates to TRUE). The output of this rule can be used to pick an Experience Definition for the current request.

The scope of the implementations includes the following components:

Native Rule Service component:
  Provides a basic implementation a rule engine that can evaluate rules and expressions defined in the common Rules API section, directly without relying on any external rule engine.

Experience Rule component:
  Extends and implements the expression/rule interfaces defined by the common Rules API, specifically for experience rules implementation. Persistence of experience rules and the different condition types supported by experience rules can be implemented as part of this component.

Experience Definition component:
  Experience definition is the "outcome" of executing experience rules, when the rule matches. The definition consists of a set of properties that can be specific to the reverse proxy server. Persistence of experience definitions is part of this component.

Native Rule Service

This component provides a basic rule engine (rule evaluator) implementation that can evaluate rules and expressions defined in the Common Rules API section, natively (i.e., without delegating the evaluation process to any external engine).

Interfaces
  Core Rule Engine Interface (Runtime API)
  IRuleEngine:
  int Evaluate(Map context)

Core Rule Engine is the basic implementation of a native (built-in) rule engine. At runtime, the engine can be invoked and executed by calling the Evaluate ( ) method on the rule engine passing in the input environment (context) containing the input data at the time of evaluation (e.g., the URL of the request, etc), which can be used by condition type objects to evaluate the expression.

How the input environment (context) gets populated is specific to the underlying implementation of the condition type object. The common Rules API defines only the interface for IConditionType. The class implementation of the interface is the one that decides what key and value that it needs to store in the input environment.

Native Rule Service Interface (Entry-point API for accessing the rule service)
  INativeRuleService:
  IRuleEngine getRuleEvaluator( )
  IExpressionManager getExpressionManager( )
  IRuleManager getRuleManager( )
  IConditionTypeManager getConditionTypeManager( )
  void setRuleEvaluator(IRuleEngine re)
  void setExpressionManager(IExpressionManager em)
  void setRuleManager(IRuleManager rm)
  void setConditionTypeManager(IConditionTypeManager ctm)
  INativeRuleFactory:
  INativeRuleService getRuleService( )

The INativeRuleService is the entry point to get the rule-related services utilizing the built-in rule engine. From this, we can get access to the runtime API (IRuleEngine). We can get access to the rule and expression management API (IRuleManager, IExpressionManager). We can get the list of available condition types through the IConditionTypeManager. Each of these modules can be swapped with a different implementation of the same, since the INativeRuleService interface defines not only the getter, but also the setter for these different modules.

Implementation

For the implementation of the rule engine, we re-use and refactor the G6 Portal Experience Rule Engine for native rule evaluation within the reverse proxy server. The IRuleEngine implementation can be the refactored engine from G6 Portal. The IExpressionManager/IRuleManager implementation can use Hibernate-backed. We can implement such an IExpressionManager/IRuleManager within the Native Rule Service itself, or delegate those object manager implementations to the downstream component (upper layer) that uses and builds on top of the Native Rule Service (so that the downstream component can have more flexibility, for storing extra attributes in rules/expressions, or using different persistence mechanisms, etc).

Other consideration: Security Service-Based Rule Service

There is another option that we have considered for the rule service implementation that does not require a built-in core rule engine. For this option, both the runtime rule evaluation and the admin-time rule management rely on the XACML provider in Security Service. The rule engine implementation can delegate the actual work to the Security Service XACML provider. The expression/rule manager can use the MBean interface of the XACML provider to create/retrieve/update/delete rules (as XACML policies). One challenge with this option is that Security Service does not expose its internal/core rule engine directly; instead, its rule engine is wrapped inside an access-control/role mapping service interface, and hence the only way to access its rule engine is by making up some mock access-control requests and storing our generic rules and expressions as access-control policies (written in XACML). We may also need to maintain some meta-data outside Security Service to describe extra information not readily stored in Security Service. This approach seems counter-intuitive if what we focus on is a clean/elegant design for the Rule Service implementation. However, if code sharing and code maintenance is a priority, this should give us a nice way to delegate code development and maintenance of a rule engine to the Security Service team.

We decided, for the purpose of experience rules evaluation, to just use and implement the native rule engine, instead of relying on Security Service.

Experience Rules

Experience Rule component builds on top of the Native Rule Service component, by implementing condition types specific for the reverse proxy server experiences, and implementing IExpression, IRule and object managers (IExpressionManager, IRuleManager, IConditionTypeManager) that know how to load and persist experience expressions, rules, and condition types for the reverse proxy server experience.

Condition Types

Following is the list of condition types supported by the reverse proxy server experiences:
  Requested Resource
  Client IP Address
  Time
  Day of Week
  Date Client Browser Type (User-Agent request header)

Locale (Accept-Language request header)

The client IP address condition type can be used to represent both IPv4 and IPv6 IP addresses. The comparison method uses regular expression to compare the IP-address string, allowing both exact match and wildcard match on an IP address. The IP-address-to-string conversion internally utilizes HttpServletRequest.getRemoteAddr ( ) method that returns a string representation of the IP-address. Rule administrator can then create a regular expression to match the IP-address string.

The Time condition type can allow range operators (greater than, less than) in comparing with a condition value, and use the server's time zone when displayed on the UI but can be converted to use UTC time zone when stored in the database.

The list of available condition types for the reverse proxy server experiences at start-up can be predefined ("hard-coded") or automatically discovered. Although we do not aim for extensibility (of allowing custom condition types) for the reverse proxy server v.1.0, we can design the architecture for discovering the available condition types to be flexible, and in a way that does not prevent customers from writing their own custom conditions in the later version of the reverse proxy server.

To allow flexible settings for the list of condition types, we can either use an XML config file (based on openconfig, stored in the same directory as the reverse proxy server main-config.xml), or use a database table and seed the table during installation of the reverse proxy server. The setting contains a list of Java class names that implement the IConditionType interface that can be loaded and used by experience rules.

Populating Input Environment for Condition Type Evaluation

For an expression to evaluate to either TRUE or FALSE, e.g., (Client-IP-Address=192.168.*), we need to be able to obtain the client's IP address from the HTTP request object, and somehow pass that information down to the rule engine, which in turn delegates the evaluation to the corresponding condition type object, which can evaluate the input against the defined condition value (i.e., 192.168.*).

The mechanism that we use to pass that information down is through a context map that we call input environment. Before the rule engine evaluates the rules, we need to populate the input environment using the data from the HTTP request and other information. Each of the condition type class implementations needs to implement this method with the actual code that extracts the information from the passed in parameters (HTTP request object and the reverse proxy server resource) and put the necessary information (needed by its runtime evaluation) into the input environment context map.

Condition Type UI Renderers

Since different condition types may have a difference UI, e.g., a resource picker for Requested-Resource condition, a date/time picker for date/time conditions, a set of 4 small boxes for IP-Address, we can employ a UI Renderer mechanism for rendering different condition types (for creation of expressions in the Admin UI).

UI Renderer mechanism can be essential when we need to support extensibility later on, allowing customers to create their own condition type and plug that in to the Experience Rules. By defining the interface for the condition type as well as the renderer for it, customers may create a custom type and provide a renderer for it such that the custom type can (potentially) be discovered in the reverse proxy server Admin UI for creating experience rules.

The mechanism of how a renderer is associated with a condition type can be scoped out in the reverse proxy server Admin UI project.

API/Classes

Java Packages:

com.plumtree.runner.experience (for the interfaces)

com.plumtree.runner.persistence.experience (for Persistent* classes)

com.plumtree.runner.impl.experience (for the rest of the classes)

IExperienceExpression extends IExpression, IPersistentObject

ISimpleExperienceExpression extends ISimpleExpression, IExperienceExpression

IComplexExperienceExpression extends IComplexExpression, IExperienceExpression

IExperienceRule extends IRule, IPersistentObject:

Property: int priority //(priority/positioning of the rule in relation to other rules)

PersistentExperienceExpression extends PersistentObject implements ISimpleExperienceExpression, IComplexExperienceExpression PersistentExperienceRule extends PersistentObject implements IExperienceRule ConditionTypeBase implements IConditionType:

void PopulateContext (Map context, HttpServletRequest request, IRunnerResource requestedResource)

ConditionTypeResource extends ConditionTypeBase

ConditionTypeClientIP extends ConditionTypeBase

ConditionTypeTime extends ConditionTypeBase

ConditionTypeWeekday extends ConditionTypeBase

ConditionTypeDate extends ConditionTypeBase

ConditionTypeBrowser extends ConditionTypeBase

ConditionTypeLocale extends ConditionTypeBase

IExperienceRuleManager extends IRuleManager (extending for covariant return types)

ExperienceRuleManager implements IExperienceRuleManager

ExperienceConditionTypeManager implements IConditionTypeManager

Experience Service API (Entry-point API to access experience-related services)

IExperienceFactory:

IExperienceService GetExperienceService( )

IExperienceService:

IExperienceDefinition Evaluate(HttpServletRequest request, IRunnerResource requestedResource)

IConditionTypeManager getConditionTypeManager( )

IExperienceRuleManager getRuleManager( )

For consistency with the other the reverse proxy server API, we should modify the IPersistenceService to add the following methods:

IExperienceExpression createExperienceExpression (boolean isComplex)

IExperienceRule createExperienceRule( )

IExperienceExpression getExperienceExpression(int expressionID)

IExperienceRule getExperienceRule(int ruleID)

IExperienceExpressionSearch createExperienceExpressionSearch( )

IExperienceRuleSearch createExperienceRuleSearch( )

IExperienceExpressionSearch extends IRunnerSearch:

List<IExperienceRule> performSearch( )

IExperienceRuleSearch extends IRunnerSearch:

List<IExperienceRule> performSearch( )

The entry-point API for accessing experience rules can be the IExperienceService and the IPersistenceService, which both can be accessible from the IRunnerApplication.

Experience Definitions

Experience Definition (XD) is a set of properties that can be used by the reverse proxy server to determine the settings for user's experiences, primarily related to the user's primary authentication to the reverse proxy server (authentication source, login and interstitial pages), before an unauthenticated user accesses a protected the reverse proxy server resource.

An experience definition is the outcome of running experience rules. Hence, the selection process of which XD to be used for the current request can be made conditional (and customers can define it) based on a number of things.

Properties of Experience Definitions

Each experience definition contains the following properties:

Login Resource:
  A the reverse proxy server resource that provides the login/interstitial/error pages. This is a normal resource under the cover but it has additional restrictions. Its external URL determines where the user can be redirected to in order to begin the login sequence.
Pre-login Interstitial Page URL suffix:
  A suffix appended to the external URL prefix of the login resource to determine the pre-login interstitial page endpoint (e.g., a page to display "System Down" message).
Login Page URL suffix:
  A suffix appended to the external URL prefix of the login resource to determine the login page endpoint, which is where users are redirected at the start of interactive login.
Post-login Interstitial Page URL suffix:
  A suffix appended to the external URL prefix of the login resource to determine the pre-login interstitial page endpoint (e.g., to display a "User Agreement" page or "Password expires in 10 days" message).
Error Page URL suffix:
  A suffix for the error page. An error page only gets visited when an error occurs.
Authentication Sources, and Default Authentication Source
Authentication Method
Post Logout Page URL:
  This URL is visited after SSO logout occurs.
Max Interstitial Visits:
  This is the number of times a user can visit interstitial pages before causing an error. This prevents the user from not clicking the "I agree" in a consent page and visiting it forever, and also prevents accidental loops since the administrator can write custom interstitial pages. Set it to −1, if no maximum should be enforced.

Persistence of Experience Definitions

Hibernate-based persistence for experience definitions should be relatively straightforward. The relevant association mappings in experience definition:

Many-to-many mapping from Experience Definition to Authentication Sources

Many-to-one mapping from Experience Definition to Authentication Method ("proxy authenticator")

The reverse proxy server can obtain the list of available authentication sources from the Security Service. There can not be any DB table (like PTAuthSources in Portal) that stores the list of available authentication sources in the reverse proxy server schema, which the ExperienceDefinitions table can be joined with. Hence, authentication sources mapping in experience definition can use a simple (element) collection mapping.

```
<hibernate-mapping>
    <class
name="com.plumtree.runner.persistence.experience.PersistentExperienceDefinition"
        table="ExperienceDefinitions">
        ...
        <!-- authentication method -->
        <many-to-one name="proxyAuthenticator" column="AuthenticatorID"
            class="com.plumtree.runner.persistence.resource.PersistentProxyAuthenticator"
/>
        <!-- authentication-sources -->
        <property name="defaultAuthenticationSourceID" />
        <set name="authenticationSourceIDs" table="ExperienceDefinitionAuthSources" >
            <key column="ExperienceDefinitionID" />
            <element type="integer" column="AuthSourceID" />
        </set>
    </class>
</hibernate-mapping>
```

API/Classes
Java Packages:
com.plumtree.runner.experience (for the interface)
com.plumtree.runner.persistence.experience (for Persistent* classes)
IExperienceDefinition extends IPersistentObject
Property: IRunnerResource loginResource
Property: String interstitialPagePreLogin
Property: String loginPage
Property: String interstitialPagePostLogin
Property: String errorPage
Property: List<Integer> authenticationSourceIDs
Property: Integer defaultAuthenticationSourceID
Property: IProxyAuthenticator proxyAuthenticator
Property: String postLogoutPage
Property: int maxInterstitialVisit
PersistentExperienceDefinition extends PersistentObject implements IExperienceDefinition
IExperienceDefinitionSearch extends IRunnerSearch:
List<IExperienceDefinition> performSearch( )
ExperienceDefinitionSearch extends PersistentSearch implements IExperienceDefinitionSearch
Modify PersistenceService to add the following methods:
IExperienceDefinition createExperienceDefinition( )
IExperienceDefinition getExperienceDefinition(int expDefID)

IExperienceDefinitionSearch createExperienceDefinitionSearch( )

Runner-Experience Runtime Integration

This section discusses the runtime integration points of the rule engine, experience rules, and experience definitions into the reverse proxy server's lifecycle of processing stages. Integration points include steps to discover the available condition types for the reverse proxy server experiences, to load experience rules from database, to initialize the rule engine, to populate the input environment map prior to executing rules for the current request, to execute the rule engine, and to integrate the resulted experience definition into the reverse proxy server's primary authentication module, and other places that need to get a handle of current definition (e.g., to redirect to an error page).

Initialization

The following activities can be performed during the initialization of ExperienceFactory/ExperienceService object, which is performed during PTApplication.init( )

Initialize ExperienceConditionTypeManager, which performs:

Discovery of available condition types (from reading from a config XML file or from database)

Instantiation of these condition type objects into a list that it maintains

Initialize ExperienceRuleManager, which performs:

Loading of experience rules from database

The caching of the rules can rely on Hibernate's second-level cache.

Instantiate a Native Rule Service instance, and set the condition type manager and rule manager to use the ExperienceConditionTypeManager and ExperienceRuleManager initialized in the previous steps.

Rule Evaluation Time

In processing of an incoming request, whenever we need an Experience Definition, we can call the runtime API IExperienceService.Evalute(.). This API can run all the experience rules and return an IExperienceDefinition object. The following activities can be performed during the execution of this API:

Populate the input environment (context) by iterating the available condition type objects and call PopulateContext( )method on each, passing in the necessary runtime objects needed by the condition (e.g., HTTP request).

Invoke the rule evaluator's Evaluate( )method, passing in the input environment context generated in the previous step. The rule evaluator can internally check with the rule manager (ExperienceRuleManager in this case) for any new rules recently added (this should be transparent if we use Hibernate), evaluate the experience rules one by one until the first match, and return the object ID of the Experience Definition to be used.

Retrieve and return the corresponding ExperienceDefinition object.

Currently, the main downstream consumer of experience service is the SSOLoginModule (for the reverse proxy server's primary authentication). In SSOLoginModule.onAuthenticateUser( ) and its Login Manager classes, the experience rules can be evaluated to produce an ExperienceDefinition containing the needed data for authentication method ("proxy authenticator"), as well as login and interstitial pages if an interactive-login authentication method is selected.

The list of authentication sources listed in the current ExperienceDefinition can be used to render the "authentication source" drop-down list, potentially through a the reverse proxy server tag.

The default authentication source information in the current ExperienceDefinition can be used when no authentication source is specified by the user submitting the login form.

It is up to the caller (downstream consumer) of experience service, whether to cache the result of evaluating the rules, or to invoke the rules every time an experience definition is needed. For better performance, the rule evaluation should typically not be invoked more than once per request handling cycle. For requests that do not need an experience definition, the rule evaluation should very well be skipped.

Auditing

Auditing is the examination of records or accounts in order to provide a clearer picture of what was going on at any given point in time. Towards that end, the reverse proxy server auditing module can be responsible for 3 main tasks:

1. Audit Recording—Gathering data from the following defined events and storing it in the reverse proxy server DB.
   a. Access Record—(Proxy) Information regarding the accessing of specified resources. (who, which, when, how)
   b. Authorization Configuration Record—(Admin UI) Information regarding any kinds of changes involving authorization policies, including the identity of the changer and the new policy definition.
   c. Resource Configuration Record—(Admin UI) Information regarding any changes made in resource configurations, such as authentication requirement levels.
2. Audit Retrieval—Retrieval of queried data, through the Admin UI, from the reverse proxy server DB. The data can be returned as a list of AuditRecord objects. The audit data can also be exported in CSV format to an OutputStream.
   a. The data retrieved can be provided in the following types of reports:
      i. Access Reports
         1. Resource Access: Given a resource and time period, list all user access instances
         2. User Activity: Give a user and time period, list all resources accessed
      ii. Authorization Change Report
         1. Authorization: Given a resource, list all authorization changes over a time period.
      iii. Resource Change Report
         1. Resource Changes: Given a resource name, list all resource changes over a time period.
   b. The DB tables can be directly accessible to the user. Each audit type can have a table assigned to it. The Authorization Configuration Records and Resource Configuration Records each can also have a separate data table, to store the record-specific properties.
      i. Access Record—ACCESSAUDITRECORDS
      ii. Authorization Configuration Record—AUTHORIZATIONCONFIGAUDITRECORDS, AUTHORIZATIONCONFIGDATA
      iii. Resource Configuration Record—RESOURCECONFIGAUDITRECORDS, RESOURCECONFIGDATA
3. Current State of User Access Privileges (CSUAP)—Checking the Proxy server to determine the potential access privileges of any given user with their roles, or all the users who can potentially access a given resource with any of their roles. This can be done through the Admin UI. CSUAP data can not be exported.

a. Accessibility Reports i. User Reach: Given a user, list all resources the user could potentially access, as well as the roles available.

It is NOT a goal of this project to support dependency injection.

Audit Events

These are the 3 types of events to passed over:

Access Audit Record

Generated when users access a specific resource that has been flagged for auditing.

Event Properties time—DB generated user name—unique, fully qualified, includes domain user type—the role used by the user to access the resource service name—machine name from where the record is generated access resource URL—external URL used to access the resource. Size cap of 256 characters.

client IP address primary authentication method resource id

Authorization Configuration Record

Generated when any alterations are made regarding authorization policies.

Event Properties time—DB generated user name—unique, fully qualified, includes domain user type—the role used by the user to access the resource service name—machine name from where the record is generated action type—creation, change, or deletion resource id properties Resource Configuration Record Generated when resource configurations are altered.

Event Properties time—DB generated user name—unique, fully qualified, includes domain user type—the role used by the user to access the resource service name—machine name from where the record is generated action type—creation, change, or deletion resource id properties Audit Recording Configurations Configuring audits can involve changes on specific resource objects. Both authorization configuration audit records and resource configuration audit records are active by default, and cannot be configured.

Configurable on the resource object:

Can be implemented using getAuditFlag( ) and setAuditFlag( )methods in IRunnerResource Unique Resource Visit Access flags—record or ignore unique resource visits. Specific to each resource. All flags are off by default.

These changes in audit configuration can be recorded as Resource Configuration Audit records.

API

The top-level class for the Auditing API is the RunnerAuditMgr, which implements IAuditMgr and can contain all the methods for writing and retrieving data to and from the reverse proxy server DB, using Hibernate. All auditing done through Hibernate can be implemented according to Transaction rules.

AuditFactory implements IAuditFactory, and generates the RunnerAuditMgr to be used in the module.

All persistent objects, except AuditRecord which is abstract, are created by the PersistenceService. The persistent objects are:

AccessRecord, AuthorizationConfigRecord, ResourceConfigRecord, AuditRecord, and AuditData.

AuditRecord objects are used by Hibernate to generate table rows. The AuditRecord class is abstract, and implements IAuditRecord, which contains methods that are shared across all audit records. There are three subclasses of AuditRecord, one for each specific type of audit record: Access, Authorization Configuration, and Resource Configuration. Each of the subclasses implements an interface.

IAccessRecord for AccessRecords

IAuthorizationConfigRecord for AuthorizationConfigRecords

IResourceConfigRecord for ResourceConfigRecords.

The 2 interfaces IAuthorizationConfigRecord and IResourceConfigRecord both extend the IConfigRecord interface.

AuthorizationConfigRecords and ResourceConfig Records can also contain a List of AuditData objects containing the properties data for the records. AuditData objects are not to be directly accessed by other modules; access to the data can be allowed through the enveloping AuthorizationConfigRecord and ResourceConfigRecord classes, through the getProperties( ) method.

Instances of the class ResourceRolePair are returned in a list for CSUAP requests. This class can be in the common folder, and is to be treated as a primitive.

Figure 12:
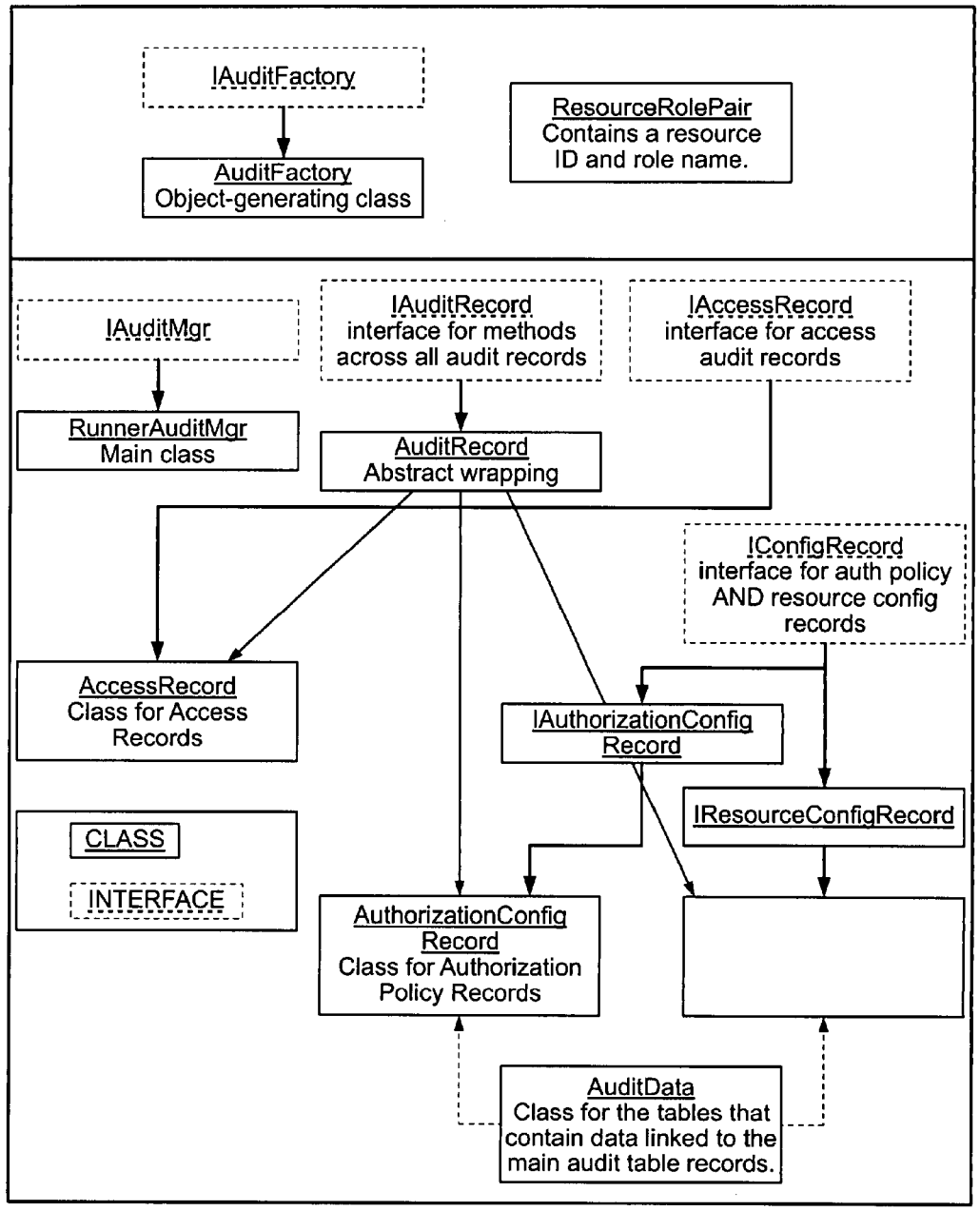
FIG. 12 illustrates an exemplary auditing API.

FIG. 12 illustrates an exemplary auditing API.

Code

Java Package: com.plumtree.runner.audit

```
public class AuditFactory implements IAuditFactory {
}
public class RunnerAuditMgr implements IAuditMgr {
public abstract class AuditRecord extends PersistentObject implements
IAuditRecord {
```

Property: long id—Hibernate-generated, unique sequence number

Property: String serviceName

Property: String resourceName

Property: Date auditDate—Hibernate-generated

Property: String userName

Property: String userType
Property: long resource id

}
   public class AccessRecord extends AuditRecord implements IAccessRecord {

Property: String accessURL
Property: String accessIPAddress
Property: int accessPrimaryAuthenticationMethod
Property: int accessResourceAuthenticationMethod }
public class AuthorizationConfigRecord extends AuditRecord implements
   IAuthorizationConfigRecord {

Property: List<AuditData> auditDataList
Property: int actionType

}
public class ResourceConfigRecord extends AuditRecord implements
IResourceConfigRecord {

Property: List<AuditData> auditDataList
Property: int actionType

}
   public class AuditData extends PersistentObject {

Property: long record_id
Property: String properties
Property: int pageNumber

```
}
public class ResourceRolePair {
    public void setResourceID(int _resourceID);
    public void setRole(String _role);
    public int getResourceID( );
    public String getRole( );
}
public interface IAuditFactory extends IRunnerModuleObjectFactory{
    public IAuditMgr createAuditMgr( );
}
public interface IAuditMgr {
    public void writeAudit(IAuditRecord _record);
    public List<IResourceRolePair> getCurrentUserAccessPrivileges(String _userName);
    public List<IAccessRecord> queryAccessReportByResourceID(long _resource_id, Date
        _startDate, Date _endDate, int _startIndex, int _maxResult);
    public List<IAccessRecord> queryAccessReportByUserName(String _userName, Date
        _startDate, Date _endDate, int _startIndex, int _maxResult);
    public List<IConfigRecord> queryAuthorizationConfigReport(long _resource_id, Date
        _startDate, Date _endDate, int _startIndex, int _maxResult);
    public List<IConfigRecord> queryResourceConfigReport(long _resource_id, Date
        _startDate, Date _endDate, int _startIndex, int _maxResult);
    public int queryCountAccessReportByResourceID(long _resource_id, Date _startDate,
        Date _endDate);
    public int queryCountAccessReportByUserName(String _userName, Date _startDate,
        Date _endDate);
    public int queryCountAuthorizationConfigReport(long _resource_id, Date _startDate,
        Date _endDate);
    public int queryCountResourceConfigReport(long _resource_id, Date _startDate, Date
        _endDate);
    public void exportAccessReportByResourceID(long _resource_id, Date _startDate, Date
        _endDate, int _startIndex, int _maxResult);
    public void exportAccessReportByUserName(String _userName, Date _startDate, Date
        _endDate, int _startIndex, int _maxResult);
    public void exportAuthorizationConfigReport(long _resource_id, Date _startDate, Date
        _endDate, int _startIndex, int _maxResult);
    public void exportResourceConfigReport(long _resource_id, Date _startDate, Date
        _endDate, int _startIndex, int _maxResult);
}
public interface IAuditRecord {
    public Date getDate( );
    public void setUserName(String _userName);
    public void setUserType(String _userType);
    public void setServiceName(String _serviceName);
    public void setResourceID(long _resourceID);
    public String getUserName( );
    public String getUserType( );
    public String getServiceName( );
    public long getResourceID( );
    public String getResourceName( );
}
public interface IAccessRecord {
    public void setAccessURL(String _url);
    public void setAccessIPAddress(String _ipAddress);
    public void setAccessPrimaryAuthenticationMethod(int _primAuthentMethod);
    public void setAccessResourceAuthenticationMethod(int _resAuthentMethod);
    public String getAccessURL( );
    public String getAccessIPAddress( );
```

```
    public int getAccessPrimaryAuthenticationMethod( );
    public int getAccessResourceAuthenticationMethod( );
}
public interface IConfigRecord extends IAuditRecord {
    public void setActionType(int _actionType);
    public void setProperties(String _properties);
    public int getActionType( );
    public String getProperties( );
}
Public interface IAuthorizationConfigRecord extends IConfigRecord {
}
Public interface IResourceConfigRecord extends IConfigRecord {
}
```

Implementation

Audit Recording

For all the writing of all audit records, the following sequence of steps can occur:

1. One of 3 methods in com.plumtree.runner.persistence.PersistenceService is called: createAccessRecord( ), createAuthorizationConfigRecord( ) and createResourceConfigRecord( ) An audit record object is returned, with its type depending on the method called.
2. The AuditRecord object is set with the proper data.
3. RunnerAuditMgr.writeAudit is called with the AuditRecord.
4. The generated AuditRecord can be persisted through Hibernate, and depending on its actual type (Access, Authorization Config, or Resource Config), can be recorded in the proper table or tables.

Access Recording

For AccessRecord objects, the method called in com.plumtree.runner.persistence.PersistenceService is createAccessRecord( )

AccessRecord objects can be persisted to the ACCESSAUDITRECORDS table.

Authorization Configuration Recording

For AuthorizationConfigRecord objects, the method called in com.plumtree.runner.persistence.PersistenceService is createAuthorizationConfigRecord( )

AuthorizationConfigRecords can be persisted to the AUTHORIZATIONCONFIGAUDITRECORDS table.

In addition to the defined steps for all audit recording (See 8.4.1), the following can also occur:

1. When the AuthorizationConfigRecord is defined, member AuditData objects can also be defined.
2. When the AuthorizationConfigRecord is persisted through Hibernate, the AuditData data can be stored in the AUTHORIZATIONCONFIGDATA table.

Resource Configuration Recording

For ResourceConfigRecord objects, the method called in com.plumtree.runner.persistence.PersistenceService is createResourceConfigRecord( )

ResourceConfigRecords can be persisted to the RESOURCECONFIGAUDITRECORDS table.

In addition to the defined steps for all audit recording (See 8.4.1), the following can also occur:

1. When the ResourceConfigRecord is defined, member AuditData objects can also be defined.
2. When the ResourceConfigRecord is persisted through Hibernate, the AuditData data can be stored in the RESOURCECONFIGDATA table.

Audit Retrieval

Retrieving the data can be implemented in 4 methods:
 queryAccessReportByResourceID
 queryAccessReportByUserName
 queryAuthorizationConfigReport
 queryResourceConfigReport Each method takes in a user name or resource ID, as well as a start date, an end date, a start index, and a maximum number of records to be returned. These define the necessary search parameters. A list of AuditRecords, with the actual class depending on the method called, can be generated, using Hibernate to access the DB tables. The records can be sorted by date, starting with the most recent. There are also 4 queryCount methods, which directly correspond to the query methods. They return the number of records retrieved from the given query.

For the retrieving of all audit records, the following sequence of steps can occur:

1. Call to RunnerAuditMgr on the desired query method type, with the necessary parameters.
   a. queryAccessReportByResourceID
   b. queryAccessReportByUserName
   c. queryAuthorizationConfigReport
   d. queryResourceConfigReport
2. Use Hibernate with the parameters to generate a SQL statement which can retrieve a sorted list of AuditRecords.
3. Return list.

There are 4 methods which export reports, one for each query. Each performs a query on the corresponding tables, and creates a CSV-formatted string that is entered into a given output stream. The methods are:

1. exportAccessReportByResourceID
2. exportAccessReportsByUserName
3. exportAuthorizationConfigReports
4. exportResourceConfigReports.

Current State of User Access Privileges (CSUAP)

Given a user name, the current state of potential user access privileges can be determined by searching through all registered policies on the Proxy server, and checking each for accessibility to the user. The apps that the given user can potentially access in the current state, combined with the roles they can access those apps as, can then be returned as ResourceRolePair objects in a list. This can be implemented in the getCurrentUserAccessPrivilegesFromUser method.

DB Tables

DB Best Practices and Partitioning

Since access audit records, when active, can cause the DB tables to increase significantly in size, and because only the reverse proxy server DB can be used for the audit records, DB partitioning can be recommended to prevent any adverse effects when accessing other tables in the reverse proxy server DB. In addition, best practices regarding the partitioning can be provided for customers.

DB Table Structure

Due to the nature of the queries supplied, indices are suggested for the following columns in each of the 3 types of AUDITRECORDS tables:

Time
UserName
ResourceID
ResourceName

Also, regarding the Properties column in both AUTHORIZATIONCONFIGDATA and RESOURCECONFIGDATA, the information stored in Properties can not be handled in the same way as Property Bags in portal.

The tables can not be kept in memory. HBM files can be used to implement this

ACCESSAUDITRECORDS
Primary Key: RecID
    RecID—NOT NULL, INT, DB/Hibernate-generated, unique sequence #
    Time—NOT NULL, DATETIME, DB/Hibernate-generated
    UserName—NOT NULL, VARCHAR(255)
    UserType—NOT NULL, VARCHAR(255)
    ServiceName—NOT NULL, VARCHAR(35)
    AccessIPAddress—NOT NULL, VARCHAR(39) (xxx.xxx.xxx.xxx OR xxxx:xxxx:xxxx:xxxx:xxxx:xxxx:xxxx:xxxx for IPv6)
    AccessPrimAuthenticationMethod—NULL, VARCHAR(20)
    AccessResAuthenticationMethod—NULL, VARCHAR(20)
    ResourceID—NOT NULL, INT
    ResourceName—NOT NULL, VARCHAR(255)
AUTHORIZATIONCONFIGAUDITRECORDS
Primary Key: RecID
    RecID—NOT NULL, INT, DB/Hibernate-generated, unique sequence #
    Time—NOT NULL, DATETIME, DB/Hibernate-generated
    UserName—NOT NULL, VARCHAR(255)
    UserType—NOT NULL, VARCHAR(255)
    ServiceName—NOT NULL, VARCHAR(35)
    ActionType—NOT NULL, TINYINT (1: creation, 2: change, 3: deletion)
    ResourceID—NOT NULL, INT
    ResourceName—NOT NULL, VARCHAR(255)
AUTHORIZATIONCONFIGDATA
Primary Key: RecID, PageNumber
Foreign Key: RecID
    RecID—NOT NULL, INT, DB/Hibernate-generated, unique sequence #
    Properties—NOT NULL, NVARCHAR(2000)
    PageNumber—NOT NULL, INT
RESOURCECONFIGAUDITRECORDS
Primary Key: RecID
    RecID—NOT NULL, INT, DB/Hibernate-generated, unique sequence #
    Time—NOT NULL, DATETIME, DB/Hibernate-generated
    UserName—NOT NULL, VARCHAR(255)
    UserType—NOT NULL, VARCHAR(255)
    ServiceName—NOT NOT NULL, VARCHAR(35)
    ActionType—NOT NULL, TINYINT (1: creation, 2: change, 3: deletion)
    ResourceID—NOT NULL, INT
    ResourceName—NOT NULL, VARCHAR(255)
RESOURCECONFIGDATA
Primary Key: RecID, PageNumber
Foreign Key: RecID
    RecID—NOT NULL, INT, DB/Hibernate-generated, unique sequence #
    Properties—NOT NULL, NVARCHAR(2000)
    PageNumber—NOT NULL, INT Analytics Tag Engine The 6.0 portal tag engine has been componentized so that it can be reused by RProxy and possibly other projects. This componentization includes removing any Portal dependencies, edits to the API to better serve both projects, and factory based creation of engine components. Converting the Tag Transformation Engine to use factories to retrieve internal components can allow RProxy or Portal to override common components if they have specific requirements that are not met by the componentized Engine. This can also aid in testing.

Security Service

Security Service—Current Design

The current BID Security Service project can be used for:
access the portal user and group directory
access user profile elements
access the capability and role store
perform authentication
access the user credential vault
internal security (mainly for RAdmin) on the reverse proxy server objects.

All these features can be needed by RProxy and RAdmin.

The Security Service wrapper that is implemented for the reverse proxy server can provide us with role mapping and policy rule evaluation capabilities, which poses a strange problem . . . . Why are security features split between two different services, the BID Security Service and the reverse proxy server Security Service Wrapper?

The background behind this is that before the BEA acquisition, the BID Security Service was designed to be a one-stop-shop for all things directory related and security related. However, since Security Service already provides extensive functionality around security policies and role mapping, it is the clear choice for these features.

Security Service provides these features as raw MBeans, which means there is no compile-time API. In addition, the reverse proxy server needs to feed the reverse proxy server objects and general constructs that have no equivalent in the Security Service API (for example, a Policy Rule Builder API). These reasons justify the construction of a wrapper API for Security Service that would be used internally for the reverse proxy server project.

Directory Service and Security Service

Since Security Service needs to be wrapped, and since BID Security Service is really more of a directory service with some miscellaneous security features tacked on, the logical solution is to:

rename the current Security Service the more accurate title of "Directory Service" and have it provide exclusively directory related features
    consolidate the security features of Security Service and the current Security Service under a new, unified API that provides exclusively security related features
    The new API would be (appropriately) called the "Security Service"

Figure 13A:
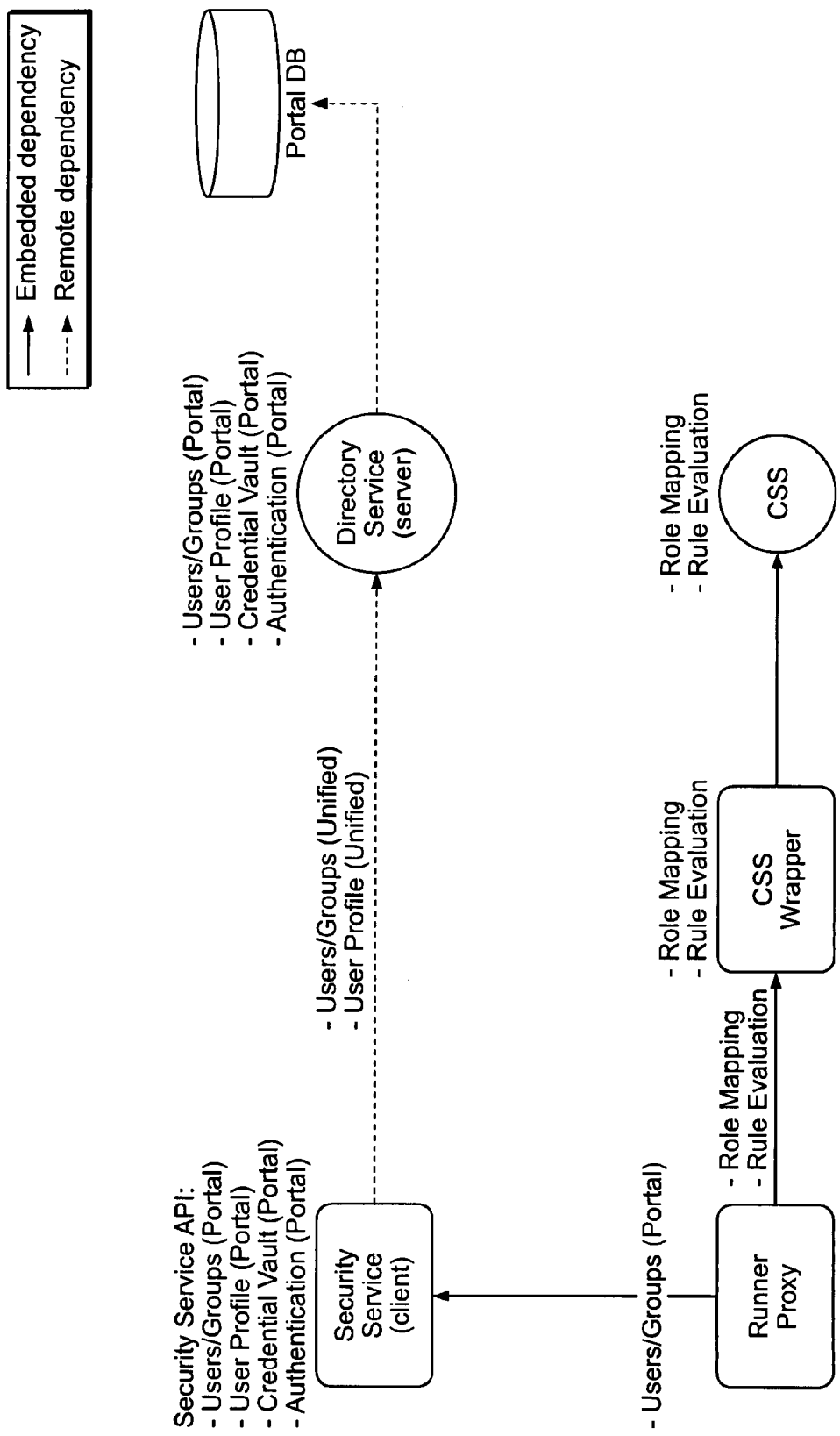
FIGS. 13A and 13B show current and new architectures of one embodiment.
Figure 13B:
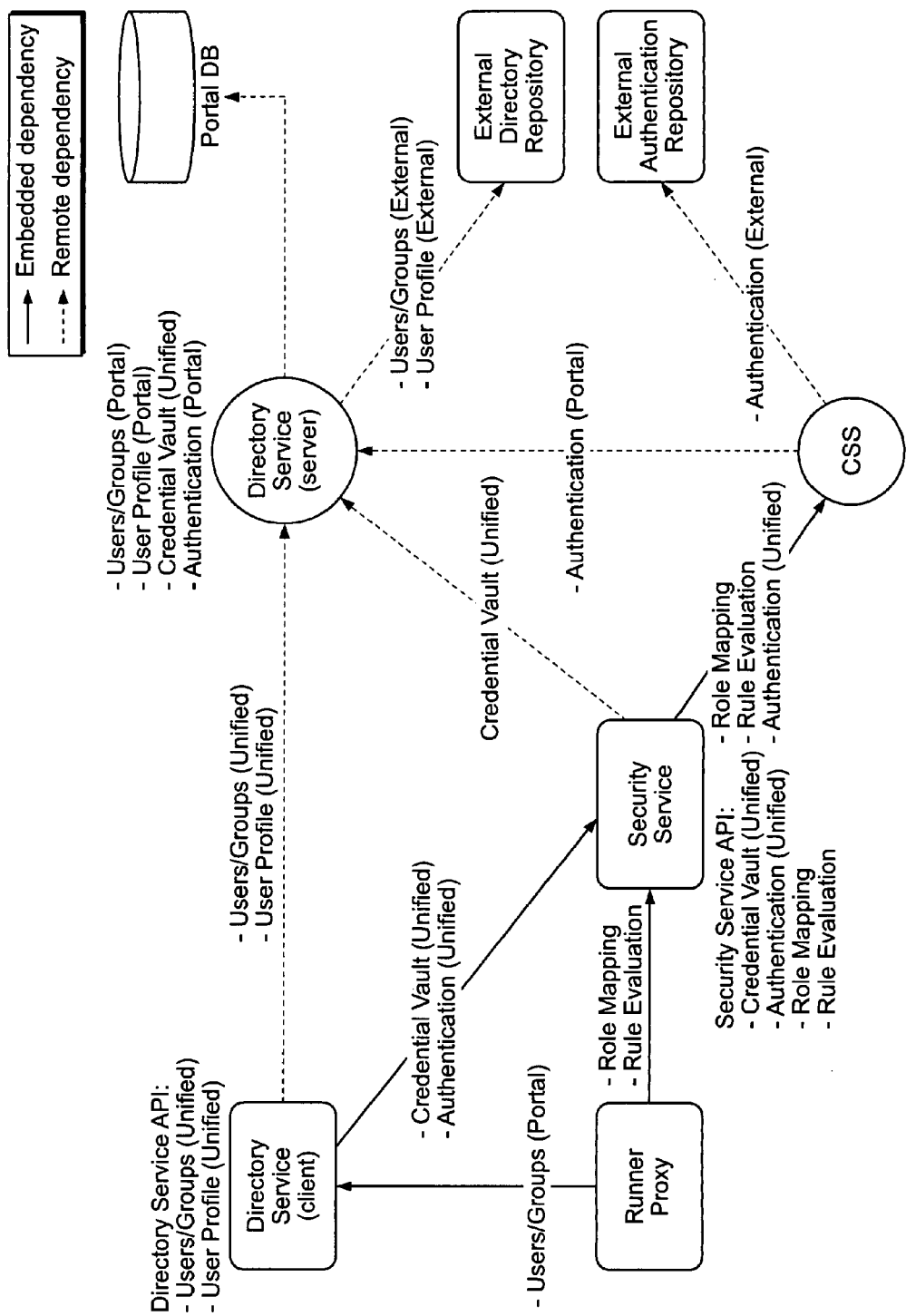

FIGS. 13A and 13B show current and proposed security service architectures respectively.

Portal Experience Rule Engine

The design and concepts of expressions and rule engine in Portal 6.0 can be reused for the reverse proxy server. However, the implementation of Portal's rule engine is tightly coupled with the portal code base, in a way that most of the rule engine implementation for the reverse proxy server would need a rewrite. In addition, there are additional refactoring and restructuring of the API to make the rule engine generic and not tied to any persistence requirement.

BEA Component Reuse

Security Service Standalone Product

Standalone Security Service can be used as the reverse proxy server's Rules Engine. To be specific, Security Service can provide the following functionality to the reverse proxy server:

Resource Policy rule construction and evaluation, using the Security Service Xacml Authorization provider Resource Policy role mapping construction and evaluation, using the Security Service Xacml Role Mapping provider Experience Definition rule evaluation, using the Authorization provider CWAPI—The proxy Security API (Security Service Wrapper API)

The said functionality of Security Service can be wrapped with an API for internal use by the reverse proxy server, which we can abbreviate as CWAPI. CWAPI speaks in the currency of the reverse proxy server constructs, but under the hood converts relevant objects into appropriate XACML strings in order to work with Security Service. For more information on CWAPI, refer to the section on Security Services.

CWAPI Standalone

As the reverse proxy server can be the first (and only) consumer of Security Service in the ALUI product line in the near future, the first version of the reverse proxy server can not expose CWAPI. However, depending on our findings during Springbok:

the parts of this wrapper functionality that is relevant to Security Service might be absorbed back into Security Service itself alternatively, or in conjunction, the wrapper might be spun off and released internal to BID as a Security Service utility class for consumption by other ALUI products.

Resource URL Mappings

Resource registration requires entry of external and internal URLs. The user need not be concerned with whether these URLs represent a reverse proxy, transparent proxy, or combination; the user only needs to enter URLs.

External URLs are what the user sees, are input into a browser, and are represented in requests to RProxy. When external URLs point to the RProxy hostname, no DNS changes are required. (This is the reverse proxy case.) External URLs that are not based on the name of the RProxy machine require DNS changes. (This is the transparent proxy case.)

Internal URLs usually refer to machines on the intranet (though they could be out on the internet). These are the machines RProxy sends requests to and retrieves HTML content from.

Requirements for a resource URL definition are as follows, with examples below.

External URL(s) must either be a relative path like "/a", a hostname like "crm.bea.com" or "crm", or a combination thereof "crm.bea.com/a". Multiple URLs can be used as aliases for the same resource. It may contain either "http://", "https://", or omit the protocol. If the protocol is omitted, a request with either http or https protocols can match.

Internal URL must specify a hostname "crm.internal.com" and may specify a path "crm.internal.com/a". If no protocol is specified, http is assumed. Either http or https may be explicitly specified "https://crm.internal.com". The external URL's protocol has no effect on the internal URL's protocol.

Both external and internal URLs are stored in the database as normalized URLs. The request URL is normalized before determining the matching resource for the request URL. This is to avoid the problem if two different URL strings referring to the same physical URL location.

The algorithm for matching a request URL involves three steps. First the protocol can be removed from the request URL. The resulting string then can be used to find a matching resource by from the most specific path to the more generic path. If no matching is found, the second step can use the request with protocol. If still no matching is found, the third step is to use on the path of the request URL.

For example, the request URL is http://www.bea.com/path1/path2/resource, the first step can use www.bea.com/path1/path2/resource, www.bea.com/path1/path2, www.bea.com/path1, www.bea.com. The second step can use http://www.bea.com/path1/path2/resource, http://www.bea.com/path1/path2, http://www.bea.com/path1, http://www.bea.com. The third step can use /path1/path2/resource, path1/path2, path1.

Resource URL Mapping Examples

In the following examples, proxy.runner.com refers to the reverse proxy server host. Each of the numbered entries below represents a distinct resource and below it, example http requests are provided.

The format of the examples is:

1) resource1 external URL=>internal URL to map to
2) resource2 external URL=>internal URL to map to
http://request example=>internal rewritten request after mapping
Notes 1) /a=>crm.internal.com/a
http://proxy.runner.com/a=>crm.internal.com/a
Base case for relative URL mapping.

1) proxy.runner.com/a=>crm.internal.com/a
http://proxy.runner.com/a=>crm.internal.com/a
When the reverse proxy server proxy's hostname is specified explicitly, the behavior is identical to a relative mapping.

1) /a=>crm.internal.com
http://proxy.runner.com/a=>crm.internal.com
http://proxy.runner.com/a/b=>crm.internal.com/b
http://proxy.runner.com/a/b/c=>crm.internal.com/b/c
If a relative mapping strips the endpoint, as does 1) above when /a is excluded from the internal mapping crm.internal.com, it is stripped before being sent to the internal host.

1) /a=>crm.internal.com/a
2) /a/b=>crm.internal.com/a/b
http://proxy.runner.com/a=>crm.internal.com/a
http://proxy.runner.com/a/b=>crm.internal.com/a/b
Subpaths are supported; most exact match is used.

1) /a=>crm.internal.com/a
2) /a/b=>finance.internal.com/a/b
http://proxy.runner.com/a=>crm.internal.com/a
http://proxy.runner.com/a/b=>finance.internal.com/a/b
Subpaths even allow mappings to different internal hosts. This case may require a warning to the admin user about unintended consequences if crm/a creates links to crm/a/b that are not meant to go to finance.

1) crm.bea.com=>crm.internal.com
http://crm.bea.com/anything=>crm.internal.com/anything
Base case for transparent proxy mapping; requires a DNS update since the external URL differs from the reverse proxy server hostname.

1) crm.bea.com=>crm.internal.com
   crm [alias on the same resource]
   http://crm.bea.com/anything=>crm.internal.com/anything
   http://crm/anything=>crm.internal.com/anything
   Multiple external URLs for a resource in a transparent proxy mapping; requests from the same domain need not be fully qualified.
1) finance.bea.com=>finance.internal.com
   drwho [alias on the same resource]
   finance.pt.com [alias on the same resource]
   http://finance.bea.com/anything=>finance.internal.com/anything
   http://finance.pt.com/anything=>finance.internal.com/anything
   http://drwho/anything=>finance.internal.com/anything
   Multiple external URLs for a resource. Internal requests can use a DNS alias. Other hostnames can be mapped via DNS to the same resource.
1) /a=>finance.internal.com/a
   http://proxy.runner.com/a=>finance.internal.com/a
   http://proxy.runner.com/a/=>finance.internal.com/a/*
   Terminating /is ignored when matching request URLs against resources.
   Terminating /is stripped from resources if they are entered in the admin console during resource definition.—It's unclear if this is acceptable.
   The reverse proxy server itself does NOT distinguish between files and paths; the remote web server decides this.
1) proxy.runner.com/a=>crm.internal.com/a
2) http://proxy.runner.com/b=>https://crm.internal.com/b
3) https://proxy.runner.com/c=>http://crm.internal.com/c
4) https://proxy.runner.com/d=>crm.internal.com/d
5) proxy.runner.com/e=>https://crm.internal.com/e
   If no http or https is specified as in 1) above, http is implied for the internal URL. For the external URL, either http or https can match.
   The resource can specify http or https in the external URL and then ONLY the specified protocol can match. The internal URL can map to either https or http as shown in 2), 3), and 4) above.
   An https connection can be forced internally but allow requests to an external URL via http or https, as in 5) above.
1) crm.bea.com=>crm.internal.com
2) /a=>finance.internal.com/a
   http://crm.bea.com/a=>crm.internal.com/a
   http://proxy.runner.com/a=>finance.internal.com/a
   When an external URL seemingly conflicts with a relative resource as 1) does with 2) above, the most exact match is applied.
   In this case, "most exact match" means hostname has a higher precedence than relative URLs.
1) /spaces are here=>crm.internal.com/spaces are here
   http://proxy.runner.com/spaces%20are%20here=>crm.internal.com/spaces%20are%20here
   Special characters such as spaces are allowed in resource mappings. Internally, they are stored URL encoded. In the admin console UI, they are visible as spaces.
1) /a=>crm.internal.com/a
2) /a=>finance.internal.com/a
3) crm.bea.com=>crm.internal.com
4) crm.bea.com=>crm.internal.com
5) finance.bea.com=>finance.internal.com
   finance.pt.com
6) finance.pt.com=>finance.internal.com
   Each of the above pairs are prohibited. Multiple resources cannot have the same external URL.
1) proxy.runner.com=>crminternal.com/a
2) /=>crm.internal.com/b
   Mapping the RProxy hostname without any path is prohibited.
   Mapping a relative URL of/alone is prohibited.
   Allowed resource mappings from external to internal are "n to 1," that is, "n" external request URLs can be mapped to only one internal URL, per resource. Resource mappings can allow configuration of authentication source options, login page, and something akin to experience definitions.

Roles

The Administration Console provides a means of managing users and groups in roles. This means that the Administration Console can most likely have a dependency on the security framework used in the reverse proxy server. This could mean that the Administration Console would also have to run in Web Logic Server.

Pagelet Catalog UI

The Pagelet Catalog UI can provide a left hand index and right side detail view, similar to our portal tagdocs. This UI can also display the tagdocs for the reverse proxy server tags. The left hand index can be split into 2 frames, an upper one containing the tag libraries and pagelet namespaces, and a lower one containing a full list of tags and pagelets. The right hand side can contain our standard tagdocs, or a single page showing all the details of a pagelet.

Figure 14:
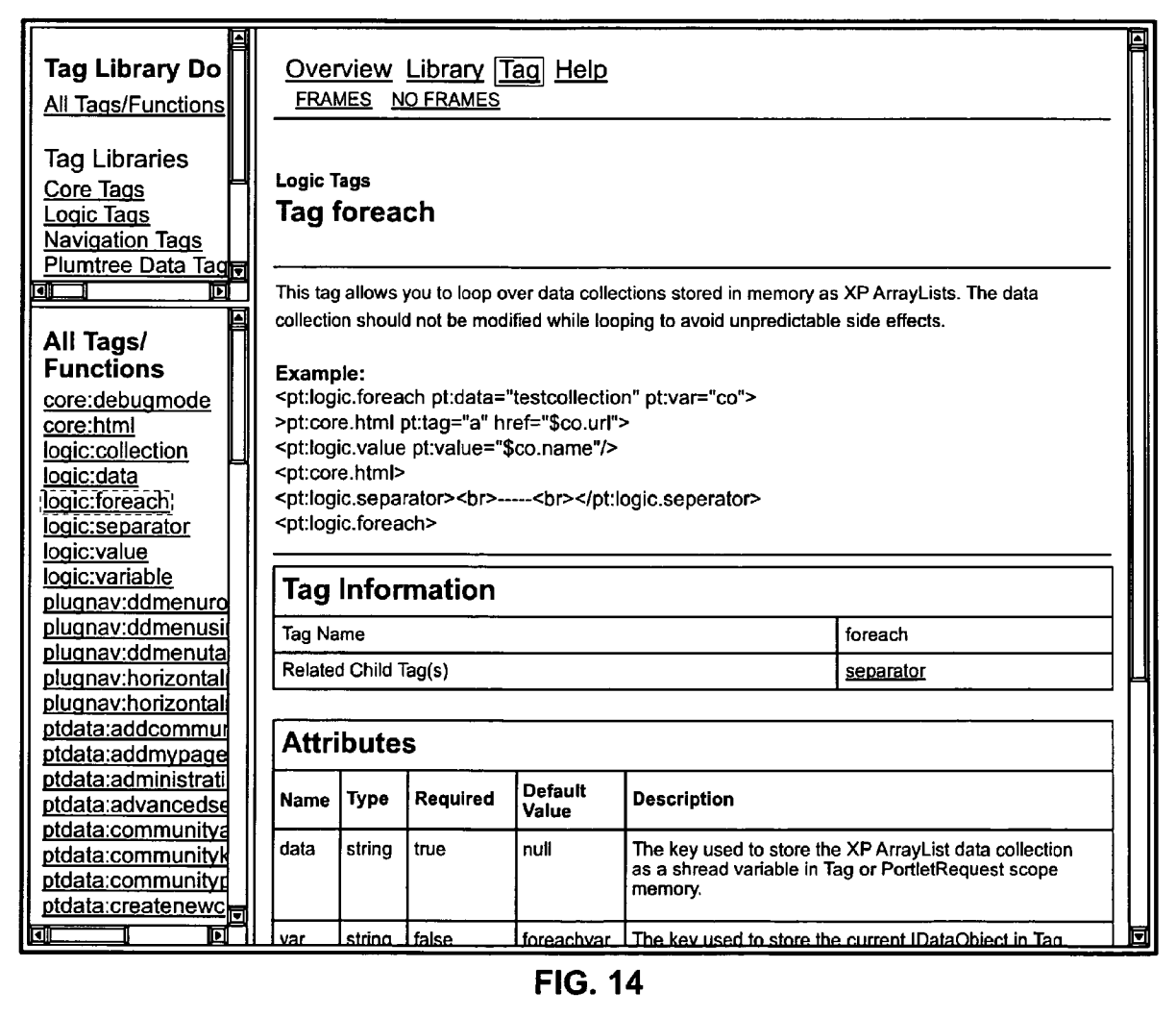

FIG. 14 shows an exemplary product UI catalog.

Persistent Object List

IRunnerResource is the reverse proxy server resource object. There are two types of resources. A protected resource is a resource that represents a protected application. Each protected resource must have reference type association with an experience definition object. By default a protected resource can reference a default experience definition. The second type of resource is login resource, which must not have an association with an experience definition. A protected resource that is configured as HTML form based authentication can have value type association with multiple IPTResourceRemoteLoginInfo objects.

IExperienceDefinition is an object that specifies login, interstitial, and error pages, as well as the default authentication source and authentication method for login.

IExperienceRule is an object that defines the conditional clauses (expressions), which can be evaluated at runtime to select which IExperienceDefinition to use for the current request.

IExperienceExpression is an object that defines the conditional clauses separated by operators (AND/OR) that evaluates to either TRUE or FALSE. IExperienceExpression is part of an IExperienceRule.

IPTResourceRemoteLoginInfo is an object that contains all information for the reverse proxy server to be able to detect login page and authenticate for resources with HTML form based authentication. Its association with the IPersistentResource is of value type where the resource object is the containing objects, which means all persistence operation of this object should be done through the resource object.

ILoginInputField is an object that contains HTML POST input field/value pair for HTML form based authentication. Its association with IPTResourceRemoteLoginInfo is of value type where the IPTResourceRemoteLoginInfo is the containing object.

IPersistentPagelet is the pagelet object. Pagelets are contained within a the reverse proxy server resource object. It also references a list of consuming resources. In addition, pagelets contain a list of pagelet parameters.

IPageletParameter describes a parameter in a pagelet tag. It is contained within a pagelet, and has no external references.

IPersistentResourceMap maintains a mapping between external URL prefixes and resources. It is used to determine the requested resource when a request enters the reverse proxy server.

IProxyAuthenticator is used to map an authentication level to an authenticator (i.e. basic auth).

Non-persistent Object List

IPagelet is an object that wraps an IPersistentPagelet and provides additional business logic, such as calculating the full pagelet URL.

IPageletRequest is an object that holds all of the data necessary to process an individual pagelet, including a reference to the IPagelet object.

Persistent Object Data
Resource
Interface: IRunnerResource
String: Name, Description, Owner, Policy Owner, Pagelet Namespace
List<String>: External URL Prefixes
IOKURL: Internal URL Prefix, Internal URL Secure Prefix
Boolean: Is Enabled, Audit Flag
IResourceAuthenticationInfo: Authentication Info
IResourceRetrievalInfo: Retrieval Info
List<IResourceRemoteLoginInfo>: Remote Login Info
List<IPersistentPagelet>: Pagelets
IBasicAuthLoginInfo: Basic Auth Login Info
List<IRunnerResource>: Linked Resources
List<IResourcePart>: Resource Parts
Int: Timeout
IResourceCSPSettings: CSP Settings
Interface IResourceAuthenticationInfo
Boolean: Is Login Resource
Int: Required Authentication Level
List<String>: Internal Logout Patterns
Interface IResourceRetrievalInfo
Map<String, String>: Proxy to Remote Header Filter, Remote To Proxy Header Filter
Interface IResourcePart
String: Name, URL Pattern
Interface IResourceCSPSettings
boolean: Send Login Token
List<String>: User Info Pref Names, Session Pref Names
Remote Login Info
Interface: IResourceRemoteLoginInfo
String: Name, Form URL, Action URL
boolean: Use Text Pattern For Page Detection, Use Text Pattern For Action URL, Submit Action As POST
List<ILoginInputField>: Form Fields
Interface: IBasicAuthLoginInfo
ILoginInputField: Name, Password
Interface: ILoginInputField
String: Name, Value
int: Type
Pagelet
Interface: IPersistentPagelet
String: Name, Description, Code Sample, Pagelet URL, Pagelet Secure URL, Payload Schema URL
IRunnerResource: Parent Resource
boolean: Publish Docs, Allow All Consumers
List<IPageletParameter>: Parameters
Map<String, String>: Metadata
List<IRunnerResource>: Consuming Resources
Interface: IPageletParameter
String: Name, Description, Type
boolean: Is Mandatory
Resource Map
Interface: IPersistentResourceMap
Map<String, Integer>: Resource Map
Proxy Authenticator There can be several standard Proxy Authenticators that come with the product, and administrators can be able to create new Proxy Authenticators. The preexisting Authenticators can reference internal class names, but the administrators can only be able to configure Remote Proxy Authenticators (i.e. specify a URL, not a class name).

Interface: IProxyAuthenticator
String: Name, Description, Integrated Authenticator Class Name, Remote Integration URL
boolean: Is Enabled, Is Interactive, Is Remote
int: Authentication Level
Non-persistent Objects
Interface: IPagelet
String: Pagelet Full URL
Class: PageletRequest:
IPagelet: GetPagelet
Int: Pagelet Timeout, Error Code
String: Content, Pagelet Name, Error Text, XML Payload
Map<String, String>: Attributes
IOKHttpRequest: HTTP Request
Proxy Authenticator
Interface: IProxyAuthenticator
String: Name, Description, Integrated Authenticator Class Name
boolean: Is Enabled, Is Interactive
int: Authentication Level
Non-persistent Objects
Interface: IPagelet
String: Pagelet Full URL
Class: PageletRequest:
IPagelet: GetPagelet
Int: Pagelet Timeout, Error Code
String: Content, Pagelet Name, Error Text, XML Payload
Map<String, String>: Attributes
IOKHttpRequest: HTTP Request
Tag Libraries The reverse proxy server can provide both it's own unique tags, as well as extensions to the common tags provided by the Portal The reverse proxy server Tags These tags can all be included in the reverse proxy server tag library.

| Auth Source Tag | |
|---|---|
| Tag | authsourcedata |
| Description | This stores a list of available auth sources for the currently requested resource in memory. The data is stored as a collection, and each item in the collection is a data object containing information about the auth source (id, name, description) accessible through the data object dot notation ($curauth.name). |

Auth Source Tag

Attributes

| | |
|---|---|
| id | The key used to store the data list in memory. |
| scope | Which scope (tag, request, application, etc . . .) to use to store the data list in memory. |

```
<pt:ensemble.authsourcedata pt:id="authsources"/>
<pt:logic.collectionlength pt:data="authsources" pt:key="numauths"/>
<pt:logic.if pt:expr="($numauths)>1">
    <pt:logic.if-true>
        <!--display as HTML drop down -->
    </pt:logic.if-true>
    <pt:logic.if-false>
        <!--display as hidden input -->
    </pt:logic.if-false>
</pt:logic.if>
```

Resource Link Tags

| | |
|---|---|
| Tag | resourcelink |
| Description | This stores the URL to a specific resource, if available, in memory. |

Attributes

| | |
|---|---|
| resourceid | The resource ID. |
| id | The key used to store the data in memory. |
| scope | Which scope (tag, request, application, etc . . .) to use to store the data in memory. |
| Tag | resourcedata |
| Description | This stores a list of resources in memory that are available to the current user. The data is stored as a collection, and each item in the collection is a data object containing information about the resource (id, name, description, url) accessible through the data object dot notation ($curresource.name). |

Attributes

| | |
|---|---|
| id | The key used to store the data list in memory. |
| scope | Which scope (tag, request, application, etc . . .) to use to store the data list in memory. |

These tags behave similarly to the ptdata tags in the Portal.

Pagelets

| | |
|---|---|
| Tag | pagelet |
| Description | This tag is replaced with the output of the specified pagelet. |

Attributes

| | |
|---|---|
| pageletid | The pagelet ID. |

The pagelet tag is simply the way to add a pagelet to an HTML page.

```
<pt:ensemble.inject pt:name="al-collab:discussion" discussionid="21">
    <discussion>
        <expandedmessages>
            <messageid>27<messageid>
            <messageid>36<messageid>
            <messageid>144<messageid>
        </expandedmessages>
        <currentmessage>
        <messageid>27</messageid>
        </currentmessageid>
    </discussion>
</pt:ensemble.inject>
```

Role Tag

| | |
|---|---|
| Tag | roledata |
| Description | This stores a list of the roles in memory that the current user has available. The data is stored as a collection, and each item in the collection is a variable containing the role name. This can be used with the foreach tag to iterate over role data. |

Attributes

| | |
|---|---|
| id | The key used to store the data list in memory. |
| scope | Which scope (tag, request, application, etc . . .) to use to store the data list in memory. |

```
<pt:ensemble.roledata pt:id="myroles"/>
```

| | |
|---|---|
| Tag | roleexpr |
| Description | This tag evaluates a role expression and stores the result in memory. It is designed to work with the logic.if tag. |

Attributes

| | |
|---|---|
| expr | An expression consisting of the hasRole function which takes an application role as its argument. This function evaluates whether or not the current user has the requested role. |
| key | The key used to store the data in memory. Defaults to "if-result". |
| scope | Which scope (tag, request, application, etc . . .) to use to store the data in memory. |

```
<pt: ensemble.roleexpr pt:expr="hasRole(admin-role)"/>
```

User Info Tag

| | |
|---|---|
| Tag | userinfo |
| Description | This stores and retrieves user info data. |

Attributes

| | |
|---|---|
| info | The name of the user info data. If this is used alone, the data can be retrieved. |
| value | The value to store in user info. |

```
<pt: ensemble.userinfo pt:info="email"/>
<pt: ensemble.userinfo pt:info="email" pt:value="test@test.com"/>
```

User/Group/Role Picker Tag

| | |
|---|---|
| Tag | picker |
| Description | This tag selects a user/group/role and passes the result to the specified JavaScript function. |

Attributes

| | |
|---|---|
| type | The type of object to select (user, group, or role). |
| multi | A boolean specifying whether or not the user can select multiple items. Default to false. |
| jscallback | The JavaScript callback. This method can be passed a 2d javascript array containing the type (user, group, or role), name, and ID of each selected item. |

```
<pt:ensemble.picker pt:type="user" pt:jscallback="myJSCallbackfunc"/>
```

This tag can require serious thought to get right. UI pickers are extremely complicated.

| Analytics Tag | |
|---|---|
| Tag | analytics |
| Description | This sends an analytics event to the analytics server. |
| Attributes | |
| id | The event id. |
| data | The event data. |

```
<pt:ensemble.analytics pt:id="myeventid" pt:data="myeventdata"/>
```

| The reverse proxy server Debug Tags | |
|---|---|
| Tag | debug |
| Description | These outputs debug information about the current roles or experience definitions Definitions (i.e. how did you get the current role and/or login page). |
| Attributes | |
| type | The type of debug info to display (role or experience definition). |

```
<pt:ensemble.debug pt:type="role"/>
<pt:ensemble.debug pt:type="experience definition"/>
```

Common Tags

These tags are shared between the reverse proxy server and portal. They include new tags (with the reverse proxy server specific implementations) and enhancements to the pre-existing general tag libraries for specific reverse proxy server needs.

If Tag Set

Since the reverse proxy server does not include the Portal Standard tags, such as the choose/when/otherwise tag, we can take this opportunity to develop a more flexible way of doing conditionals using tags. This way we can have a variety of expr tags (such as the reverse proxy server roleexpr tag) that store boolean results for use by the if tag. This simplifies the tag, and avoids the problem of having to figure out if the expression is an integer expression, a role expression, or something else.

| Tag | if |
|---|---|
| Description | This tag evaluates an expression and then displays either the if-true or if-false tag contents. |
| | Attributes |
| expr | A Boolean value. This can be input as an tag variable using the $ attribute notation (i.e. pt:expr="$myboolean"). |

The corresponding if-true and if-false tags do not have any attributes. They are simply displayed or not displayed depending on the results of the if tag expr parameter.

| Tag | intexpr |
|---|---|
| Description | This tag evaluates an integer expression and stores the result in memory. |
| Attributes | |
| expr | An integer value or a tag variable, followed by an integer comparator, and then another integer value or tag variable. The tag variables must evaluate to an integer and be in $ attribute notation surrounded by parentheses. The following comparators are allowed: '==', '!=', '<', '>'. |

| key | The key used to store the data in memory. Default to "if-result". |
|---|---|
| scope | Which scope (tag, request, application, etc . . .) to use to store the data in memory. |

```
<pt:logic.intexpr pt:expr="($numauths)>1"/>
<pt:logic.if pt:expr="$if-result">
    <pt:logic.if-true>
        <!-- This is displayed if expr evaluates to true. -->
    </pt:logic.if-true>
    <pt:logic.if-false>
        <!-- This is displayed if expr evaluates to false. -->
    </pt:logic.if-false>
</pt:logic.if>
```

An alternate way of handling the expression tags is to have the arguments be tag attributes, rather than having an expression string that the tag parses. For example:

```
<pt:logic.intexpr pt:value1="$numauths" pt:operator=">" pt:value2="1"/>
```

CollectionLength Tag

The collectionlength tag is necessary to enable conditional logic based on how many auth sources or resources are returned (i.e. empty, a single item, or a list).

| Tag | collectionlength |
|---|---|
| Description | This tag evaluates the length of a collection and stores the result in memory. |
| | Attributes |
| data | The key used to store the collection. |
| key | The key used to store the result in memory. |
| scope | Which scope (tag, request, application, etc . . . ) to use to store the data in memory. |

Variable Tag Enhancement

This tag needs to be converted for use with the collection tag so that you can create collections of variables, in addition to collections of data objects. This is useful for the rolesdata tag. The collection tag also needs to be updated to mention the new related child tag, as well as a warning not to mix data types in a collection.

Error Tags

These tags can allow the reverse proxy server errors to be formatted as desired on a custom error page. There are two ways to implement this. The first can require either adding an API to the Tag Engine to allow the reverse proxy server to set error messages for a user. The reverse proxy server can then need to set the error information before displaying an error page to the user. The second involves implementing the reverse proxy server specific error tags that meet a common error tag API specified by the tag engine.

| Tag | error |
|---|---|
| Description | This tag displays errors on the page so that they can be placed and formatted as desired. If the errortext tag is included inside this tag, the contents of this tag can only be processed if there is an error. If the child tag is not present, then the error messages can be formatted and displayed from this tag in the standard style. |
| Tag | errortext |
| Description | This tag displays the current error text on the page so that it can be placed and formatted as desired. |

| | -continued |
|---|---|
| Attributes | |
| text | This attribute allows you to override the error text with text of your own choosing. |

```
<pt:common.error/>
    or
<pt:common.error>
    <p>
        <pt: common.errortext/>
    <p/>
</pt:common.error>
```

| Tag | errorcode |
|---|---|
| Description | This tag stores the error code in tag memory. |
| Attributes | |
| id | The key used to store the data in memory. |
| scope | Which scope (tag, request, application, etc . . .) to use to store the data in memory. |

```
<pt:common.errorcode id="myerrorcode"/>
```

| User Into Tag | |
|---|---|
| Tag | userinfo |
| Description | This stores and retrieves user info data. |
| Attributes | |
| info | The name of the user info data. If this is used alone, the data can be retrieved. |
| value | The value to store in user info. |

```
<pt:common.userinfo pt:info="email"/>
<pt:common.userinfo pt:info="email" pt:value="test@test.com"/>
```

| Head Includes Tag Set | |
|---|---|
| Tag | includeinhead |
| Description | This marks JavaScript & Security Service links to be included in the Head element of the HTML page by the headincludes tag. If a .js or .css file is marked for inclusion multiple times, it can only be included once. |
| Attributes | |
| Tag | headincludes |
| Description | This tag allows JavaScript and Style Sheet include information to be added to the Head element of an HTML page, as required by the XHTML specification. If a .js or .css file is included multiple times, it can actually only be included once in the Head element. |
| Attributes | |

```
Main page HTML:
<head>
    <pt:common.headincludes/>
</head>
Pagelet HTML:
<pt:common.includeinhead>
    <script type="text/javascript"><!--JavaScript --></script>
    <script type="text/javascript" src="http://acme.com/test.js"/>
    <link rel="stylesheet" href="http://acme.com/test.css"
    type="text/css"/>
</pt:common.includeinhead>
```

Security Model and Threat Assessment

The most important security issue in RProxy is the use of the Credential Vault. In order to manage authentication to back-end resources, the reverse proxy server stores a user's username and password for each resource in a Credential Vault. While this information can be encrypted, the reverse proxy server needs to be able to extract the non-encrypted data from the vault in order to pass the username and password to the resource. This is dangerous because if the reverse proxy server can decrypt the Credential Vault, someone else could figure out how to do it as well (i.e. steal the reverse proxy server's encryption key, which needs to be stored in the database or file system). This could provide someone with direct access to back-end resources using another user's credentials (i.e. accessing the finance app as the CEO). One way to avoid this problem is to encrypt the secondary passwords in the credential vault with the user's primary password, so that more than just the server's encryption key is needed for decryption.

Because of this, at the very least customers need to be able to disable this feature. They can currently do this on a per-resource basis by leaving the authentication set to NONE (default). Since Analytics uses the PMB, the reverse proxy server documentation should include a security advisory that this multicast UDP traffic can be sniffed and therefore the network containing the reverse proxy server and Analytics servers should be isolated from the rest of the network.

One embodiment may be implemented using a conventional general purpose of a specialized digital computer or microprocessor(s) programmed according to the teachings of the present disclosure, as can be apparent to those skilled in the computer art. Appropriate software coding can readily be prepared by skilled programmers based on the teachings of the present discloser, as can be apparent to those skilled in the software art. The invention may also be implemented by the preparation of integrated circuits or by interconnecting an appropriate network of conventional component circuits, as can be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations can be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method comprising:
receiving, by a computer system, a user request for a first web application;
retrieving, by the computer system, markup data for the first web application;
converting, by the computer system, the retrieved markup data into markup fragments containing application markup and at least a first adaptive tag;
interpreting, by the computer system, the first adaptive tag to indicate a pagelet web application;
obtaining, by the computer system, code from the pagelet web application specific to the requesting user;
based upon the obtained pagelet web application code, assembling, by the computer system, a page of the first application from at least data for the pagelet web application and the application markup obtained from the retrieved markup data; and
providing, by the computer system, the page of the first application to the requesting user.

2. The method of claim 1, wherein a reverse proxy system retrieves the markup data for the first web application.

3. The method of claim 1, wherein a central role repository is maintained for a plurality of web applications including the first web application.

4. The method of claim 3, wherein the user role is sent to the web applications in an HTTP header so that the web application need not do an independent mapping of the user to a role.

5. The method of claim 1, wherein the adaptive tag includes a namespace.

6. The method of claim 1, wherein the adaptive tag includes an identifier.

7. A non-transitory machine-readable medium for a computer system, the non-transitory machine-readable medium having stored thereon a series of instructions executable by a processor, the series of instructions comprising:
instructions that cause the processor to receive a user request for a first web application;
instructions that cause the processor to retrieve markup data for the first web application;
instructions that cause the processor to convert the retrieved markup data into markup fragments containing application markup and at least a first adaptive tag;
instructions that cause the processor to interpret the first adaptive tag to indicate a pagelet web application;
instructions that cause the processor to obtain code from the pagelet web application specific to the requesting user;
instructions that cause the processor to, based upon the obtained pagelet web application code, assemble a page of the first application from at least data for the pagelet web application and the application markup obtained from the retrieved markup data; and
instructions that cause the processor to provide the page of the first application to the requesting user.

8. The machine-readable medium of claim 7, wherein a reverse proxy system retrieves the markup data for the first web application.

9. The machine-readable medium of claim 7, wherein a central role repository is maintained for a plurality of web applications including the first web application.

10. The machine-readable medium of claim 9, wherein the user role is sent to the web applications in an HTTP header so that the web application need not do an independent mapping of the user to a role.

11. The machine-readable medium of claim 7, wherein the adaptive tag includes a namespace.

12. The machine-readable medium of claim 7, wherein the adaptive tag includes an identifier.

13. A system comprising:
a processor configured to:
receive a user request for a first web application;
retrieve markup data for the first web application;
convert the retrieved markup data into markup fragments containing application markup and at least a first adaptive tag;
interpret the first adaptive tag to indicate a pagelet web application;
obtain code from the pagelet web application specific to the requesting user;
based upon the obtained pagelet web application code, assemble a page of the first application from at least data for the pagelet web application and the application markup obtained from the retrieved markup data; and
provide the page of the first application to the requesting user.

14. The system of claim 13, wherein the system retrieves the markup data for the first web application.

15. The system of claim 13, wherein a central role repository is maintained for a plurality of web applications including the first web application.

16. The system of claim 15, wherein the user role is sent to the web applications in an HTTP header so that the web application need not do an independent mapping of the user to a role.

17. The system of claim 13, wherein the adaptive tag includes a namespace.

18. The system of claim 13, wherein the adaptive tag includes an identifier.

19. The system of claim 13, wherein the system further comprises a reverse proxy server.

* * * * *

UNITED STATES PATENT AND TRADEMARK OFFICE
CERTIFICATE OF CORRECTION

PATENT NO.         : 8,397,283 B2
APPLICATION NO.    : 13/364251
DATED              : March 12, 2013
INVENTOR(S)        : Hayler et al.

It is certified that error appears in the above-identified patent and that said Letters Patent is hereby corrected as shown below:

In the Drawings:

On sheet 19 of 19, in figure 14, line 16, delete "seperator>" and insert -- separator> --, therefor.

In the Specifications:

In column 1, line 38, delete "illustrates" and insert -- illustrate --, therefor.

In column 1, line 40, delete "illustrates" and insert -- illustrate --, therefor.

In column 1, line 53, delete "shows" and insert -- show --, therefor.

In column 3, line 20, delete "D$_X$(y)" and insert -- D$_x$(y) --, therefor.

In column 3, line 30, delete "If:" and insert -- if: --, therefor.

In column 6, line 25, delete "mereged" and insert -- merged --, therefor.

In column 7, line 23-24, delete "programatically" and insert -- programmatically --, therefor.

In column 9, line 14, after "checked" insert -- . --.

In column 12, line 55, delete "server server," and insert -- server, --, therefor.

In column 13, line 21, delete "a the" and insert -- the --, therefor.

In column 17, line 46, delete "Comsuming" and insert -- Consuming --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,397,283 B2

In column 18, line 61, delete "memory.." and insert -- memory. --, therefor.

In column 19, lines 49, below "shown." insert -- Attributes --.

In column 20, line 6, delete "esemble" and insert -- ensemble --, therefor.

In column 21, line 56, delete "= "$myboolean")." and insert -- ="$myboolean"). --, therefor.

In column 24, line 41, delete "viewthreadjsp." and insert -- viewthread.jsp. --, therefor.

In column 25, line 22, delete "a" and insert -- an --, therefor.

In column 27, line 40, delete "is Secure" and insert -- isSecure --, therefor.

In column 29, line 13, delete "PERSISTEDSSCOOKIE." and insert -- PERSISTEDSSOCOOKIE. --, therefor.

In column 29, line 30, delete "Currently," and insert -- currently, --, therefor.

In column 29, line 49, delete "linegrated" and insert -- integrated --, therefor.

In column 31, line 56, delete "HS" and insert -- IIS --, therefor.

In column 32, line 19, delete "accesse" and insert -- access --, therefor.

In column 32, line 26, delete "Loging" and insert -- Logging --, therefor.

In column 32, line 29, delete "Intergrated" and insert -- Integrated --, therefor.

In column 32, line 53, delete "firs," and insert -- first, --, therefor.

In column 33, line 8, delete "IIP" and insert -- IP --, therefor.

In column 36, line 31, delete "porta" and insert -- portal --, therefor.

In column 36, line 44, delete "<form.*action=\"?(.*/sign-in[^\"]*)\".*>" and insert -- <form.*action=\"?(.*/sign-in[^\"]*)\"?.*> --, therefor.

In column 38, line 45, delete "plmtree" and insert -- plumtree --, therefor.

In column 38, line 66, delete "of" and insert -- on --, therefor.

In column 39, line 60, delete "il8n," and insert -- i18n, --, therefor.

In column 40, line 8, delete "Paglets" and insert -- Pagelets --, therefor.

CERTIFICATE OF CORRECTION (continued)
U.S. Pat. No. 8,397,283 B2

In column 40, line 39, delete "Parallele" and insert -- Parallel --, therefor.

In column 40, line 45, delete "back-enc" and insert -- back-end --, therefor.

In column 40, line 54, delete "apgelet" and insert -- pagelet --, therefor.

In column 40, line 67, delete "pagelt" and insert -- pagelet --, therefor.

In column 41, line 16, delete "incude" and insert -- include --, therefor.

In column 41, line 16, delete "pagelt" and insert -- pagelet --, therefor.

In column 51, line 20, delete "A the" and insert -- The --, therefor.

In column 53, line 20, after "( )" insert -- : --.

In column 53, line 40, delete "Evaluate(.)." and insert -- Evaluate(..). --, therefor.

In column 53, line 46, delete "( )method" and insert -- ( ) method --, therefor.

In column 53, line 48, delete "( )method," and insert -- ( ) method, --, therefor.

In column 54, line 3, delete "a the" and insert -- the --, therefor.

In column 55, line 64, delete "( )methods" and insert -- ( ) methods --, therefor.

In column 59, line 22, after "( )" insert -- , --.

In column 59, line 23, after "( )" insert -- . --.

In column 59, line 25, after "( )" insert -- . --.

In column 59, line 41, after "( )" insert -- . --.

In column 59, line 54, after "( )" insert -- . --.

In column 65, line 31, delete "https ://crm" and insert -- https://crm --, therefor.

In column 66, line 3, delete "crminternal" and insert -- crm.internal --, therefor.

In column 67, line 2, delete "a the" and insert -- the --, therefor.